US011244006B1

(12) United States Patent
Setlur et al.

(10) Patent No.: US 11,244,006 B1
(45) Date of Patent: *Feb. 8, 2022

(54) USING NATURAL LANGUAGE PROCESSING FOR VISUAL ANALYSIS OF A DATA SET

(71) Applicant: Tableau Software, Inc., Seattle, WA (US)

(72) Inventors: Vidya Raghavan Setlur, Portola Valley, CA (US); Sarah E. Battersby, Seattle, WA (US); Melanie Karla Tory, Palo Alto, CA (US); Richard Carl Gossweiler, III, Sunnyvale, CA (US); Angel Xuan Chang, Stanford, CA (US); Isaac James Dykeman, Bethesda, MD (US); Md Enamul Hoque Prince, Vanvcouver (CA)

(73) Assignee: TABLEAU SOFTWARE, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,167

(22) Filed: Dec. 20, 2019

Related U.S. Application Data

(63) Continuation of application No. 15/486,265, filed on Apr. 12, 2017, now Pat. No. 10,515,121.

(Continued)

(51) Int. Cl.
*G06F 16/90* (2019.01)
*G06F 16/9032* (2019.01)
(Continued)

(52) U.S. Cl.
CPC ...... *G06F 16/90332* (2019.01); *G06F 40/211* (2020.01); *G10L 15/1815* (2013.01); *G06F 40/253* (2020.01); *G06F 40/30* (2020.01)

(58) Field of Classification Search
None
See application file for complete search history.

(56) References Cited

U.S. PATENT DOCUMENTS 6,453,312 B1 * 9/2002 Goiffon .............. G06F 16/3323
6,880,131 B1 * 4/2005 Nakazono ............ G06F 3/0482
707/999.202

(Continued)

OTHER PUBLICATIONS

Allen, J. Recognizing Intentions from Natural Language Utterances. In Computational Models of Discourse, M. Brady, Ed. M.I.T. Press, Cambridge, Massachusetts, 1982, 12 pgs.

(Continued)

*Primary Examiner* — Neeraj Sharma
(74) *Attorney, Agent, or Firm* — Morgan, Lewis & Bockius LLP

(57) ABSTRACT

A method uses natural language for visual analysis of a dataset, and is performed at a computer having a display, processors, and memory. The computer displays a data visualization based on a dataset retrieved from a database and receives a first user input to specify a natural language command related to the displayed data visualization. Based on the displayed data visualization and the natural language command, the computer identifies an initial range of values for a first data field in the dataset and displays an editable user interface control showing the initial range of values. The computer receives a second user input, at the user interface control, specifying a modified range of values for the first data field and retrieves an updated dataset from the database using the modified range of values for the first data field. The computer then updates the displayed data visualization using the updated dataset.

19 Claims, 44 Drawing Sheets

Related U.S. Application Data

(60) Provisional application No. 62/321,695, filed on Apr. 12, 2016, provisional application No. 62/418,052, filed on Nov. 4, 2016.

(51) Int. Cl.
*G10L 15/18* (2013.01)
*G06F 40/211* (2020.01)
*G06F 40/30* (2020.01)
*G06F 40/253* (2020.01)

(56) References Cited

U.S. PATENT DOCUMENTS

| | | | |
|---|---|---|---|
| 7,019,749 B2 | 3/2006 | Guo et al. | |
| 7,089,266 B2 | 8/2006 | Stolte et al. | |
| 7,391,421 B2 | 6/2008 | Guo et al. | |
| 7,606,714 B2 | 10/2009 | Williams et al. | |
| 7,716,173 B2 | 5/2010 | Stolte et al. | |
| 7,739,309 B2 * | 6/2010 | Singh | G06Q 10/107 707/802 |
| 7,908,260 B1 * | 3/2011 | Bushee | G06F 16/9535 707/705 |
| 8,341,542 B2 * | 12/2012 | Brody | G06F 3/04897 715/784 |
| 8,489,641 B1 | 7/2013 | Seefeld et al. | |
| 8,713,072 B2 | 4/2014 | Stolte et al. | |
| 8,972,457 B2 | 3/2015 | Stolte et al. | |
| 9,183,235 B2 | 11/2015 | Stolte et al. | |
| 9,477,752 B1 | 10/2016 | Romano | |
| 9,501,585 B1 | 11/2016 | Gautam et al. | |
| 9,575,720 B2 | 2/2017 | Faaborg et al. | |
| 9,794,613 B2 | 10/2017 | Jang et al. | |
| 9,858,292 B1 | 1/2018 | Setlur et al. | |
| 9,953,645 B2 | 4/2018 | Bak et al. | |
| 10,430,510 B2 * | 10/2019 | Evers | G06F 40/174 |
| 2004/0030741 A1 | 2/2004 | Wolton et al. | |
| 2006/0036635 A1 * | 2/2006 | Williams | G06F 16/30 |
| 2006/0218140 A1 | 9/2006 | Whitney et al. | |
| 2006/0221372 A1 * | 10/2006 | Onishi | H04N 1/00938 358/1.13 |
| 2006/0259394 A1 | 11/2006 | Cushing et al. | |
| 2006/0259775 A2 | 11/2006 | Oliphant | |
| 2007/0174350 A1 | 7/2007 | Pell et al. | |
| 2009/0299990 A1 | 12/2009 | Setlur et al. | |
| 2009/0313576 A1 | 12/2009 | Neumann et al. | |
| 2009/0326917 A1 * | 12/2009 | Hegenberger | G06F 40/45 704/7 |
| 2010/0030552 A1 | 2/2010 | Chen et al. | |
| 2010/0110076 A1 | 5/2010 | Hao et al. | |
| 2010/0313164 A1 | 12/2010 | Louch et al. | |
| 2012/0169772 A1 * | 7/2012 | Werner | G06F 3/0481 345/660 |
| 2012/0179713 A1 | 7/2012 | Stolte et al. | |
| 2013/0031126 A1 | 1/2013 | Setlur | |
| 2013/0238982 A1 * | 9/2013 | Gong | G06F 16/958 715/234 |
| 2014/0192140 A1 | 7/2014 | Peevers | |
| 2014/0282125 A1 * | 9/2014 | Duneau | G06F 8/38 715/762 |
| 2015/0058318 A1 | 2/2015 | Blackwell et al. | |
| 2015/0123999 A1 | 5/2015 | Ofstad et al. | |
| 2015/0310855 A1 | 10/2015 | Bak et al. | |
| 2015/0379989 A1 | 12/2015 | Balasubramanian et al. | |
| 2016/0078865 A1 * | 3/2016 | Dai | G10L 15/04 704/246 |
| 2016/0232236 A1 * | 8/2016 | Vorontcov | G06F 16/338 |
| 2016/0261675 A1 | 9/2016 | Block et al. | |
| 2018/0108359 A9 | 4/2018 | Gunn et al. | |
| 2018/0300287 A1 * | 10/2018 | Okuyama | G06F 7/00 |
| 2019/0065456 A1 | 2/2019 | Platow | |
| 2020/0001263 A1 | 1/2020 | Lou et al. | |
| 2020/0274841 A1 | 8/2020 | Lee et al. | |
| 2020/0293167 A1 | 9/2020 | Blyumen | |

OTHER PUBLICATIONS

Androutsopoulos, I., Ritchie, G. D., and Thanisch, P. Natural language interfaces to databases—an introduction. Natural Language Engineering 1, Mar. 16, 1995, 50 pgs.

Aurisano, J., Kumar, A., Gonzales, A., Reda, K., Leigh, J., Di Eugenio, B., and Johnson, A. Show me data? observational study of a conversational interface in visual data exploration. In Poster at IEEE VIS 2015, IEEE (2015), 2 pgs.

Bostock, M., Ogievetsky, V., and Heer, J. D3: Data-driven documents. IEEE Transactions on Visualization & Computer Graphics (Proc. InfoVis), Oct. 23, 2011, 9 pgs.

Carbonell, J. G., Boggs, W. M., Mauldin, M. L., and Anick, P. G. The xcalibur project, a natural language interface to expert systems and data bases, 1985, 5 pgs.

Cover, T. M., and Thomas, J. A. Elements of Information Theory, Wiley-Interscience, New York, NY, USA, 1991, 36 pgs.

Cox, K., Grinter, R. E., Hibino, S. L., Jagadeesan, L. J., and Mantilla, D. A multi-modal natural language interface to an information visualization environment. International Journal of Speech Technology 4, 3 (2001), 18 pgs.

Egenhofer, M. Spatial sql: A query and presentation language. IEEE Transactions on Knowledge and Data Engineering 6, 1 (1994), 12 pgs.

Finin, T., Joshi, A. K., and Webber, B. Natural language interactions with artificial experts. Proceedings of the IEEE 74, 7 (Jun. 1986), 19 pgs.

Frank, A. U., and Mark, D. M. Language issues for geographical information systems. In Geographical Information Systems: Principles and Applications, vol. 1, D. Maguire, M. Goodchild, and D. Rhind, Eds. Longman, London, 1991, 26 pgs.

Gao, T., Dontcheva, M., Adar, E., Liu, Z., and Karahalios, K. G. Datatone: Managing ambiguity in natural language interfaces for data visualization. In Proceedings of the 28th Annual ACM Symposium on User Interface Software Technology, UIST '15, ACM (New York, NY, USA, 2015), 12 pgs.

Grammel, L., Tory, M., and Storey, M. A. How information visualization novices construct visualizations. IEEE Transactions on Visualization and Computer Graphics 16, 6 (Nov. 2010), 10 pgs.

IBM Watson Analytics. http://www.ibm.com/analytics/watson-analytics/, downloaded on May 9, 2017, 6 pgs.

Kumar et al., "Towards a Dialogue System that Supports Rich Visualizations of Data," Proceeding of the Sigdual 2016 Conference, LA, USA, ACL, Sep. 13, 2016, pp. 304-209, Xp055496498.

Lawson, I-want-to-go moments: From search to store. https://www.thinkwithgoogle.com/articles/i-want-to-go-micro-moments.html, Apr. 2015, 7 pgs.

Li, F., and Jagadish, H. V. Constructing an interactive natural language interface for relational databases. Proc. VLDB Endow. 8, 1 (Sep. 2014), 12 pgs.

Microsoft Q & A. https://powerbi.microsoft.com/en-us/documentation/powerbi-service-q-and-a/, Mar. 14, 2017, 5 pgs.

Montello, D., Goodchild, M., Gottsegen, J., and Fohl, P. Where's downtown? behavioral methods for determining referents for vague spatial queries. Spatial Cognition and Computation 3, 2&3 (2003), 20 pgs.

Narrative Science, Turn your data into better decisions with Quill, https://www.narrativescience.com/quill, downloaded on May 9, 2017, 12 pgs.

Ng, H. T., and Zelle, J. Corpus-based approaches to semantic interpretation in natural language processing. AI Magazine Winter 1997, (1997), 20 pgs.

Node.js®. https://nodejs.org/, downloaded on May 10, 2017, 1 pg.

Oviatt, S., and Cohen, P. Perceptual user interfaces: Multimodal interfaces that process what comes naturally. Commun, ACM 43, 3 (Mar. 2000), 9 pgs.

Parr, T. The Definitive ANTLR 4 Reference, 2nd ed. Pragmatic Bookshelf, 2013, 322 pgs.

(56) References Cited

OTHER PUBLICATIONS

Pedersen, T., Patwardhan, S., and Michelizzi, J. Wordnet: similarity: Measuring the relatedness of concepts. In Demonstration Papers at HLT-NAACL 2004, HLT-NAACL—Demonstrations '04, Association for Computational Linguistics (Stroudsburg, PA, USA, 2004), 2 pgs.

Popescu, A.-M., Etzioni, O., and Kautz, H. Towards a theory of natural language interfaces to databases. In Proceedings of the 8th International Conference on Intelligent User Interfaces, IUI '03, ACM (New York, NY, USA, 2003), 9 pgs.

Pustejovsky, J., Castano, J., Ingria, R., Sauri, R., Gaizauskas, R., Setzer, A., and Katz, G. Timeml: Robust specification of vvent and temporal expressions in text. In in Fifth International Workshop on Computational Semantics (IWCS-5 (2003), 7 pgs.

Reinhart, T. Pragmatics and Linguistics: An Analysis of Sentence Topics. IU Linguistics Club publications. Reproduced by the Indiana University Linguistics Club, 1982, 5 pgs.

Setlur, Pre-Interview First Office Action dated Jul. 5, 2018, received in U.S. Appl. No. 15/486,265, 5 pgs.

Setlur, First Action Interview Office Action dated Aug. 29, 2018, received in U.S. Appl. No. 15/486,265, 6 pgs.

Setlur, Final Office Action dated Apr. 25, 2019, received in U.S. Appl. No. 15/486,265, 15 pgs.

Setlur, Notice of Allowance dated Sep. 6, 2019, received in U.S. Appl. No. 15/486,265, 13 pgs.

Setlur, Pre-Interview First Office Action dated Sep. 6, 2019, received in U.S. Appl. No. 15/804,991, 4 pgs.

Setlur, First Action Interview Office Action dated Oct. 29, 2019, received in U.S. Appl. No. 15/804,991, 6 pgs.

Setlur, Final Office Action dated Mar. 4, 2020, received in U.S. Appl. No. 15/804,991, 14 pgs.

Setlur, Notice of Allowance dated Jul. 1, 2020, received in U.S. Appl. No. 15/804,991, 15 pgs.

Setlur et al., Eviza: A Natural Language Interface for Visual Analysis, ACM Oct. 16, 2016, 13 pgs.

Setlur, Preinterview 1st Office Action, U.S. Appl. No. 15/978,062, dated Mar. 6, 2020, 4 pgs.

Setlur, Notice of Allowance, U.S. Appl. No. 15/978,062, dated May 29, 2020, 19 pgs.

Setlur, Office Action, U.S. Appl. No. 15/978,066, dated Mar. 18, 2020, 23 pgs.

Setlur, Final Office Action, U.S. Appl. No. 15/978,066, dated Aug. 19, 2020, 22 pgs.

Setlur, Notice of Allowance, U.S. Appl. No. 15/978,066, dated Jan. 22, 2021, 22 pgs.

Setlur, Office Action, U.S. Appl. No. 15/978,067, dated Feb. 21, 2020, 20 pgs.

Setlur, Final Office Action, U.S. Appl. No. 15/978,067, dated Aug. 5, 2020, 19 pgs.

Setlur, Notice of Allowance, U.S. Appl. No. 15/978,067, dated Feb. 9, 2021, 16 pgs.

Sun, Y., L. J. J. A., and Di Eugenio, B. Articulate: Creating meaningful visualizations from natural language. In Innovative Approaches of Data Visualization and Visual Analytics, IGI Global, Hershey, PA (2014), 20 pgs.

Tableau, Communication Pursuant to Rules 161(1) and 162, EP18729514.2, dated Jun. 17, 2019, 3 pgs.

Tableau, Extended European Search Report, EP18729514.2, dated Mar. 4, 2020, 4 pgs.

Tableau Software, Inc., International Searh Report and Written Opinion, PCT/US2018/030959, dated Sep. 14, 2018, 13 pgs.

Tableau Software, Inc., International Preliminary Report on Patentability, PCT/US2018/030959, dated Nov. 5, 2019, 11 pgs.

ThoughtSpot. Search-Driven Analytics for Humans, http://www.thoughtspot.com/, downloaded May 9, 2017, 9 pgs.

Turf: Advanced geospatial analysis for browsers and node, http://turljs.org, downloaded May 9, 2017, 2 pgs.

Wikipedia, Extended Backus-Naur Form, https://en.wikipedia.org/wiki/Extended_Backus%E2%80%93Naur_Form, last edited on Jan. 7, 2017, 7 pgs.

Winograd, T. Procedures as a Representation for Data in a Computer Program for Understanding Natural Language. PhD thesis, Feb. 1971, 472 pgs.

WolframAlpha. Profesional-grade computational, https://www.wolframalpha.com/, downloaded May 9, 2017, 25 pgs.

Wu, Z., and Palmer, M. Verbs semantics and lexical selection. In Proceedings of the 32nd Annual Meeting on Association for Computational Linguistics, ACL '94, Association for Computational Linguistics (Stroudsburg, PA, USA, 1994), 6 pgs.

* cited by examiner

| Type | Examples |
|---|---|
| Search | Where is Texas? |
| Filter | Show Africa only |
| Extremum & Top N | Show me the country with the largest outbreaks<br>Top 3 countries |
| Navigate | Zoom in to Italy |
| Sort | Sort by average unemployment |
| Formatting | Show y-axis label |
| Change chart type | Can I see this on a map |
| Grouping | Combine Sat and Sun |
| Compare | Patterns of New York versus California |
| Calcs & Stats | What's the nationwide total?<br>Are there any outliers? |
| Reference lines | What is the best trend line for this plot? |
| Analytics and trends | Is there a seasonal trend for bike usage? |

USING NATURAL LANGUAGE PROCESSING FOR VISUAL ANALYSIS OF A DATA SET

RELATED APPLICATIONS

This application is a continuation of U.S. patent application Ser. No. 15/486,265, filed Apr. 12, 2017, entitled "Systems and Methods of Using Natural Language Processing for Visual Analysis of a Data Set," which (i) claims priority to U.S. Provisional Patent Application No. 62/321, 695, filed Apr. 12, 2016, entitled "Using Natural Language Processing for Visual Analysis of a Data Set" and (ii) claims priority to U.S. Provisional Application No. 62/418,052, filed Nov. 4, 2016, entitled "Using Natural Language Processing for Visual Analysis of a Data Set," each of which is incorporated by reference herein in its entirety.

This application is related to U.S. Pat. No. 9,183,235, filed Mar. 3, 2015, which is incorporated by reference herein in its entirety.

TECHNICAL FIELD

The disclosed implementations relate generally to data visualization and more specifically to systems, methods, and user interfaces that enable users to interact with and explore datasets using a natural language interface.

BACKGROUND

Data visualization applications enable a user to understand a dataset visually, including distribution, trends, outliers, and other factors that are important to making business decisions. Some datasets are very large or complex, and include many data fields. Various tools can be used to help understand and analyze the data, including dashboards that have multiple data visualizations. However, some functionality may be difficult to use or hard to find within a complex user interface.

SUMMARY

Accordingly, there is a need for tools that allow users to effectively utilize functionality provided by data visualization applications. One solution to the problem is providing a natural language interface as part of a data visualization application (e.g., within the user interface for the data visualization application). The natural language interface allows users to access complex functionality using ordinary questions or commands. In this way, the natural language interface allows users to efficiently explore data displayed (e.g., in a data visualization) within the data visualization application.

In accordance with some implementations, a method executes at an electronic device with a display. For example, the electronic device can be a smart phone, a tablet, a notebook computer, or a desktop computer. The device displays a data visualization based on a dataset retrieved from a database using a set of one or more queries. A user specifies a natural language command related to the displayed data visualization. Based on the displayed data visualization, the device extracts one or more independent analytic phrases from the natural language command. The device then requeries the database using an updated set of one or more queries based on the extracted analytic phrases, thereby retrieving an updated dataset and displaying an updated data visualization using the updated dataset. In some instances, requerying the database is performed locally at the computing device using cached or stored data at the computing device. For example, requerying is commonly performed locally when the natural language command specifies one or more filters.

In some implementations, the user specifies the natural language command as text input in a data-entry region on the display in proximity to the displayed data visualization. In some implementations, the user can use a voice command using a microphone coupled to the electronic device. In some instances, a first portion of the natural language command is specified as a voice command and a second portion is specified as text input from the user (or vice versa). In some implementations, a first command is specified by voice, and one or more subsequent commands are specified using textual input. Note that previous commands can be modified to create new commands. In some instances, a user enters a voice command, and a textual transcription of the command is displayed. The user can then edit that text to create a new command.

In some implementations, the analytic phrases include one or more filter commands, and the updated data visualization is based on data corresponding to the one or more filter commands. A filter command limits the display of data based on data values for one or more of the data fields. For example, as illustrated in FIG. 3C, a database of earthquakes can be limited to just the earthquakes above a certain magnitude. Two or more filter conditions can be applied simultaneously.

In some implementations, the analytic phrases include one or more commands that are not filters, and the updated data visualization is based on these commands. For example, the commands may specify a change of color or shade for the data marks, a change of shape for the data marks, or rearrangement of the data marks (e.g., sorting).

In some implementations, a first analytic phrase of the extracted analytic phrases is a parameterized data selection criterion. See, e.g., FIGS. 3B-3H. Moreover, in some implementations, requerying the database includes selecting initial values for parameters of the parameterized data selection criterion.

As illustrated in FIGS. 3B-3H, some implementations display an editable user interface control corresponding to the parameterized data selection criterion. The user interface control displays the current values of the parameters. In some instances, the user uses a user interface control, thereby specifying a modified range for a first parameter of the data selection criterion. The data visualization is then updated based on the modified range for the first parameter.

In some implementations, the method further comprises iterating the steps of receiving, extracting, requerying, and displaying a plurality of times. As an analyst learns more about the underlying data, the analyst develops new questions, so the process is typically iterative.

In some implementations, the natural language command is a question, as illustrated in FIGS. 3B-3H.

Typically, a computing device includes one or more processors, memory, a display, and one or more programs stored in the memory. The programs are configured for execution by the one or more processors. The one or more programs include instructions for performing any of the methods described herein.

In some implementations, a non-transitory computer readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily explore their data, using data visualizations and a natural language interface.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 10 is a table listing various types of natural language commands, including examples for each of the listed types.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
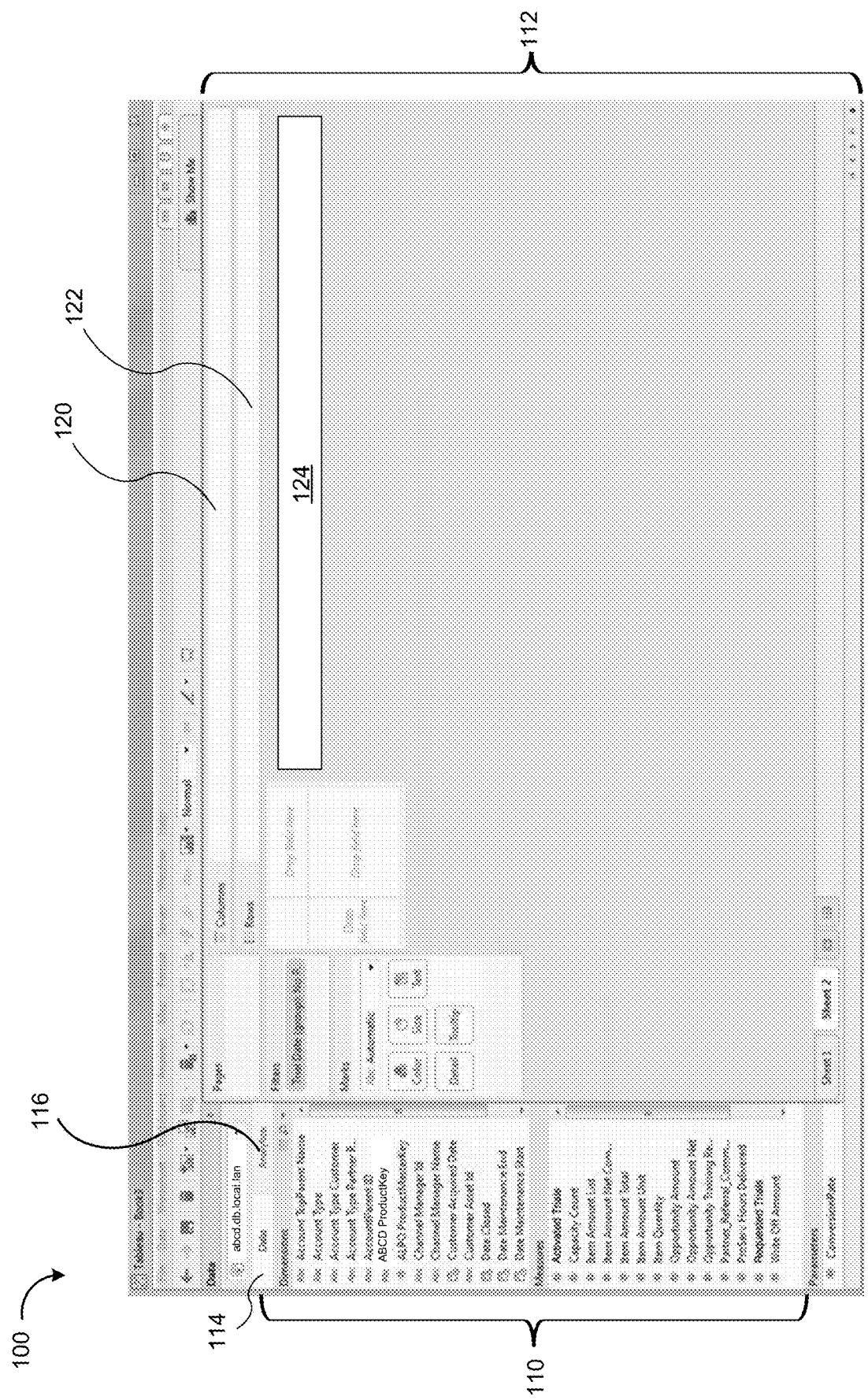
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets.

In some implementations, the graphical user interface 100 also includes a natural language processing region 124. The natural language processing region 124 includes an input bar (also referred to herein as a command bar) for receiving natural language commands. A user may interact with the input bar to provide commands. For example, the user may type the command in the input bar to provide the command. In addition, the user may indirectly interact with the input bar by speaking into a microphone (e.g., audio input device 220) to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language processing region 124) to further explore the displayed data visualization. In some instances, a user creates the initial association using the natural language processing region 124, which results in one or more data elements being placed in the column shelf 120 and the row shelf 122. For example, the user may provide a command to create a relationship between data element X and data element Y. In response to receiving the command, the column shelf 120 and the row shelf 122 may be populated with the data elements (e.g., the column shelf 120 may be populated with data element X and the row shelf 122 may be populated with data element Y, or vice versa).

Figure 2:
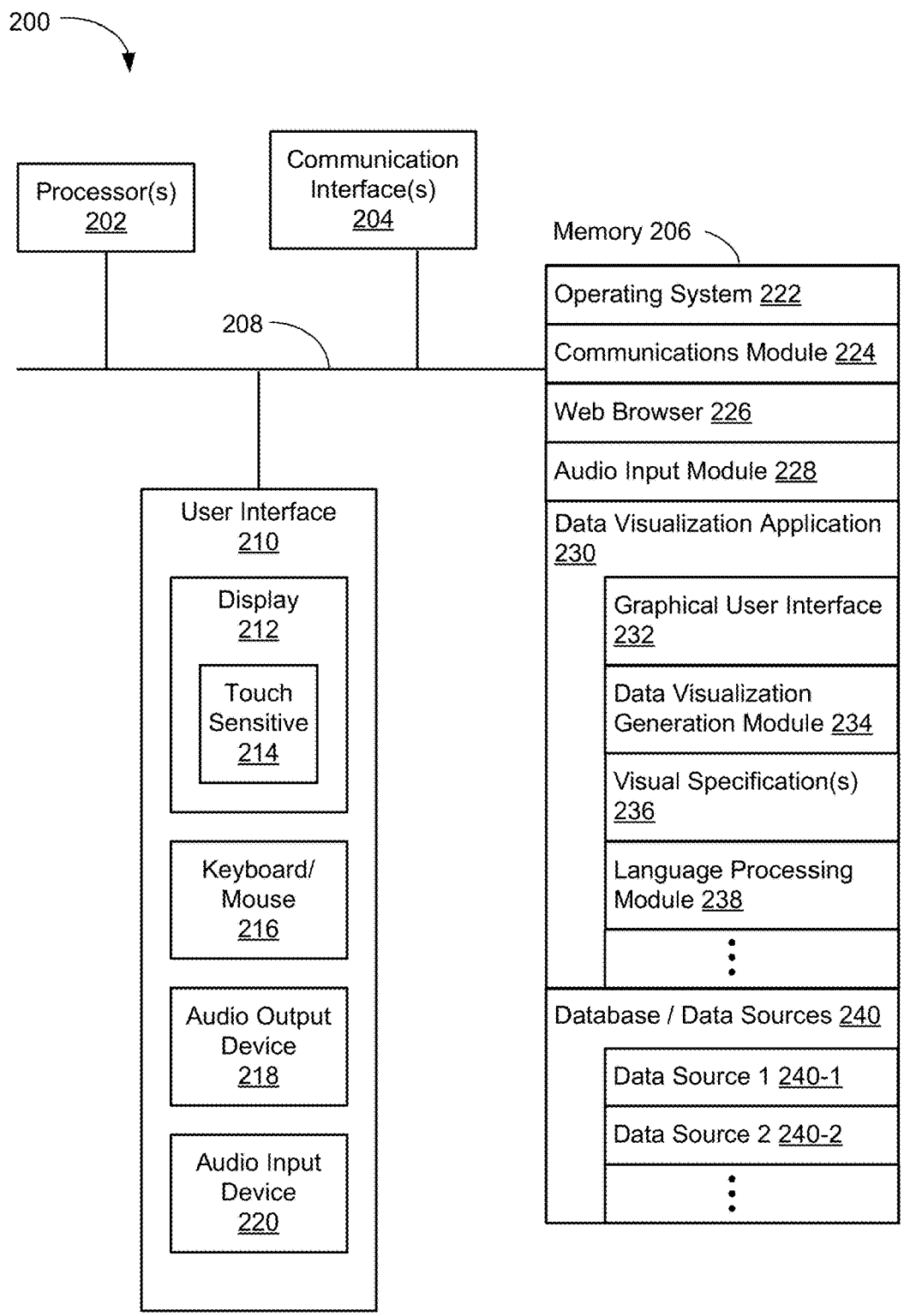
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. Optionally, the computing device 200 includes an audio input device 220 (e.g., a microphone) to capture audio (e.g., speech from a user).

The memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 306 includes one or more storage devices remotely located from the processor(s) 202. The memory 206, or alternately the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. The application 230 includes a graphical user interface 232 (e.g., the graphical user interface 100 illustrated in FIG. 1) for a user to construct visual graphics. For example, a user selects one or more data sources 240 (which may be stored on the computing device 200 or stored remotely), selects data fields from the data source(s), and uses the selected fields to define a visual graphic;
- zero or more databases or data sources 240 (e.g., a first data source 240-1 and a second data source 240-2), which are used by the data visualization application 230. In some implementations, the data sources are stored as spreadsheet files, CSV files, XML files, or flat files, or stored in a relational database.

In some implementations, the data visualization application 230 includes a data visualization generation module 234, which takes user input (e.g., a visual specification 236), and generates a corresponding visual graphic. The data visualization application 230 then displays the generated visual graphic in the user interface 232. In some implementations, the data visualization application 230 executes as a standalone application (e.g., a desktop application). In some implementations, the data visualization application 230 executes within the web browser 226 or another application using web pages provided by a web server (e.g., a server based application).

In some implementations, the information the user provides (e.g., user input) is stored as a visual specification 236. In some implementations, the visual specification 236 includes previous natural language commands received from a user or properties specified by the user through natural language commands.

In some implementations, the data visualization application 230 includes a language processing module 238 for processing (e.g., interpreting) commands provided by a user of the computing device. In some implementations, the commands are natural language commands (e.g., captured by the audio input device 220). In some implementations, the language processing module 238 includes sub-modules such as an autocomplete module, a pragmatics module, and an ambiguity module, each of which is discussed in further detail below.

In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric (discussed in detail below) for an analytic word/phrase of a received command. Then, the language processing module 238 may compare the relatedness metric against a threshold stored in the memory 206.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

FIGS. 3A-3J illustrate graphical user interfaces for interactive data analysis using natural language processing. FIGS. 3A-3J illustrate how natural language processing can be used to explore a data set. For example, natural language processing allows users to communicate naturally with a computing device (e.g., a computing device 200) in order to explore the data (e.g., communicate via a microphone of the computing device and/or via text). The computing device analyzes commands (also referred to as queries, natural language questions, or natural language commands) received from the user to determine a meaning of the command (e.g., determine a relationship between the command and the data set). In this way, the user is not restricted to a regimented set of commands. Instead the user may pose informal questions related to the data visualization that may be interpreted by the computing device on the fly. For example, a command may vaguely state "show me when it's hot" and the computing device highlights portions of an existing data visualization (e.g., a data visualization showing temperatures across California in 2015, where temperatures are above a certain threshold).

Figure 3A:
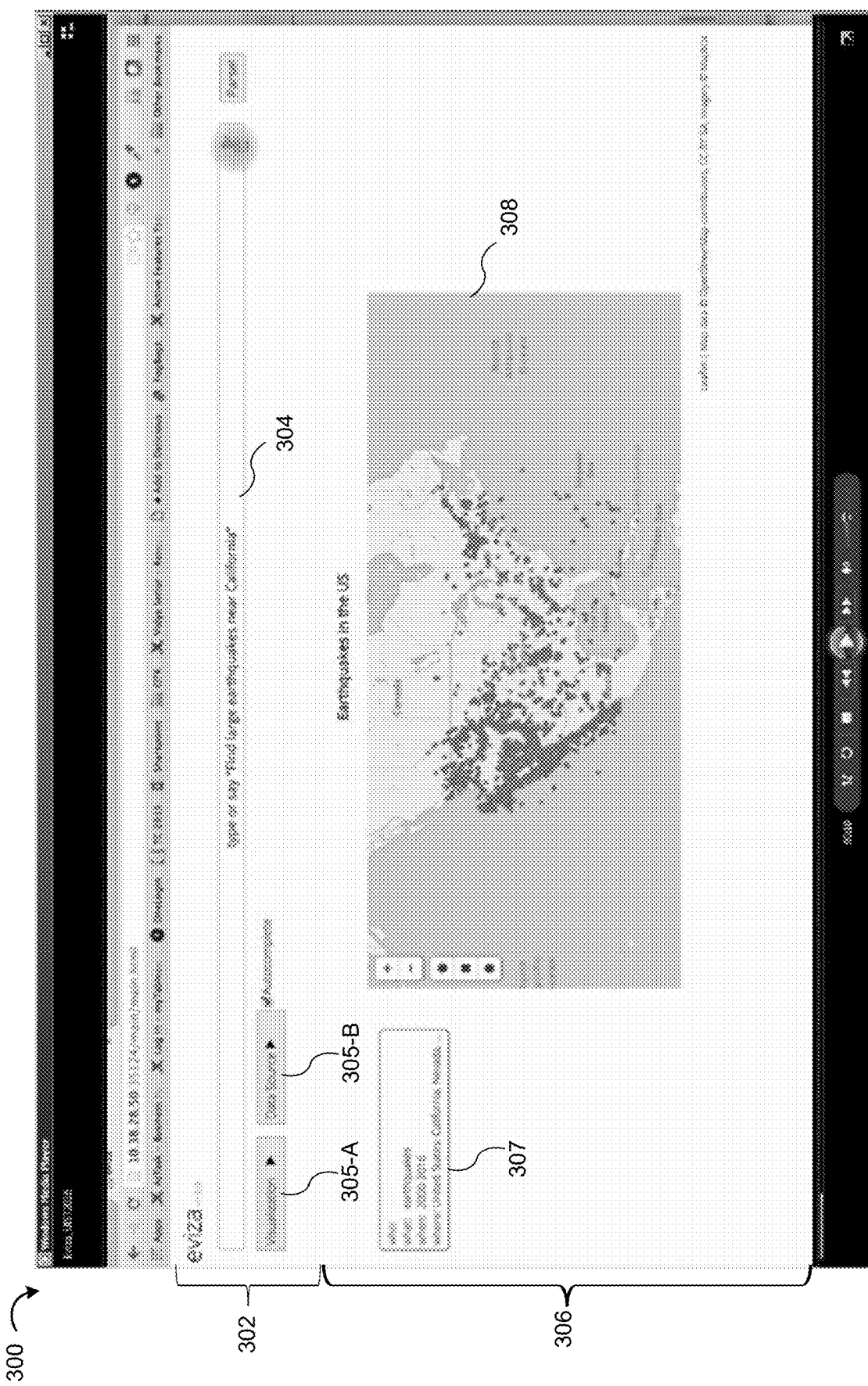
FIGS. 3A-3J illustrate graphical user interfaces for interactive data analysis using natural language processing in a data visualization application displayed on a computing device according to some implementations.

Referring to FIG. 3A, the graphical user interface 300 includes a natural language processing region 302. The natural language processing region 302 is an example of the natural language processing region 124 in FIG. 1. In some implementations, a user interacts with a command bar 304 (also referred to herein as an input bar) in the natural language processing region 302 to provide a command, as discussed above in FIG. 1. In addition, the natural language processing region 302 may include one or more drop-down menus (e.g., drop-down menus 305-A and 305-B) that enable the user to choose a visualization type (e.g., map, line chart, bar chart, or scatter plot) and a data source (e.g., select a first dataset and a second dataset).

The graphical user interface 300 also includes a data visualization region 306. The data visualization region 306 is an example of the data visualization region 112 illustrated in FIG. 1. As shown, the data visualization region 306 includes an area for displaying a data visualization 308. In some implementations, the data visualization region 306 includes an information pane 307, which includes information about the data visualization 308. For example, the information pane 307 in FIG. 3A includes "what: earthquakes," "when: 2000-2016," and "where: United States." Although a single data visualization 308 is shown in FIG. 3A, in some implementations, a plurality of distinct data visualizations is displayed in the data visualization region 306, depending on inputs received from the user.

To illustrate display of the data visualization 308, a user may associate one or more data elements (also referred to as attributes, data fields, or simply, fields) from a schema information region (e.g., the schema information region 110 in FIG. 1) with one or more shelves in the data visualization region 306 (e.g., the column shelf 120 and the row shelf 122). In response to receiving the user associations, the application 230 queries the database using a set of queries corresponding to the received user associations, and then displays a data visualization 308 in the data visualization region 306 using the data retrieved (e.g., the X-axis is associated with a first field in the column shelf 120 and the Y-axis is associated with a second field in the row shelf 122). Although not shown, in some implementations, the graphical user interface 300 in FIG. 3A is integrated with the graphical user interface 100 in FIG. 1.

After displaying the data visualization 308, the application 230 may process additional commands received in the natural language processing region 302. For example, the user may input one or more commands (e.g., queries) related to the displayed data visualization 308. The application 230, upon receiving the one or more commands from the user, requeries the database using an updated set of queries corresponding to the received commands and updates the displayed data visualization 308 (e.g., filter the data, add data fields, highlight specific data marks, or insert statistical tools) using the data retrieved. In some instances, requerying the database is performed locally at the computing device using cached or stored data at the computing device. For example, requerying is commonly performed locally when the natural language command specifies one or more filters.

Natural language commonly includes ambiguity, which comes in various forms. For example, a command may include a syntactic ambiguity, which involves syntactic differences between a command and the data set (e.g., spelling, plurality variations, or abbreviations). Syntactic ambiguities are discussed in further detail with reference to FIG. 7.

A command may include a semantic ambiguity. A semantic ambiguity concerns differences in semantic alignment between the command and data fields of the underlying analytical functions in the data visualization. In these circumstances, to resolve the semantic ambiguity, the language processing module 238 extracts key words and/or analytic phrases from the command, and then compares those key words or phrases with one or more data fields in the dataset. Typically, a phrase with semantic ambiguity is translated into a parameterized data selection criterion, which includes both a data field from the data set and one or more parameter values to define a range.

To further illustrate, referring to FIG. 3A, the displayed data visualization 308 concerns earthquakes in the United States between years 2000 and 2016. The information pane 307 identifies what data is included in the data visualization 308. The user types the command "Find large earthquakes near California" in the command bar 304 (or speaks the command). Upon receiving the command, the language processing module 238 determines that "large earthquakes" does not semantically align with attributes of the displayed data visualization 308. Consequently, the language processing module 238 resolves the semantic ambiguity by mapping "large earthquakes" to at least one data field in the data set to form a parameterized data selection criterion.

The language processing module 238 determines relatedness metrics between the ambiguous words/phrases in the command and respective data fields in the dataset (e.g., using hyponymy or synonymy between two words). For example, the language module 238 determines a relatedness metric between "large earthquakes" and a data field (e.g., "magnitude") in the dataset. When the relatedness metric for a particular data field is sufficiently high (e.g., exceeds a predefined relatedness threshold and/or is greater than the relatedness metric for the other data fields in the data set) the language module 238 maps the ambiguous word/phrase to the particular data field. Having determined that "large earthquakes" relates to the data field "magnitude" in the data set, the language module 238 also needs to specify a parameter value to determine what is "large." This is described in more detail below.

In some implementations, the language module 238 categorizes components of the command to aid in determining relatedness between two words. For example, "large earthquakes" may be categorized as a "size" descriptor and "near California" may be categorized as a "spatial" descriptor. Once categorized, the language module 238 compares attributes and word(s)/phrase(s) from the command that fall within the same category. For example, "magnitude" may also be considered a size descriptor, and therefore magnitude is compared with "large earthquakes" because both words/phrases fall within the same category. Similarly, "distance" may be considered a spatial descriptor, and therefore distance is compared with "near California" because both words/phrases fall with the same category.

As noted above, the term "large" is ambiguous. To address this type of ambiguity, in some implementations, the language module 238 estimates one or more initial parameter values for the ambiguous term based on the displayed data visualization (or the dataset more generally). For example, after the term "large earthquakes" is mapped to "magnitude," the language module 238 makes an estimate for what is considered a "large" magnitude earthquake based, at least in part, on the displayed data visualization.

In some implementations, to make the estimate, the language module 238 evaluates the distribution of data values of the data field associated with the ambiguous term. For example, the language module 238 may calculate one or more statistics for the data element associated with the ambiguous term (e.g., magnitude of earthquakes). The one or more statistics may be, for example, a mean associated with the data element (e.g., a mean magnitude of earthquakes), a mode associated with the data element (e.g., a mode magnitude of earthquakes), a median associated with the data element (e.g., a medium magnitude of earthquakes), a standard deviation associated with the data element (e.g., a standard deviation of magnitudes of earthquakes), and/or a percentile associated with the data element (e.g., a percentile of magnitudes of earthquakes).

Figure 3B:
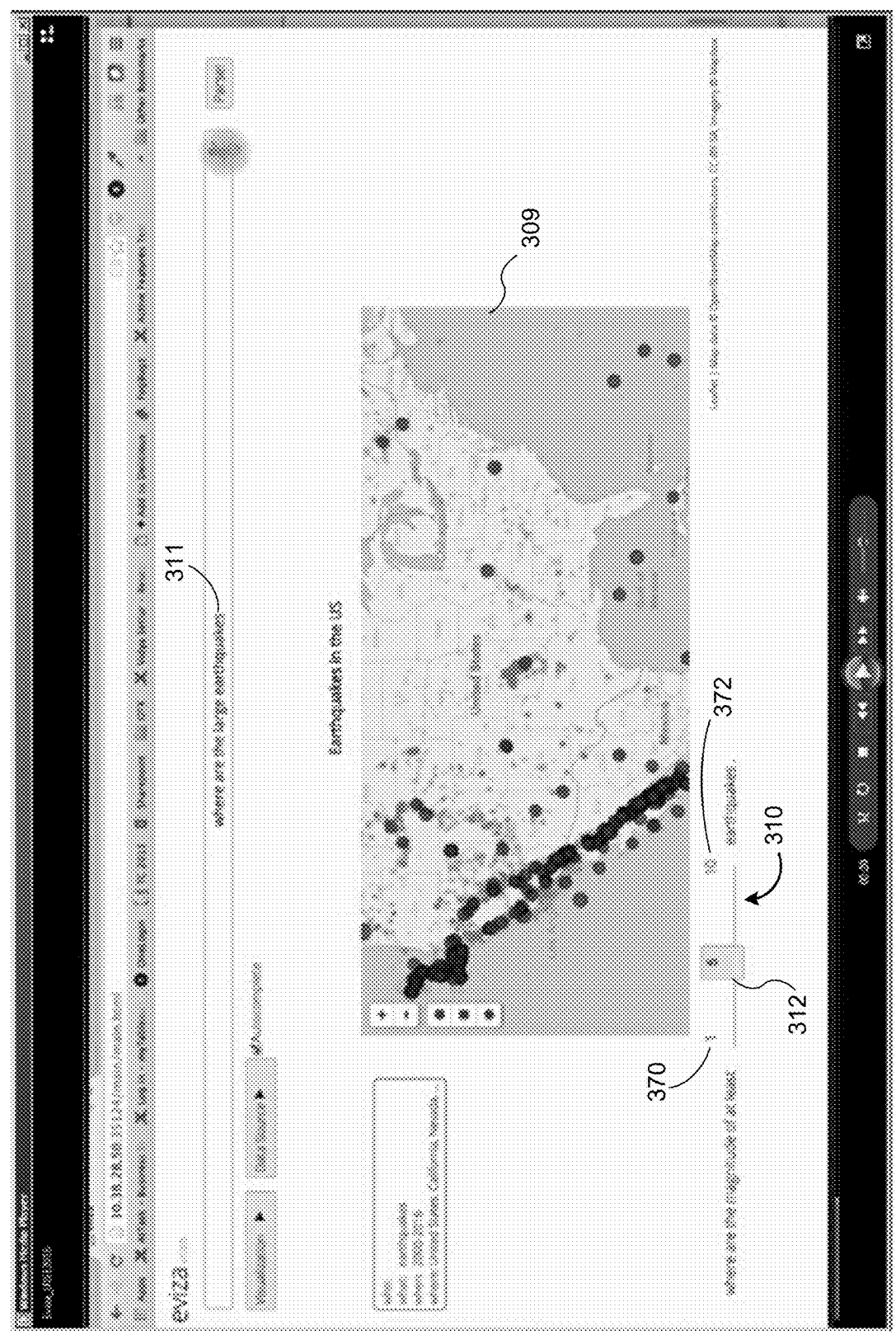

To further illustrate, FIG. 3B shows an updated version of the data visualization 309 in view of the command "where are the large earthquakes" 311 received from the user. In particular, the updated data visualization 309 displays earthquakes in the United States having magnitudes of 5 or greater on the Richter scale. The language module 238 estimates, based on one or more statistics, that a magnitude of 5 on the Richter scale is considered a "large" magnitude earthquake. As an example, the language module 238 may calculate a mean and standard deviation of magnitudes of earthquakes in the United States using the dataset and may estimate that a "large" earthquake is a specific number of standard deviations from (e.g., above) the calculated mean (e.g., set at three standard deviations above the mean, or some greater (or some lesser) number of standard deviation(s) above the mean). In another example, instead of using standard deviations from the mean, the language module 238 estimates that a "large" earthquake is a specific percentile in view of the one or more statistics (e.g., set at a 95th percentile, or some greater (or some lesser) percentile). Other potential statistical calculations may be used in determining the estimate. This estimate is then used as the initial parameter value for the parameterized data selection criterion.

Alternatively or in addition to the one or more statistics, some implementations access one or more third-party servers to make the estimate. For example, the language module 238 may query a third-party server for "what is considered a large earthquake." After receiving a response from the third-party server, the language module 238 updates the data visualization in accordance with the response (or in combination with the one or more statistics).

Figure 3C:
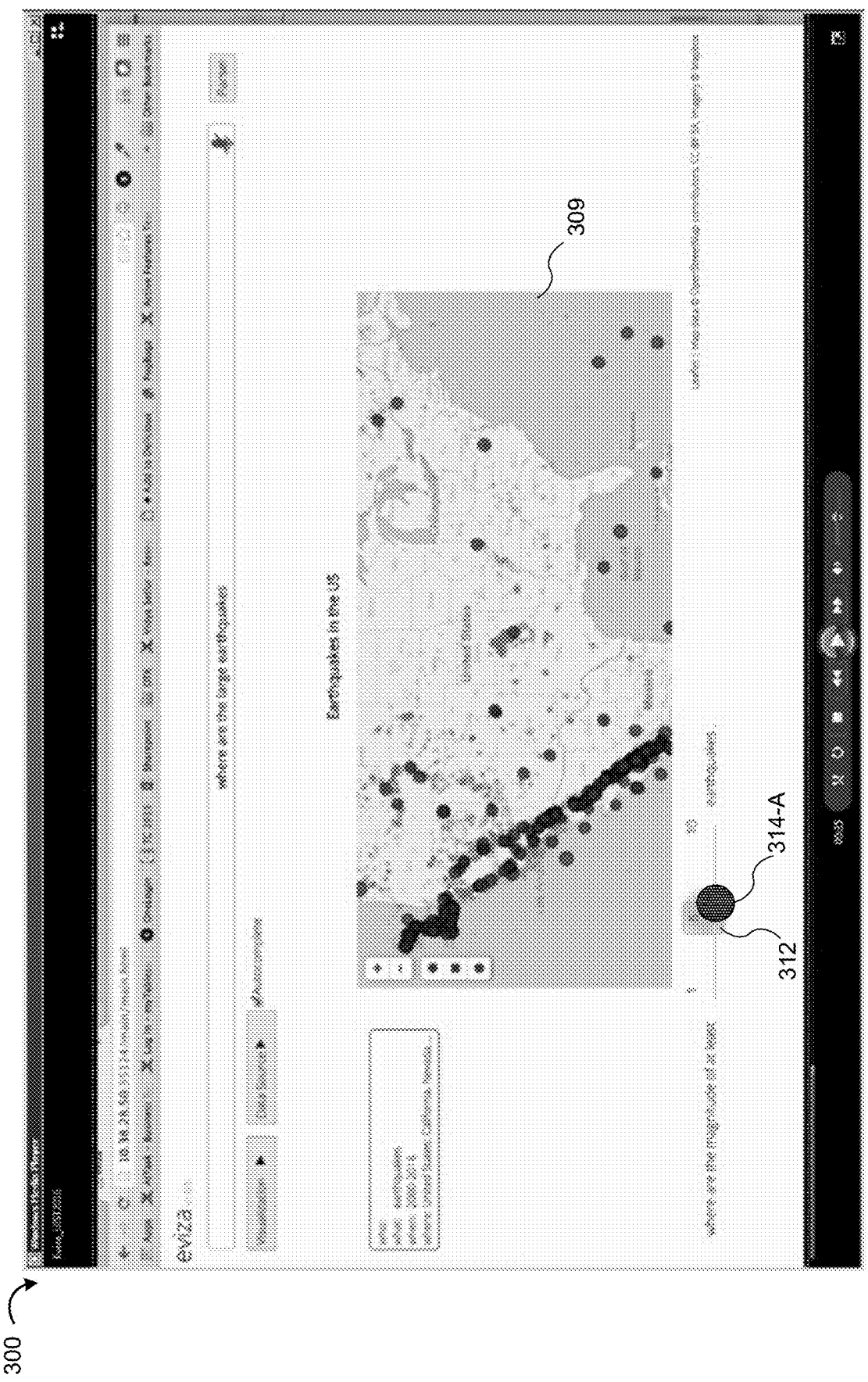
Figure 3D:
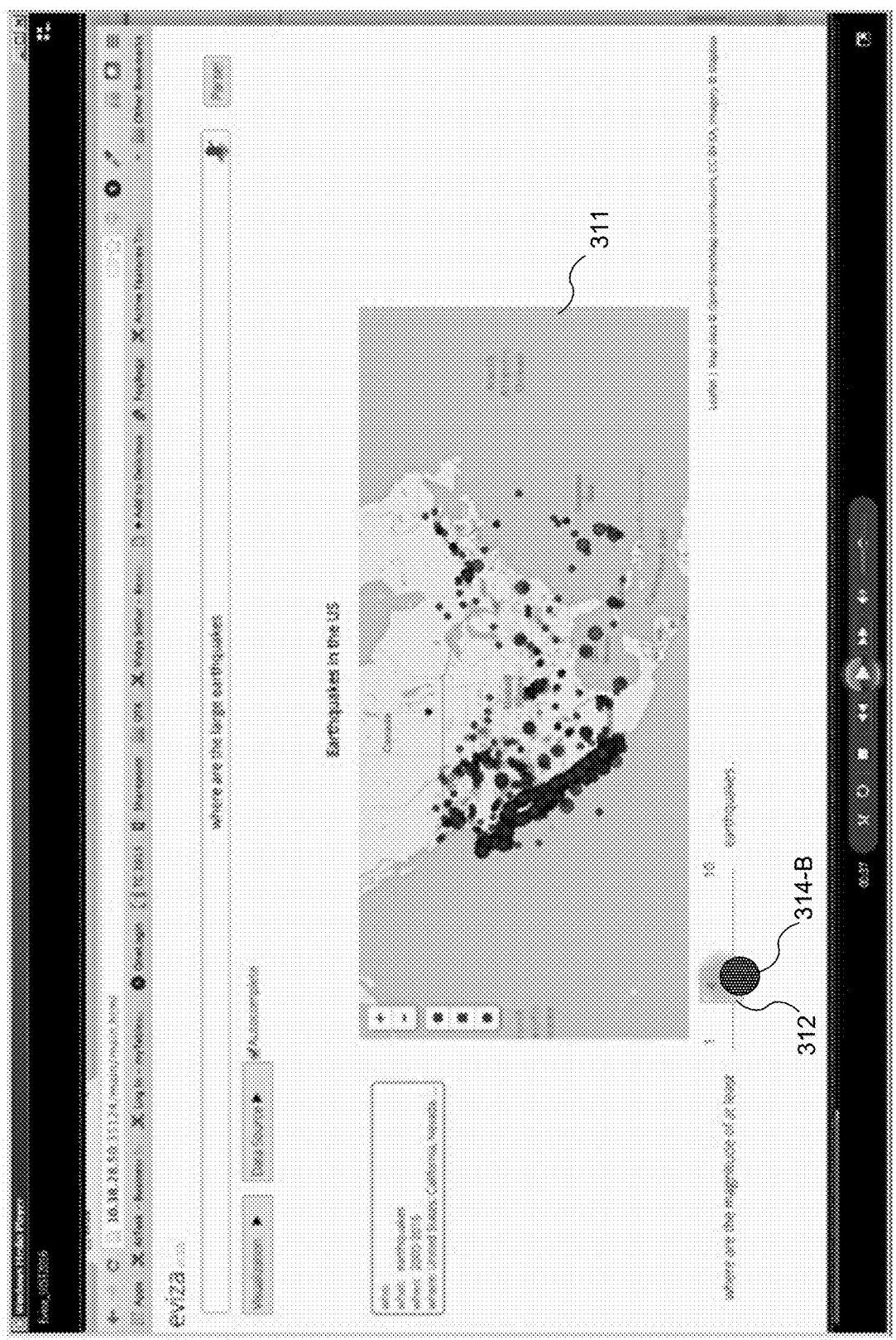
Figure 3E:
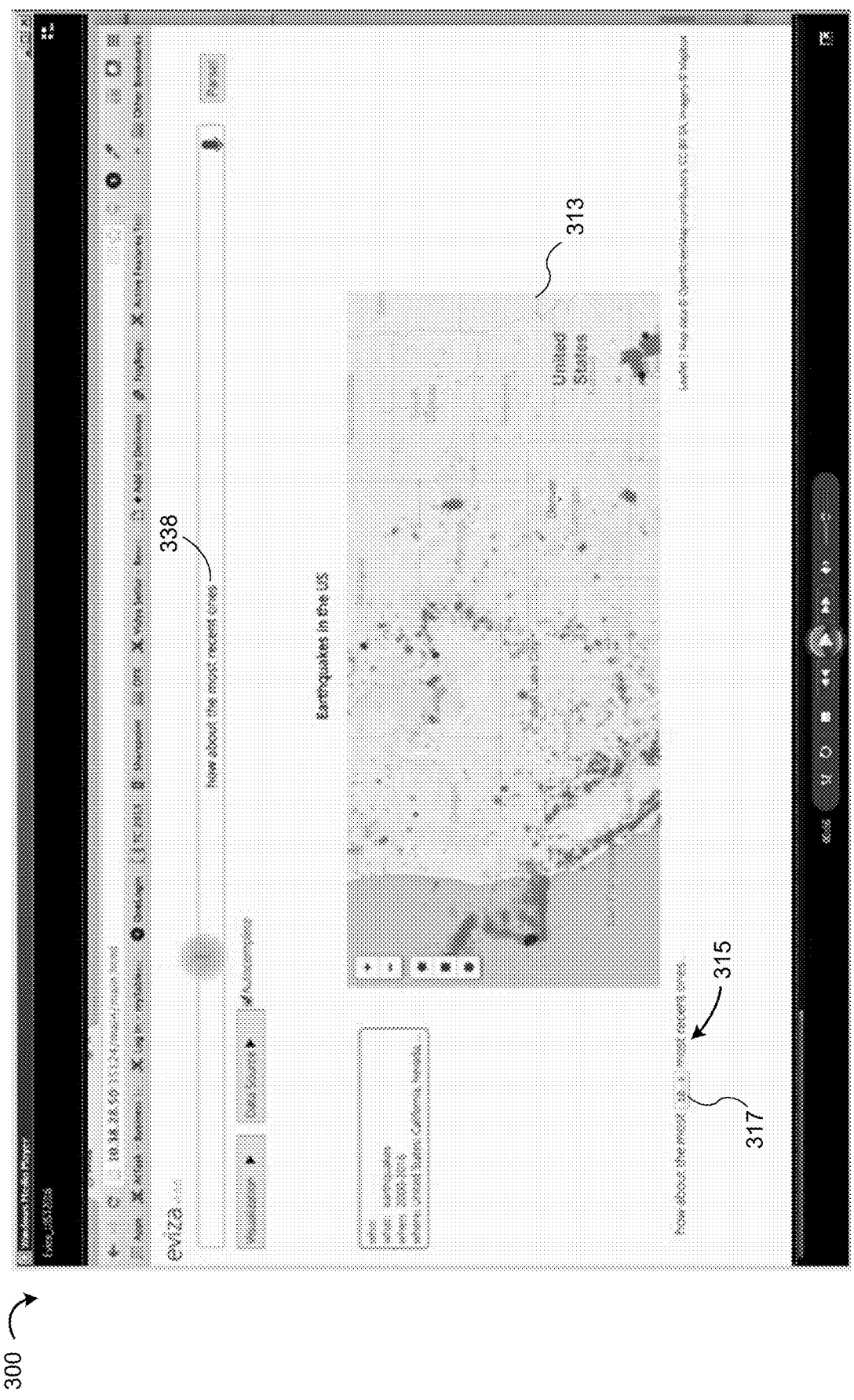
Figure 3F:
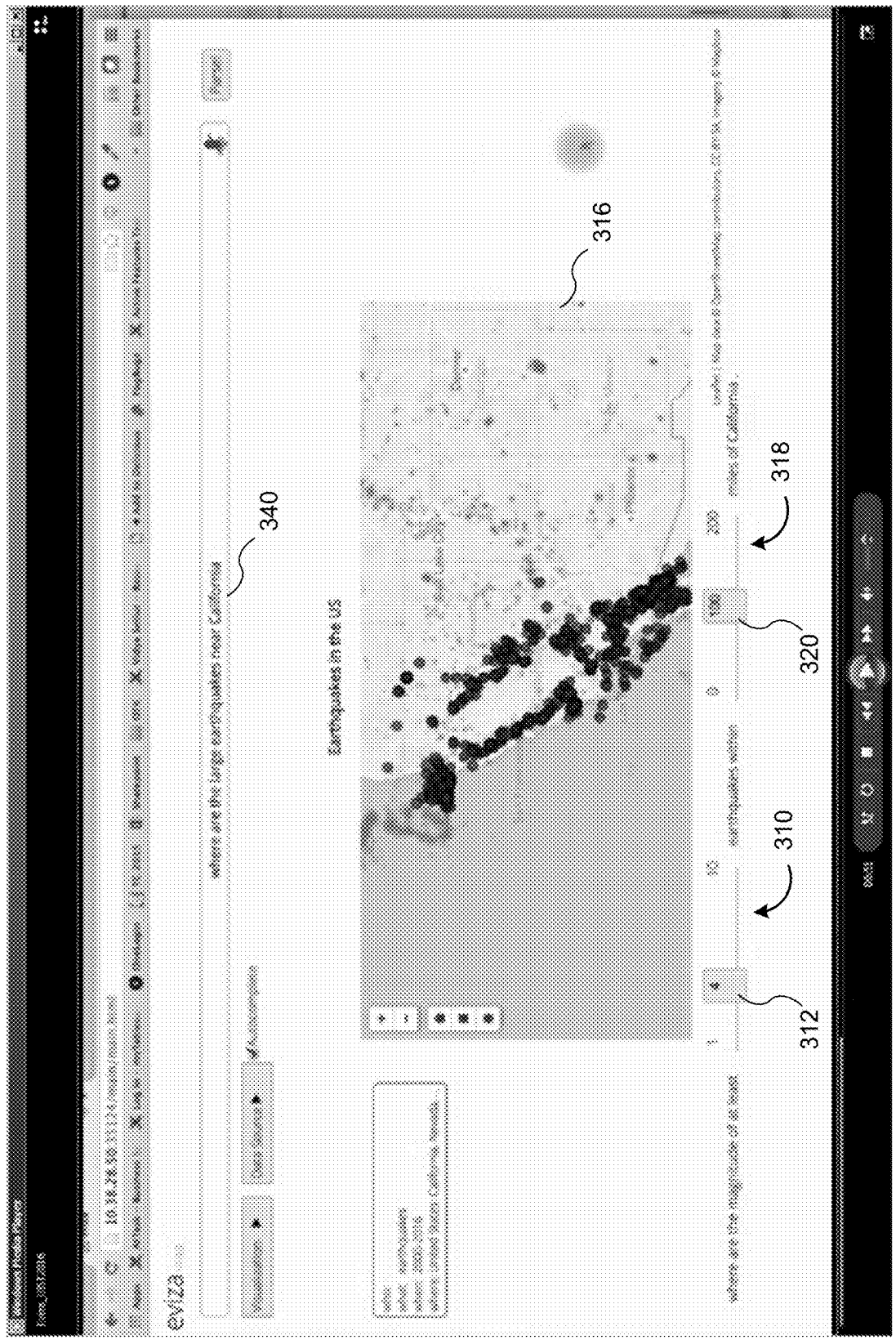

In some implementations, the parameterized data selection criterion is displayed visually in the data visualization region 306 as a user control interface 310 (also referred to as an ambiguity widget or an editable user interface control). The user can then update the parameter value using the control 310. In some implementations, the data visualization updates in real-time (or nearly real-time) as the parameter is adjusted. In some implementations, the language module 238 generates the user control interface 310 in response to determining that the command includes one or more ambiguities. The user control interface 310 is typically associated with a data field (e.g., "magnitude"). Initial values (e.g., range or starting position) for parameters associated with user control interface 310 use the estimates described above. For example, the starting value (e.g., 5) is the estimate the language module 238 made for what is considered to be a "large" magnitude earthquake. The user control interface 310 includes one or more affordances to edit the parameter value(s). In some implementations, the affordance 312 is one or more buttons (e.g., increase and decrease buttons 316 as shown in FIG. 3E). In some implementations, the affordance is a slider bar (e.g., a slider bar 312 as illustrated in FIGS. 3C and 3D). In some implementations, the affordance 312 is a drop-down menu (e.g., as illustrated in FIG. 4B).

In some implementations, the user control interface 310 identifies the full range of possible values for the parameter, such as the lower limit 370 and the upper limit 372. In some implementations, the range displayed is based on an actual range (e.g., statistical range) for the particular data field. In some implementations, one or more sides of the range extend beyond the actual range. For example, the upper limit 372 is listed as "10" even though the largest measured earthquake in the United States had a magnitude of 9.2.

In some implementations, a user interacts with the affordance 312 of the user control interface 310 to modify the data visualization 309. For example, the user may interact with the affordance 312 (e.g., click or touch) by adjusting (e.g., sliding) the affordance 312 from a first position (or a first value) to a second position (or a second value). To illustrate, referring to FIG. 3C, the data visualization 309 is displayed. The data visualization 309 displays earthquakes in the United States having magnitudes between 5 and 10 on the Richter scale. As shown, the user selects (314-A) the affordance 312 and moves the affordance 312 from 5 to 4. Now referring to FIG. 3D, in response to the movement of the affordance and its release (314-B), an updated data visualization 311 is displayed. Now, earthquakes having magnitudes between 4 and 10 on the Richter scale are displayed in the updated data visualization 311.

As another example, now referring to FIG. 3E, the user speaks (or types) the command "how about the most recent ones" 338 in the command bar 304. The language module 238 maps "recent ones" to a data field in the dataset (e.g., "time") to resolve the semantic ambiguity, as discussed above. In addition, "recent" is an ambiguous term, which could mean within the past day, the past month, or the past year. The data visualization region 306 includes a different user control interface 315, thereby allowing the user to edit display of the data visualization 313. One technique to identify the "recent ones" is to select an initial value for a time parameter (e.g., 30 days ago), and compare the time for each earthquake in the data set against the parameter value to filter what is displayed. FIG. 3E, however, illustrates an alternative. Rather than selecting a specific time threshold, a count of data records to view is specified. To find the most recent ones, the data records in the data set are ordered by time, and the top ten are selected. The user control interface 315 includes an affordance 317 that allows the user to change how many records are included in the "most recent" (e.g., the 20 most recent earthquakes).

In some instances, two or more user control interfaces are displayed in the data visualization region 306 corresponding to the number of ambiguities present in the command. For example, referring to FIG. 3F, the command 340 presents two ambiguities: "large earthquakes," (discussed above with reference to FIGS. 3B-3D) and "near California." The data visualization region 306 includes a first user control interface 310 (discussed above) and a second user control interface 318. The second user control interface 318 includes an affordance 320 that modifies the data visualization 316. For example, a user may interact with the affordance 320, which changes the geographic distribution of displayed marks in the data visualization 316. For example, the user may increase (or decease) the distance for what is considered "near" (e.g., 50 miles).

As above, the language module 238 estimates one or more initial values each the ambiguous term based on the displayed data visualization (or the dataset more generally). For example, the language module 238 may estimate a distance (e.g., X number of miles) that encompasses earthquakes in/near California. In some implementations, in making the estimate, the language module 238 may determine one or more statistics for the data element associated with the ambiguity (as discussed above with reference to FIGS. 3B-3D). Alternatively, in some implementations, the language module 238 has predefined initial values for some data fields (e.g., based on prior usage by the same or a different person), and may select one of the values according to the situation. Typically, the magnitude of the selected value depends on the data in the data field. For example, a first value (e.g., blocks or yards) may be selected when a first data field is being analyzed (e.g., neighborhoods in a particular city), whereas a second value (e.g., miles) may be selected when a second data field is being analyzed (e.g., distances outside the border of a state).

In some implementations, the predefined values are updated according to tracked user interaction with a user control interface. For example, a specific predefined value may be modified (adjusted up or down) if users typically increase (or decrease) the specific predefined value (e.g., users typically modify the starting position for the specific predefined value using the slider bar 320). In some implementations, the language module 238 adjusts future estimates based on tracked user interaction with a user control interface associated with previous estimates.

In some implementations, the language module 238 uses one or more previous commands to assist in analyzing a current command. In doing so, the language module 238 may map portions (e.g., one or more words and/or phrases) from the one or more previous commands to the current command. This process of referring back to previous commands, referred to herein as pragmatics, helps the language module 238 understand the intent (e.g., a meaning) of a current command. To illustrate, a user may provide a series of commands: a first command (e.g., the command 340 in FIG. 3F) results in display of data visualization 316 and a second command (e.g., the command 342 in FIG. 3G) that is related to the first command. The language module 238 may refer to portions of the first command to help understand the meaning of the second command. In some implementations, the language module 238 includes rules and templates to map portions from the one or more previous commands to the current command. Note that pragmatics typically uses very recent commands by the user. Having just asked about large earthquakes in California in FIG. 3F, an immediate question "how about near Texas" 342 is likely to mean the user is interesting in large earthquakes in Texas. If the same user had asked about small Earthquakes in Alaska last week, it is not likely to be relevant to the user's current train of thought.

Figure 3G:
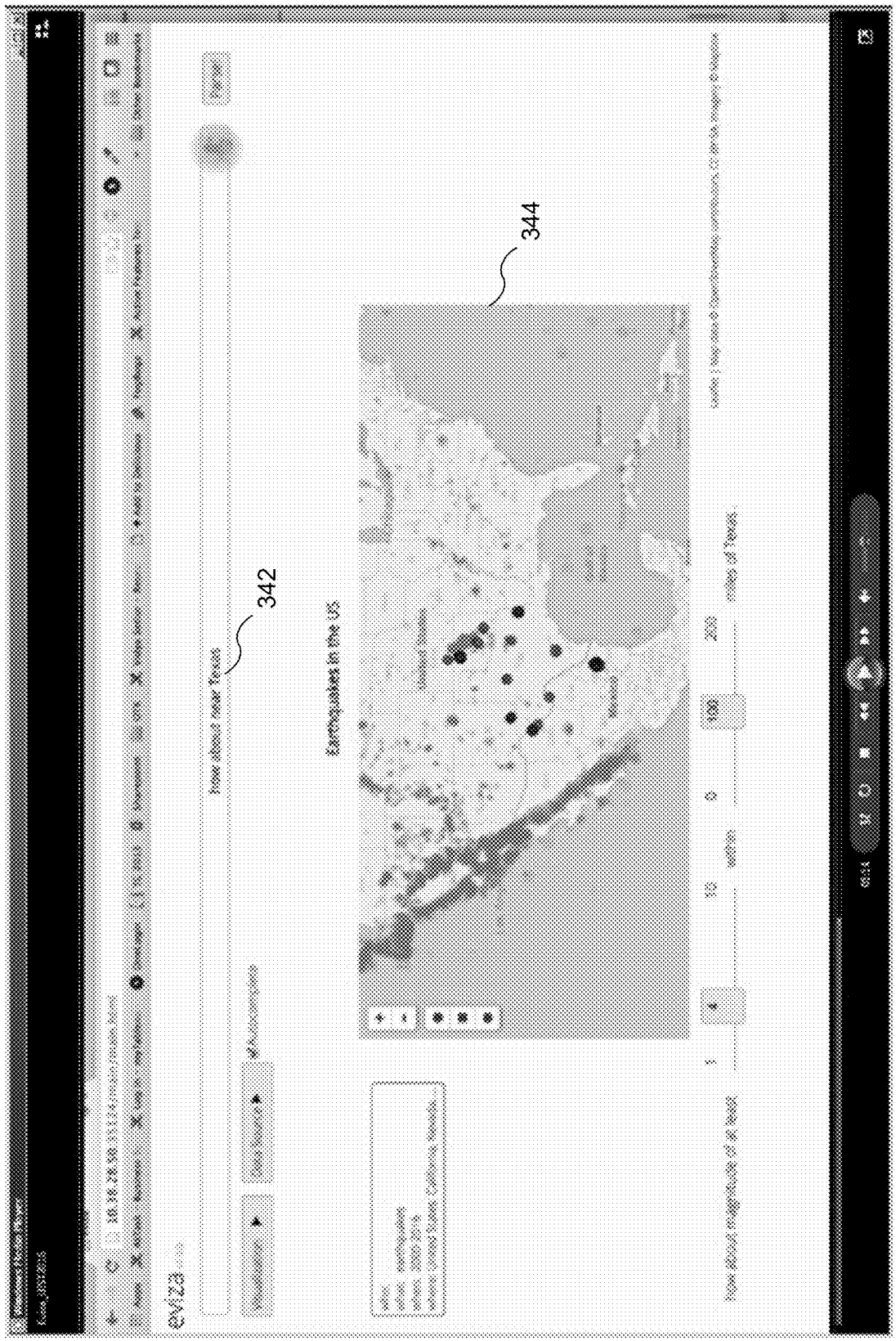
Figure 3H:
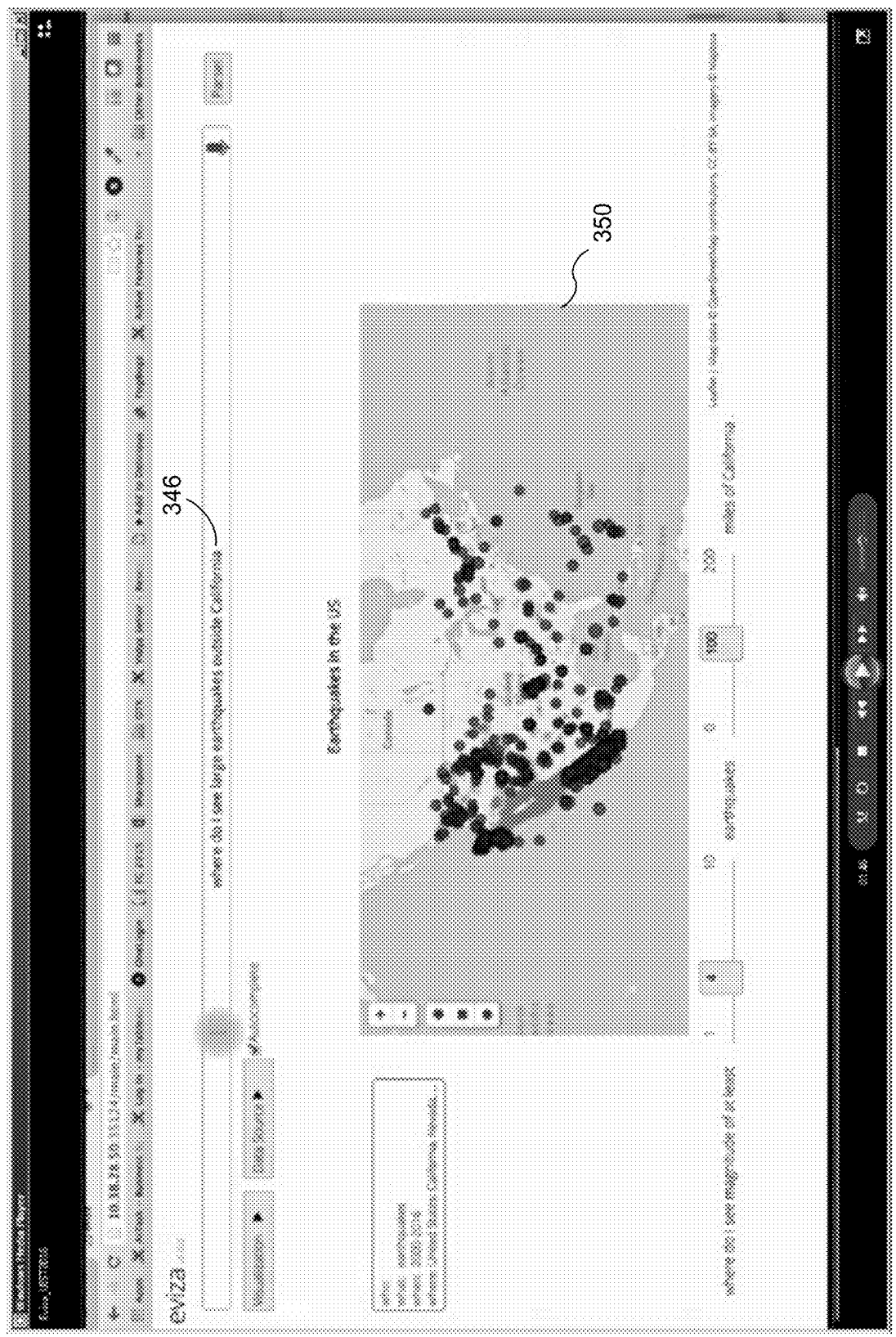
Figure 3I:
Figure 3J:
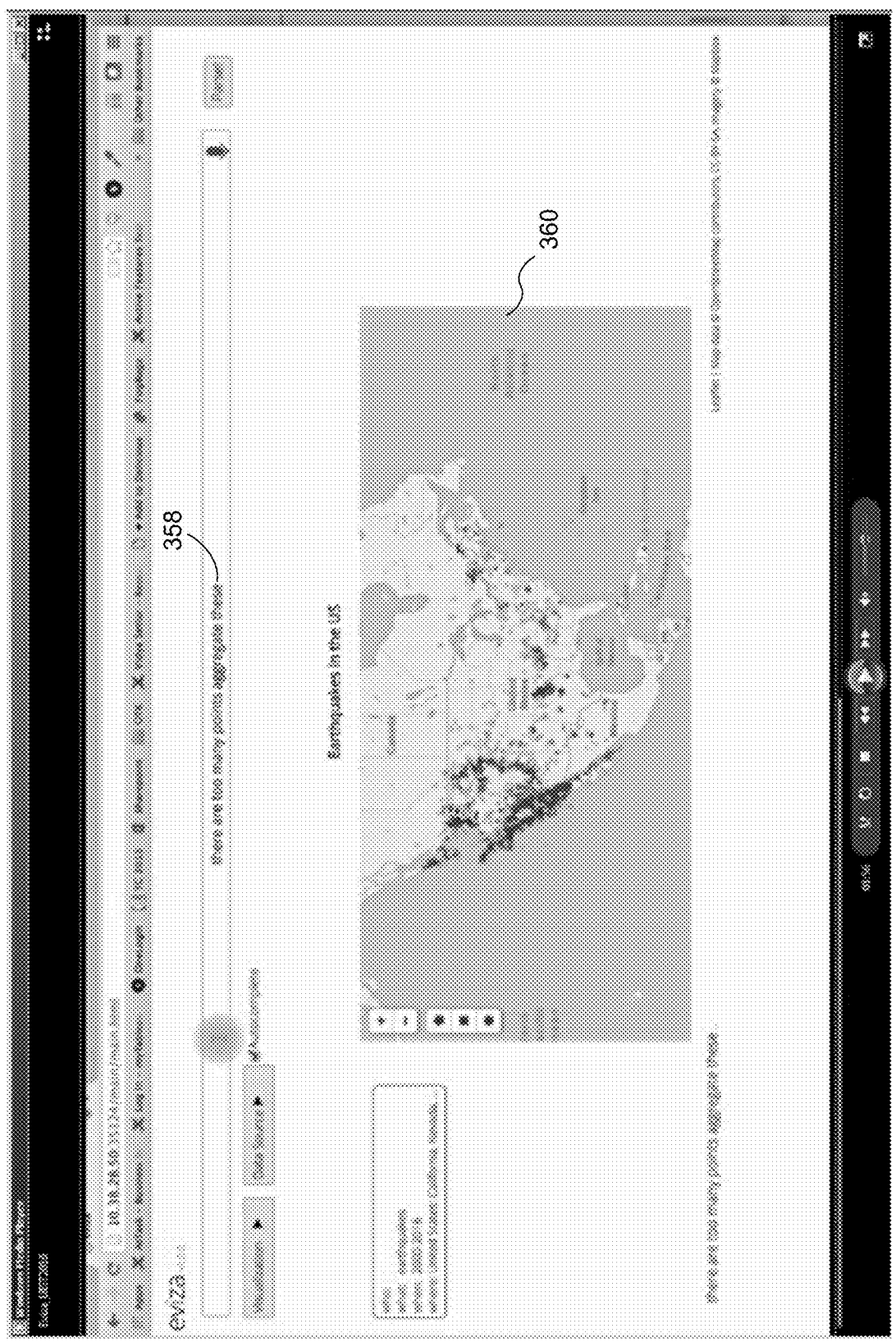

For example, referring to FIG. 3G, a current command 342, "how about near Texas," is received from the user. Viewed in isolation, the meaning of "how about near Texas" is unclear. In response to determining that the current command 342 is unclear (e.g., no metric for the command satisfies the ambiguity threshold), the language module 238 references one or more previous commands to disambiguate the current command 342 (e.g., to help understand the intent of the current command 342 using context). In some implementations, the language module 238 references a most recent previous command to disambiguate the current command 342. If the most recent previous command does not disambiguate the current command 342, then the language module 238 may reference the next most recent previous command, and so on.

Figure 9:
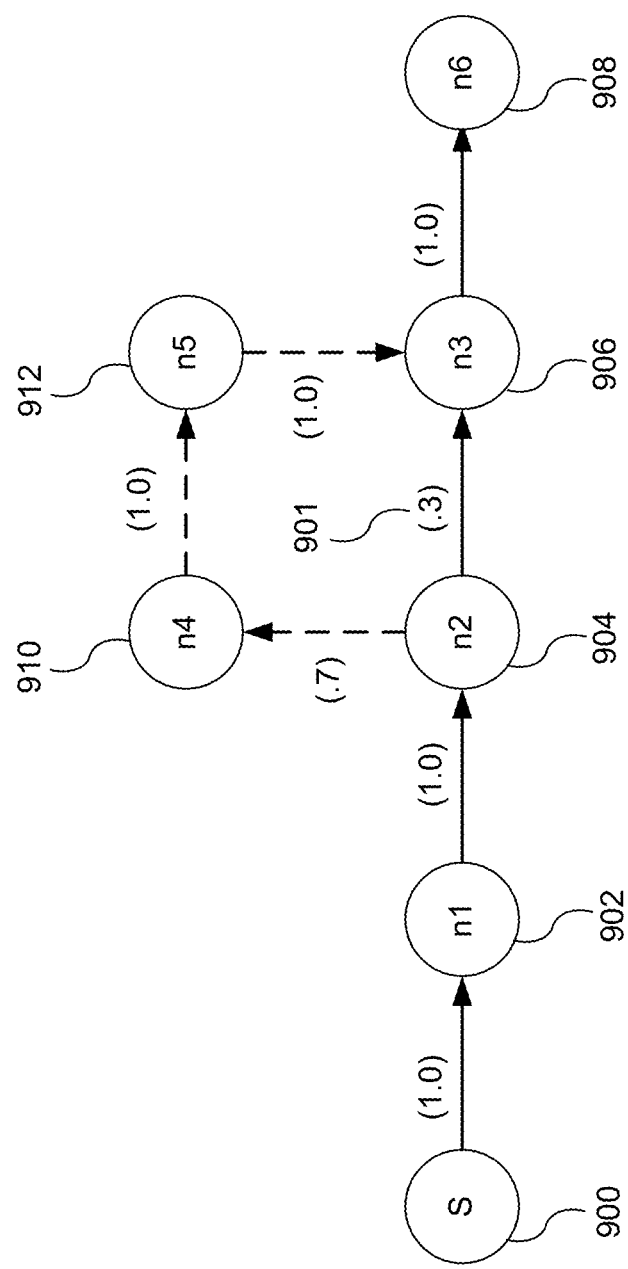
FIG. 9 illustrates a prophetic diagram of concatenating components of multiple natural language commands, according to some implementations.

In some implementations, prior to referencing the one or more previous commands, the language module 238 determines whether the current command 342 is ambiguous (as discussed above with reference to FIGS. 3A-3B). In addition, the language module 238 identifies which portion(s) of the current command 342 could be supplemented in order to increase clarity. To accomplish this, in some implementations, the language module 238 divides the current command 342 into components (e.g., a series of nodes) and determines individual scores for each of the components (e.g., for each node). The score relates to a degree of ambiguity at each node. For example, referring to FIG. 9, a first series of nodes begins at a start node 900 and includes "how" as a first node 902, "about" as a second node 904, "near" as a third node 906, and "Texas" as sixth node 908. In some implementations, when determining the individual scores for each of the nodes, the language module 238 concatenates previous nodes in the series with the respective node. For example, the language module 238 concatenates the third node 906 (e.g., "near") with the previous nodes 902 and 904 (e.g., "how" and "about") and then determines a score for the concatenated phrase "how about near."

If a score for one of the nodes does not satisfy a threshold (dubbed a "problem node"), then the language module 238 identifies the problem node and references portions of the most recent previous command that could be added to the problem node to increase clarity (e.g., to help understand the meaning of the current command 342). In some implementations, to add clarity to the problem node, the language module 238 concatenates nodes from previous commands with at least some of the nodes of the current command 342. For example, the language module 238 adds relevant portions of the previous command 340 "where are the large earthquakes near California" 340 to a node in the current command 342. The language module 238 may add portions of the previous commands to a node in the series that is closest to the problem node (e.g., if the third node is the problem node, then the language module 238 adds to the second node, i.e., adds additional words between the second and third node). In addition, the language module 238 may add portions of the previous command(s) to a node in the series having a score that satisfies the threshold. For example, referring to the series of nodes (solid lines) in FIG. 9, the third node 906 is the problem node (e.g., a score of 0.3 (901), for the sake of illustration, does not satisfy the threshold). The closest node in the series of nodes is the second node 904, which has a score of 1.0. Assuming 1.0 satisfies the threshold, the language module 238 adds the relevant portions of the previous command to the second node 904. For example, the language module 238 may add "large" and "earthquakes" from the previous command to the current command 342. In doing so, the language module 238 creates a different series of nodes (n1 902, n2 904, n4 910, n5 912, n3 906, and n6 908).

Now, the third node 906 (e.g., "near") is concatenated with the different series of nodes n1, n2, n4 910, and n5 912 (e.g., "how," "about," "large," and "earthquakes") and the language module 238 determines an updated score for the third node. Again, if the score for the third node 906 does not satisfy the threshold, the language module 238 evaluates additional pathways to the problem node by concatenating nodes from previous commands with the series of nodes from the current command 342. If the score satisfies the threshold, the language module 238 displays an updated data visualization to reflect the current command 342 concatenated with portions of the previous command. For example, the language module 238 finishes concatenating the entire command such that "how about large earthquakes near Texas" is processed as the current command 342. After processing, the language module 238 updates the data visualization 344 to reflect the current command 342.

In some implementations, if the current command 342 relates to the previous command, the language module 238 maintains previous adjustments made by the user in the first and/or second user control interfaces 310, 318 (e.g., the magnitude of earthquakes remains "4").

In some implementations, the language module 238 may adjust display of data marks in a data visualization in response to receiving a command from the user. For example, referring to FIG. 3H, the user inputs a command "where do I see large earthquakes outside California" 346. In response to receiving the command, the language module 238 displays an updated visualization 350 that highlights earthquakes outside of California. In some implementations, the language module 238 may remove marks when adjusting display of data marks (e.g., remove marks of earthquakes within California from the updated data visualization 350). Alternatively, in some implementations, the language module 238 displays contrasting marks in the updated data visualization 350 when adjusting display of data marks (e.g., grey marks are displayed for earthquakes in California while dark marks (or some other color marks) are displayed for earthquakes outside of California). These types of commands (e.g., commands that adjust display of data marks or some other characteristic of the data visualization) are referred to herein as filter commands.

In some implementations, the language module 238 may revert to an original data visualization (e.g., the data visualization 308 in FIG. 3A) in response to receiving a command from the user. In some implementations, a reversion command removes effects of previous commands. For example, referring to FIG. 3I, the user inputs a command "alright show me all the earthquakes" 348. In response to receiving the command, the language module 238 displays the original data visualization 308 (e.g., removes the filters applied by the user). In some implementations, the language module 238 reverts back to a previously displayed data visualization (and removes some filters applied by the user) in response to determining that the command includes a trigger word or phrase (e.g., "all").

In some implementations, the language module 238 changes a characteristic of the data visualization in response to receiving a command from the user. For example, referring to FIG. 3J, the user inputs a command "there are too many points aggregate these" 358. In response to the command, the language module 238 may modify a mark style (e.g., introduce differently shaped marks into the data visualization) for the marks in the updated data visualization 360 for clarity. The aggregated marks can also use color, labels, or other attributes to identify the size of each aggregation.

In addition, in some implementations, the language module 238 may change the type of the data visualization (e.g., map to bar chart) in response to receiving a command from the user. In this way, the user can change between chart types to quickly find a chart type that suits the current dataset being displayed.

FIGS. 4A-4H illustrate graphical user interfaces for interactive data analysis using natural language processing.

Figure 4A:
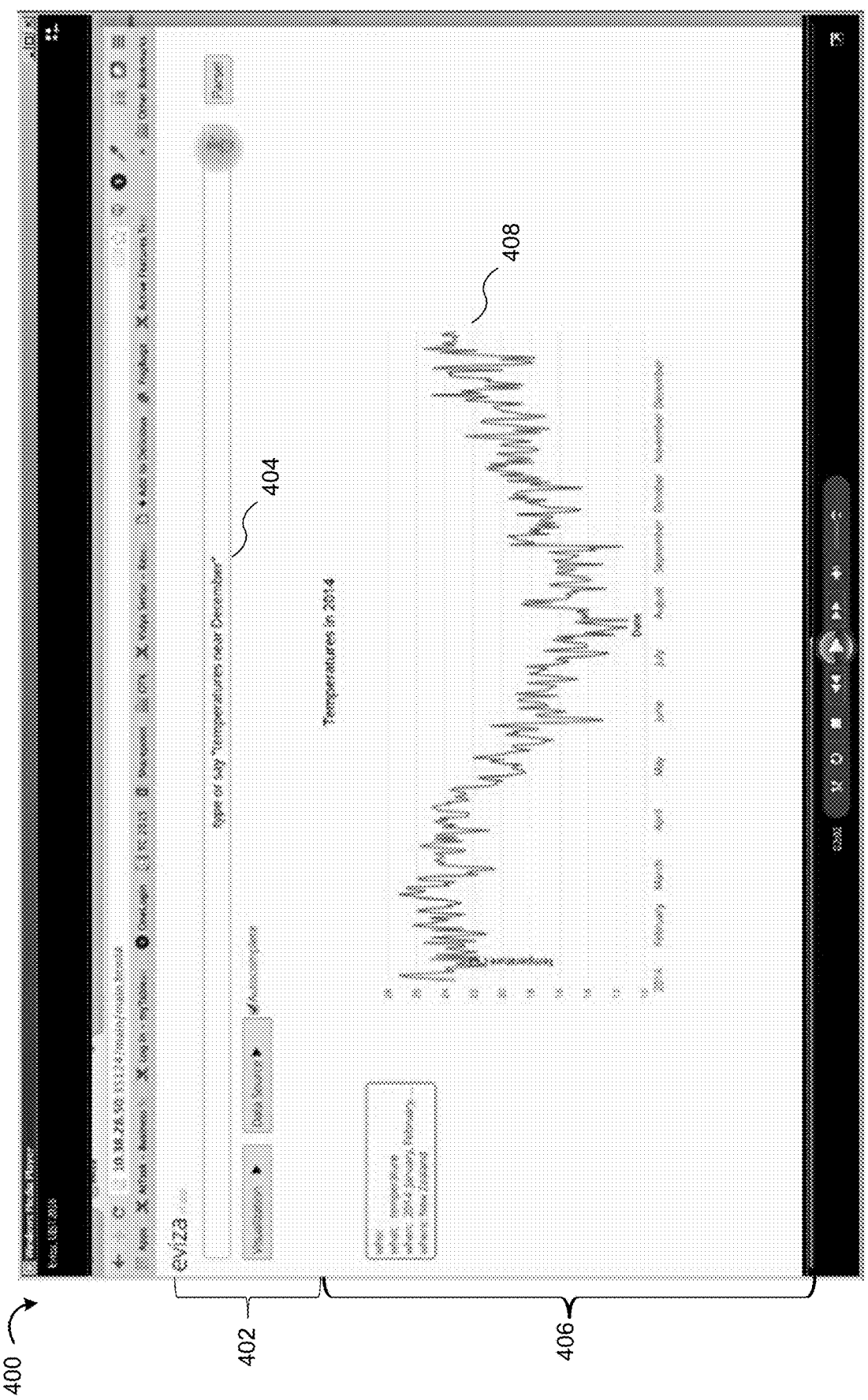
FIGS. 4A-4H illustrate graphical user interfaces for interactive data analysis using natural language processing in a data visualization application, according to some implementations.
Figure 4B:
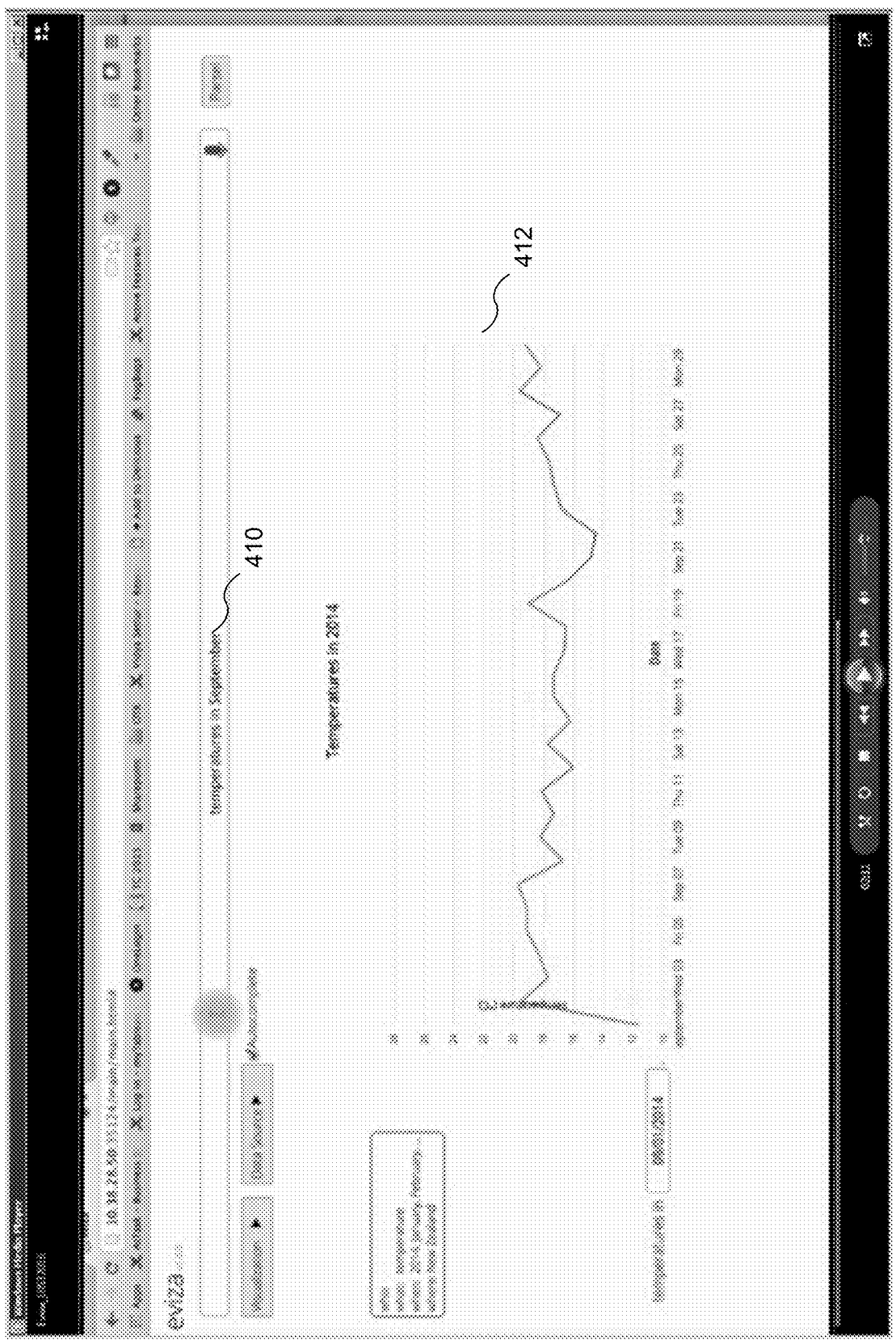

FIGS. 4A-4H provide additional examples of how pragmatics can be used for interactive data analysis. A computing device 200 displays a graphical user interface 400 that includes a natural language processing region 402. The natural language processing region 402 is an example of the natural language processing region 124 in FIG. 1. The graphical user interface 400 also includes a data visualization region 406. The data visualization region 406 is an example of the data visualization region 112 in FIG. 1. As shown in FIG. 4A, the data visualization region 406 includes an existing data visualization 408 for temperatures in New Zealand during 2014.

The computing device receives a command from a user of the computing device (as discussed above). For example, the user may input (e.g., via a microphone, a keyboard, a touch screen, etc.) a command into a command bar 404 in the natural language processing region 402. Referring to FIG. 4B, a user inputs "temperatures in September" in the command bar 404. In response to receiving the command 410, the application 230 displays an updated data visualization 412 in accordance with the received command 410.

As discussed above, in some implementations, to resolve a semantic ambiguity, the language module 238 extracts key words and/or analytic phrases from the command, and then maps (e.g., associates) those one or more key words or phrases with one or more data fields in the data set. In some circumstances, the semantic ambiguity involves temporal ambiguities. In these circumstances, the language module 238 maps temporal expressions to temporal units (e.g., maps "July" to a temporal unit of "7" and maps "how long does it take . . . " to a temporal unit such as month, week, day, hour, minute, or second. In some implementations, the language module 238 evaluates temporal prepositions in a command (e.g., interprets "in" of "in July" to mean time from the beginning of July to the end of July). Other temporal prepositions include "during," "near," and "around." In some implementations, the language module 238 evaluates temporal connectives in a command (e.g., interprets "before" of "before summer" to mean time period before start of summer). Referring to FIG. 4B, the language module 238 converts "September" to a value, "9." In addition, the command 410 includes "temperatures in September." Because "in" relates to "September," the application 230 displays an updated data visualization 412 showing temperatures in September (e.g., temperatures from the beginning of September to the end of September).

FIGS. 4B-4F illustrate how natural language processing can be used to evaluate a series of related commands that involve temporal expressions, prepositions, and/or connectives. As discussed above with reference to FIG. 3G and FIG. 9, the application 230 may reference one or more previous commands when analyzing a current command. In doing so, the application 230 may map portions (e.g., one or more words and/or phrases) from one or more previous commands to the current command. In some implementations, the application 230 includes rules and templates to map portions from the one or more previous commands to the current command.

Figure 4C:
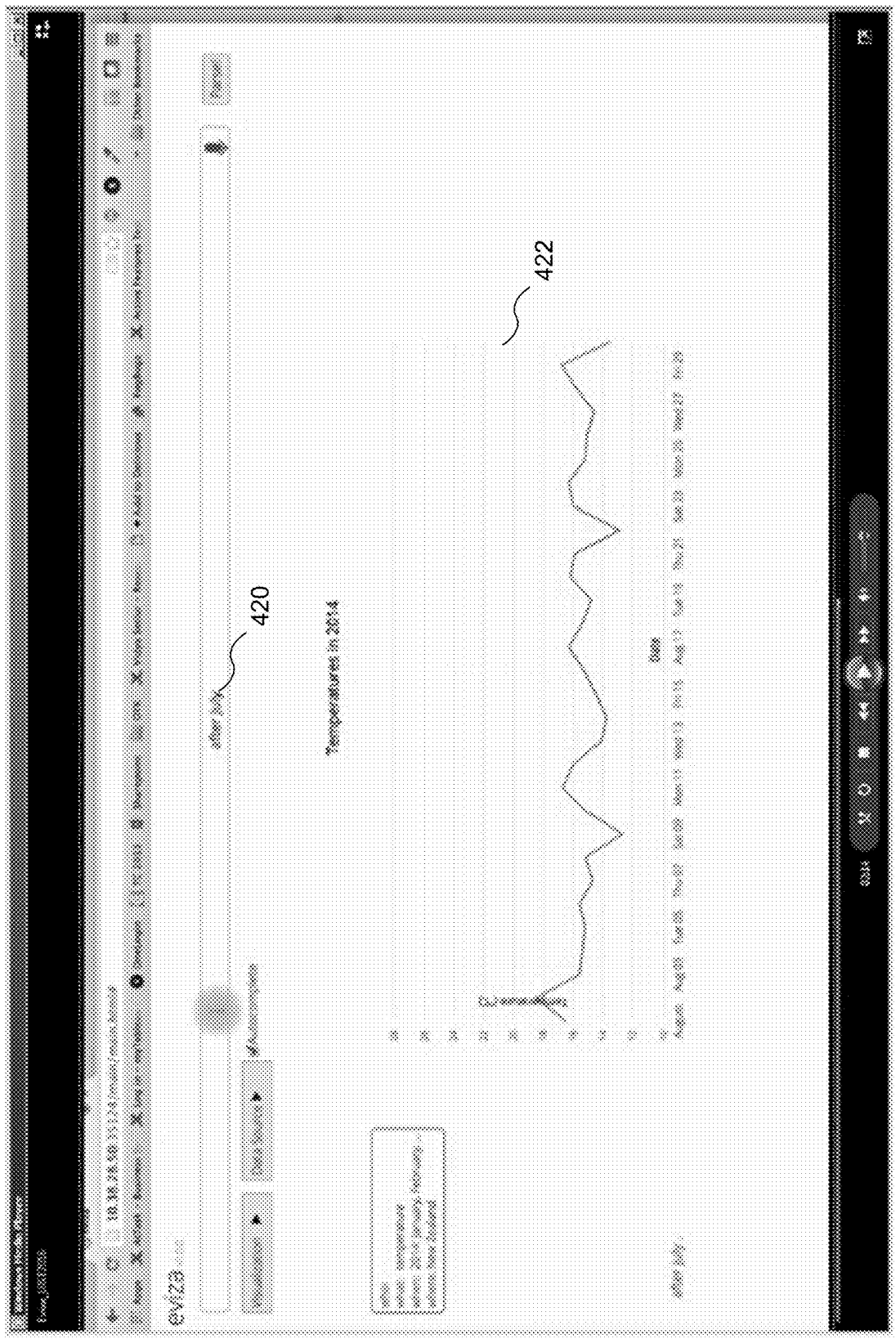

FIG. 4B includes the base command 410, "temperatures in September." Next, referring to FIG. 4C, the user inputs a subsequent command 420 "after July." Viewed in isolation, the meaning of "after July" is unclear. The application 230 references one or more previous commands to disambiguate the subsequent command 420 (e.g., uses pragmatics to help understand the intent of the subsequent command 420). For example, the application 230 may reference the base command 410, "temperatures in September" to disambiguate the subsequent command 420. The application 230 may, for example, replace "in September" from the base command 410 with "after July." In doing so, the subsequent command 420 as entered states "temperatures after July" and displays an updated data visualization 422 according to the subsequent command.

In addition, "temperatures after July" includes a temporal connective. In some implementations, the application 230 may interpret "after July" to mean the month of August. Alternatively, in some implementations, the application 230 may interpret "after July" to mean the remainder of 2014 (e.g., August through December). In some implementations, the application 230 displays an ambiguity widget that allows the user to adjust the meaning of "after July." Ambiguity widgets are discussed in further detail above with reference to FIGS. 3B-3F.

In some implementations, the language module 238 divides the subsequent command 420 into a series of nodes to disambiguate the subsequent command 420, as discussed above with reference to FIG. 3G and FIG. 9. For example, the application 230 may concatenate "after July" with "temperatures" based on calculated scores.

Figure 4D:
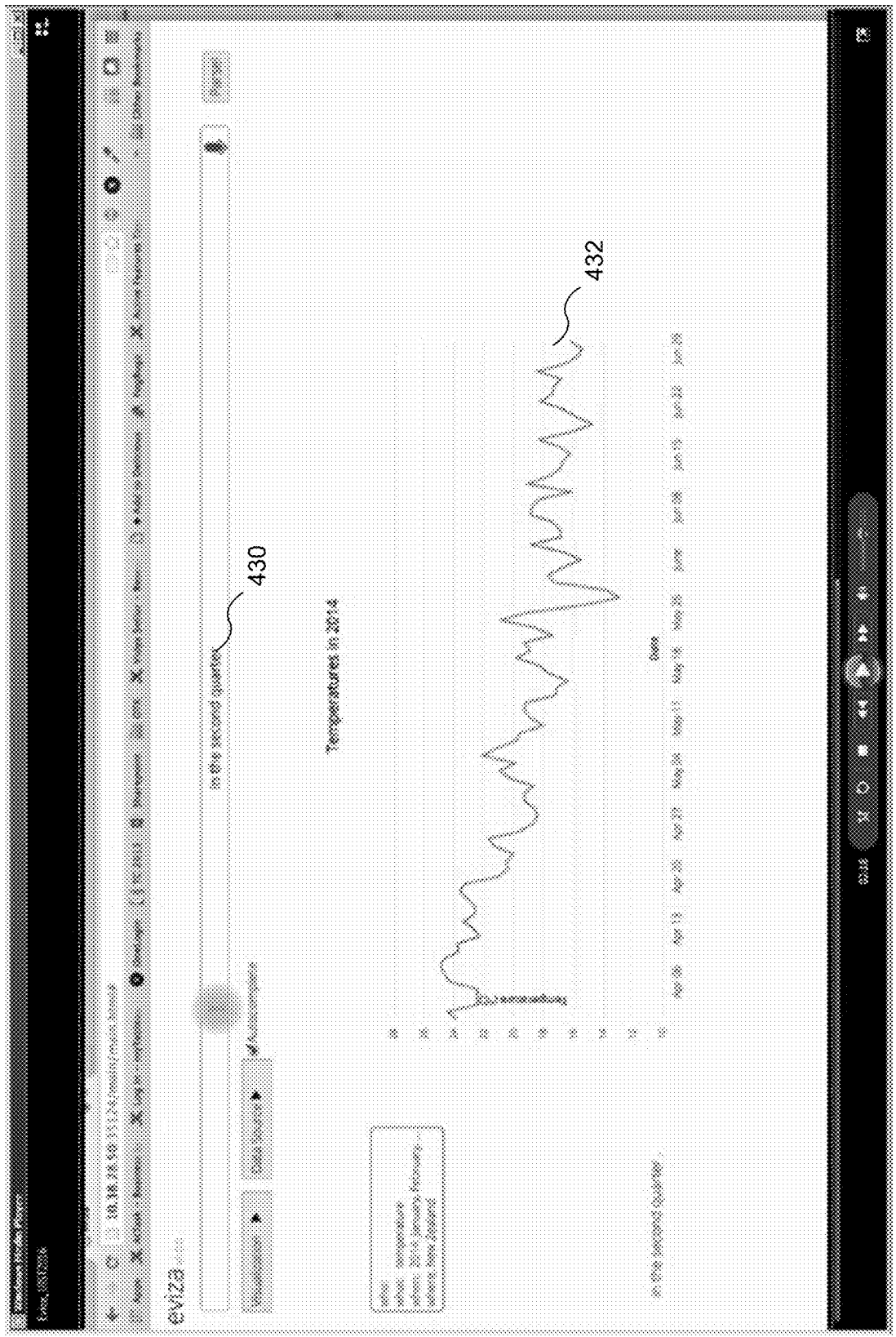

Referring now to FIG. 4D, the user inputs another command 430 "in the second quarter." Viewed in isolation, the meaning of "in the second quarter" is unclear. The application 230 references one or more previous commands to disambiguate the subsequent command 430 (e.g., uses pragmatics to help understand an intent of the subsequent command 430). In this example, there are two previous commands (the base command 410 and the second command 420). In some implementations, the application 230 evaluates each of the previous commands individually, starting with the most recent previous command. Disambiguating commands in a series of commands is discussed in further detail above with reference to FIGS. 3F and 3G.

In some implementations, the language module 238 skips previous commands that were themselves unclear (e.g., the language module 238 already used pragmatics to help understand the intent of the previous command). For example, the application 230 determined that "after July" was unclear. Because of this, the application 230 may skip combining portions of "after July" with "in the second quarter" because the result will likely still be unclear. In some implementations, the application 230 carries through a previous disambiguated command. For example, the language module 238 may carry through "temperatures after July." In this way, the application 230 may avoid analyzing each of the previous commands against the subsequent command. Whichever route is chosen, the subsequent command 430 as entered states "temperatures in the second quarter."

In some implementations, the language module 238 normalizes the temporal expression (e.g., "second quarter") to specific initial values when updating the data visualization 432. For example, the application 230 may determine that the "second quarter" is a time period from April to June. The application 230 may convert "second quarter" to the values of "4," (April) "5," (May) and "6" (June). Accordingly, the subsequent command 430 may be expressed as "temperatures in April, May, and June" in New Zealand for year 2014.

Figure 4E:
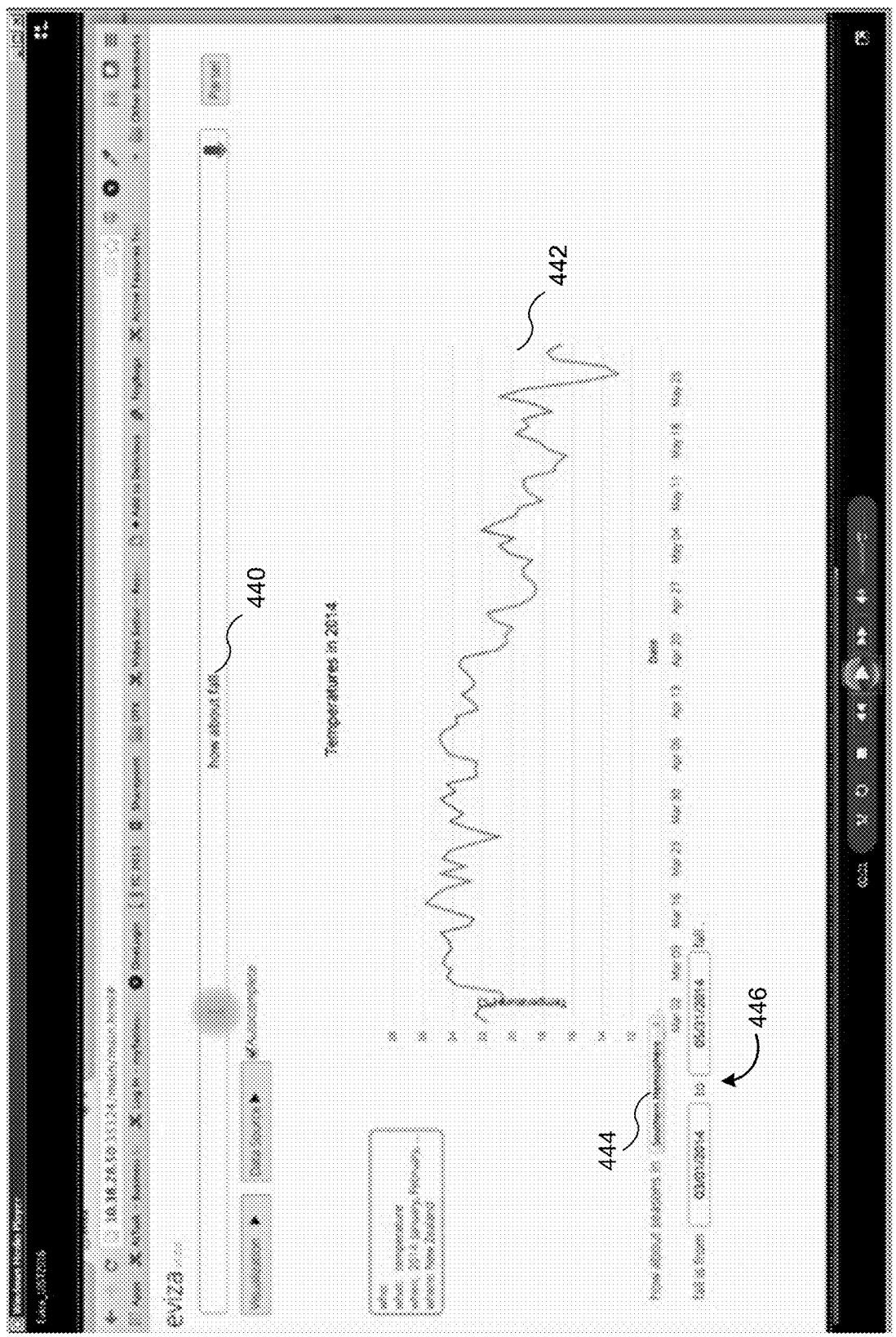
Figure 4F:
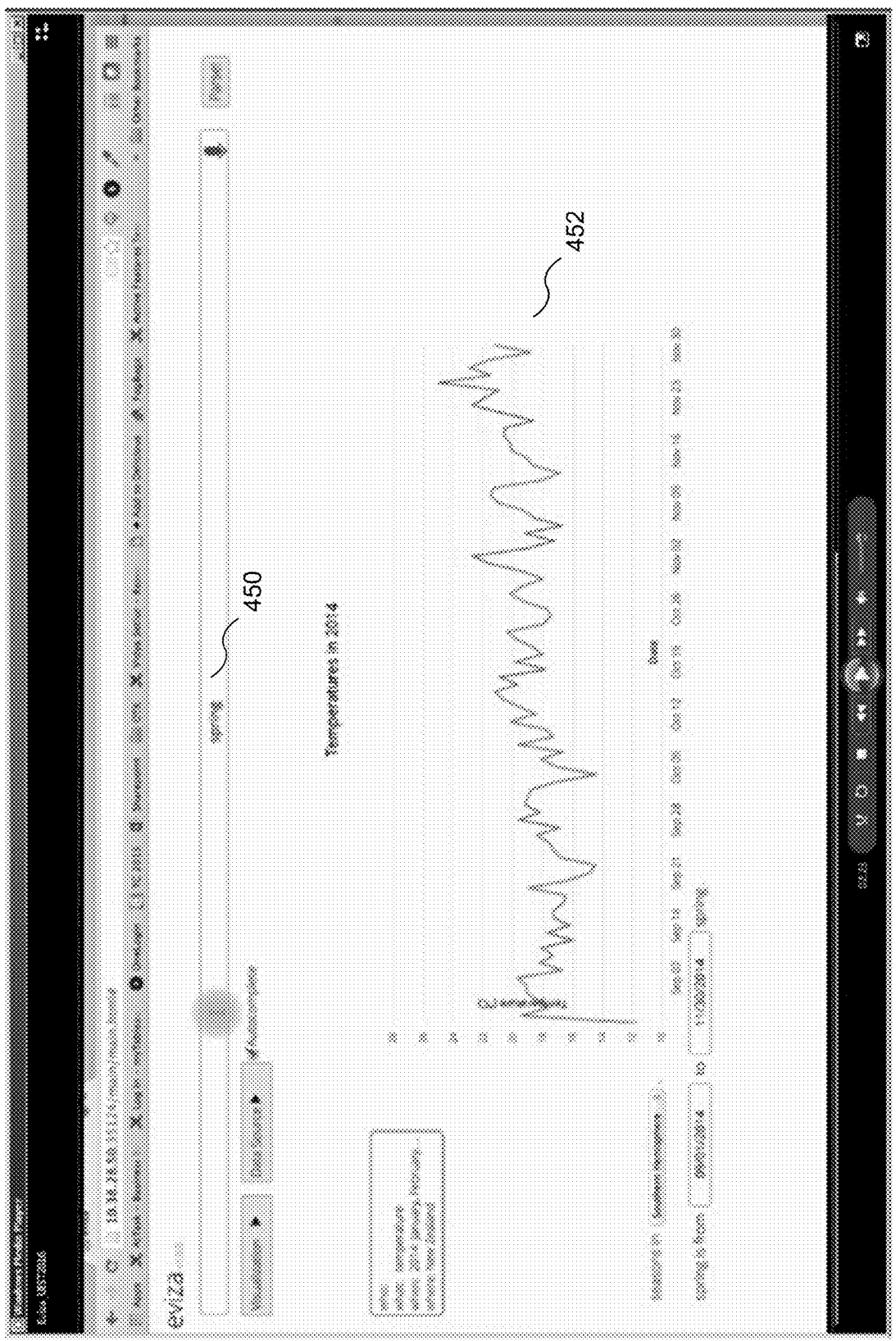

Now, referring to FIG. 4E, the user inputs another command 440 "how about fall." Viewed in isolation, the meaning is unclear. The language module 238 references one or more previous commands to disambiguate the subsequent command 440. In response to disambiguating the subsequent command 440, the application 230 displays an updated data visualization 442. In addition, the command 440 includes a temporal expression, "fall." The application 230 may normalize (e.g., convert) the temporal expression to one or more initial values. For example, the language module 238 interprets "fall" to be a time period between Mar. 1, 2014 and May 31, 2014 for the Southern Hemisphere.

In some implementations, the application 230 displays a user control interface upon determining that an ambiguity is presented in a command. For example, the subsequent command 440 states "how about fall," and the term "about" creates a ambiguity (e.g., a time based ambiguity). The application 230 displays user control interfaces 444 and 446 adjacent to the updated data visualization 442. In some implementations, the language module 238 estimates one or more initial values for the ambiguous term based on the displayed data visualization (or the dataset more generally). For example, the dataset concerns temperatures in New Zealand, and therefore the application 230 sets the user control interface 444 to "Southern Hemisphere." In addition, the application 230 sets the user control interface 446 to a range for "fall" in Southern Hemisphere, which is from Mar. 1, 2014 to May 31, 2014. In the event that the user meant "fall" for the Northern Hemisphere, the user may interact with the user control interfaces 444 and 446 to adjust display of the data visualization 442 accordingly.

In some implementations, the application 230 considers the temporal context of the data visualization to resolve ambiguities. For example, referring to FIG. 4F, the user inputs a subsequent command 450 "spring." Viewed in isolation, the meaning is unclear. In some implementations, the language module 238 references one or more previous commands to disambiguate the subsequent command 450. Alternatively or in addition, in some implementations, the language module 238 may reference one or more previous (or current) data visualizations (e.g., the data visualization 442 in FIG. 4E) to disambiguate the subsequent command 450 (e.g., reference data or objects currently displayed in the data visualization). For example, the language module 238 may determine that the previous data visualization 442 concerned "temperatures in about fall" using data displayed in the data visualization 442. Based on this determination, the language module 238 may determine that the command 450 of "spring" is intended to mean "temperatures in about spring," and display the new data visualization 452 accordingly.

Figure 4G:
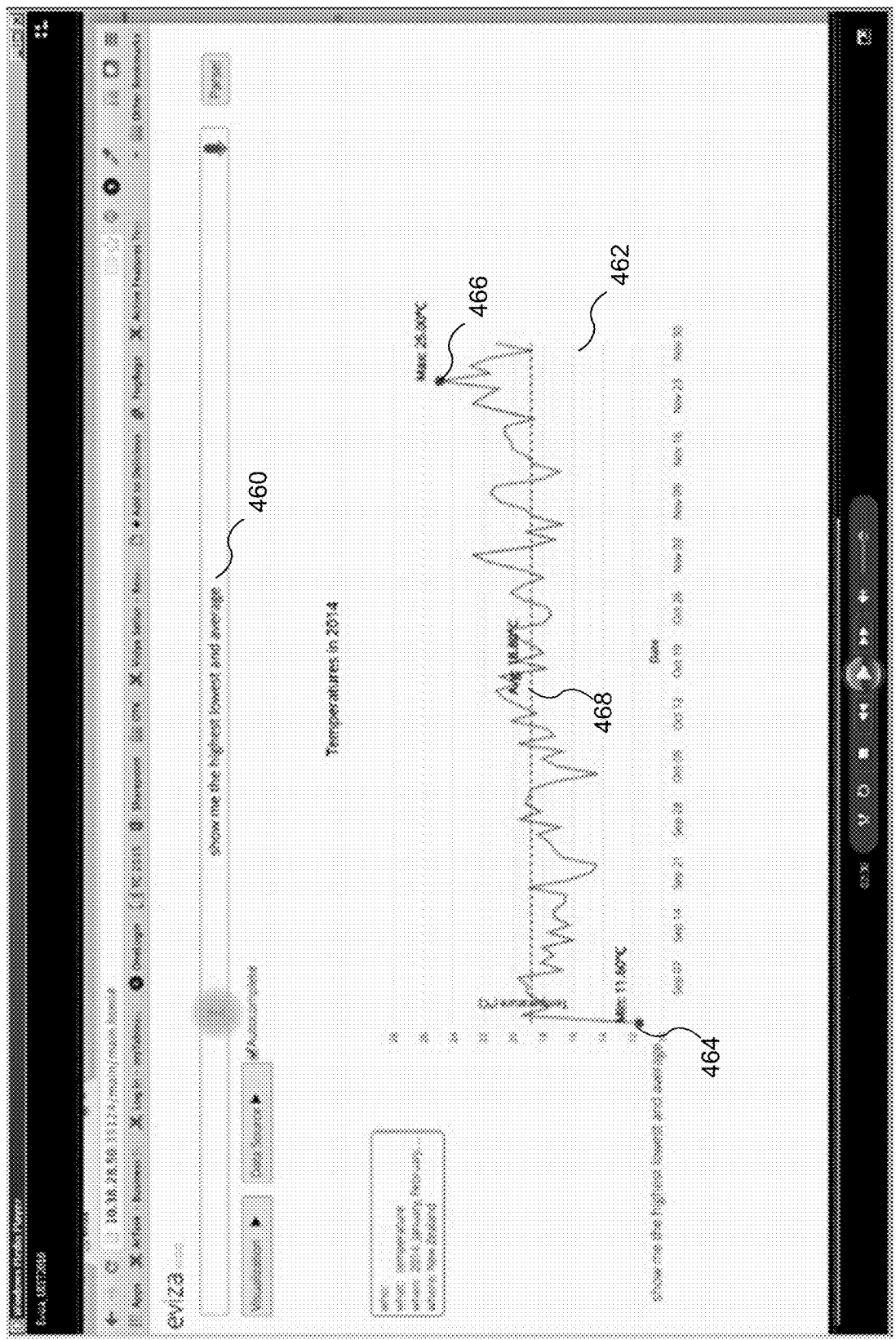
Figure 4H:
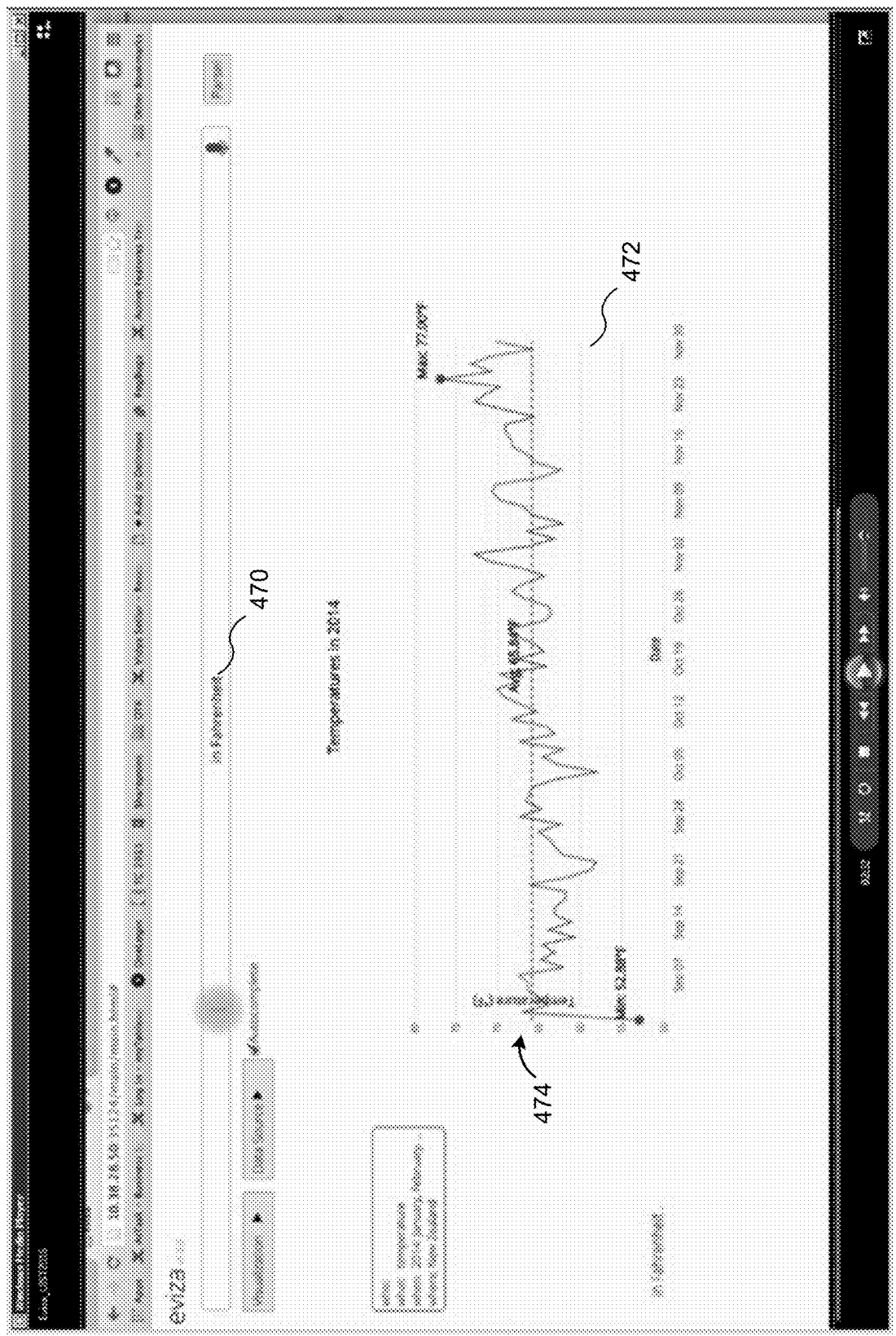

FIGS. 4G and 4H illustrate graphical user interfaces that combine pragmatics with analytical functions for interactive data analysis using natural language processing, in according with some implementations. In some implementations, the language module 238 applies one or more analytical functions (e.g., statistical features) to a data visualization in response to receiving a command from a user. In some implementations, the one or more functions relate to statistical features (e.g., maximum, minimum, mean, mode, average, median, standard deviation, and/or line of best fit). To illustrate, referring to FIG. 4G, the user inputs the command 460 "show me the highest lowest and average." First, the language module 238 resolves any ambiguities as discussed above (e.g., referencing a temporal order of the commands, a temporal context of the data visualization, pragmatics, and estimates). Second, the application 230 executes one or more functions (e.g., one or more statistical tools) that correspond to the received command. For example, referring to FIG. 4G, the application 230 computes a maximum, a minimum, and an average. The application 230 determines the minimum, the maximum, and the average for the data currently display in the data visualization. In addition, the application 230 overlays each of these determined values on the updated data visualization 462 (e.g., a first mark 464 is displayed for the minimum, a second mark 466 is displayed for the maximum, and a dotted-line 468 is displayed for the calculated average). In this way, the user avoids manually searching for statistical tools buried within the data visualization application (e.g., searching through drop-down menus).

In some implementations, the application 230 changes attributes (e.g., units of measurement) of a data visualization in response to receiving a command from the user. For example, referring to FIG. 4G, the data visualization 462 displays "temperature" in degrees Celsius. Now, referring to FIG. 4H, the user inputs the command 470 "Fahrenheit" and the application 230 updates the data visualization 472 such that the Y-axis displays temperature in degrees Fahrenheit 474. In addition, the labels for the min, max, and the average change from Celsius to Fahrenheit. In this way, the user avoids searching through menus to change the Y-axis from Celsius to Fahrenheit.

FIGS. 5A-5L illustrate graphical user interfaces for interactive data analysis using natural language processing. FIGS. 5A-5L illustrate how an autocomplete component can be used in tandem with natural language processing. The autocomplete component familiarizes users with natural language processing. For example, referring to FIG. 5A, a user may begin to type a command in the command bar 502. In response, now referring to FIG. 5B, the language module 238 may display a menu 504 (e.g., a drop-down menu) below the command bar 502 that includes a plurality of candidate options 508. The plurality of candidate options relate to current text in the command bar 502. Each of the candidate options (e.g., input templates) includes a pattern having one or more input slots. For example, the menu 504 includes a candidate option having the pattern "correlation for [where] at [when]." In this particular pattern, "[where] at [when]" are the input slots. In response to user selection of one of the plurality of candidate options, the language module 238 updates the command in the command bar 502. For example, the language module 238 may update the command to be "show me the correlation for [where] at [when]." In some implementations, in response to the user selecting a respective candidate option of the plurality of candidate options, the language module 238 displays an updated plurality of candidate options in the menu 504 based on the user selection. In some implementations, in response to the user selecting a respective candidate option of the plurality of candidate options, the application 230 modifies the display of the data visualization.

Figure 5A:
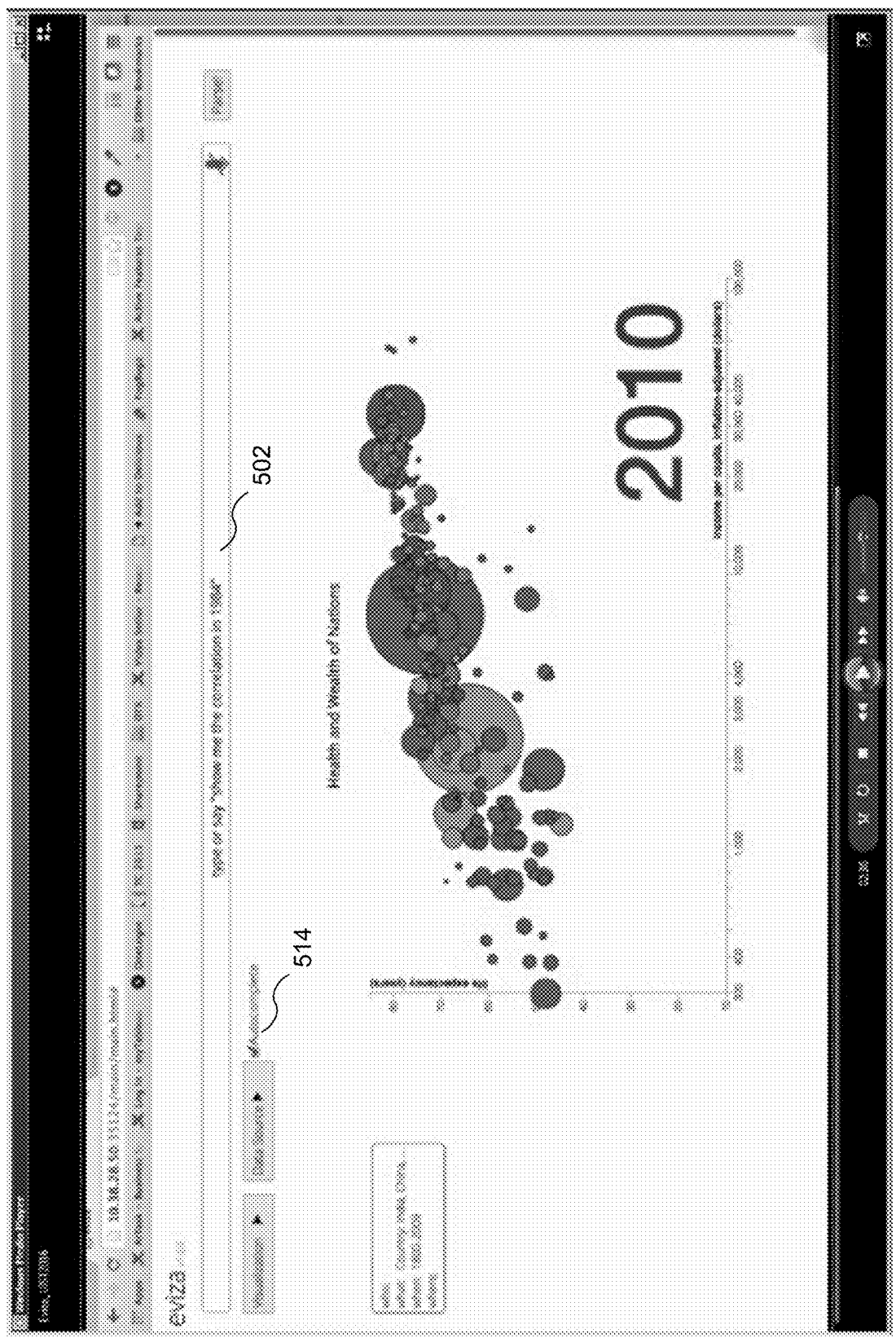
FIGS. 5A-5L illustrate graphical user interfaces for interactive data analysis using natural language processing in a data visualization application, according to some implementations.
Figure 5B:
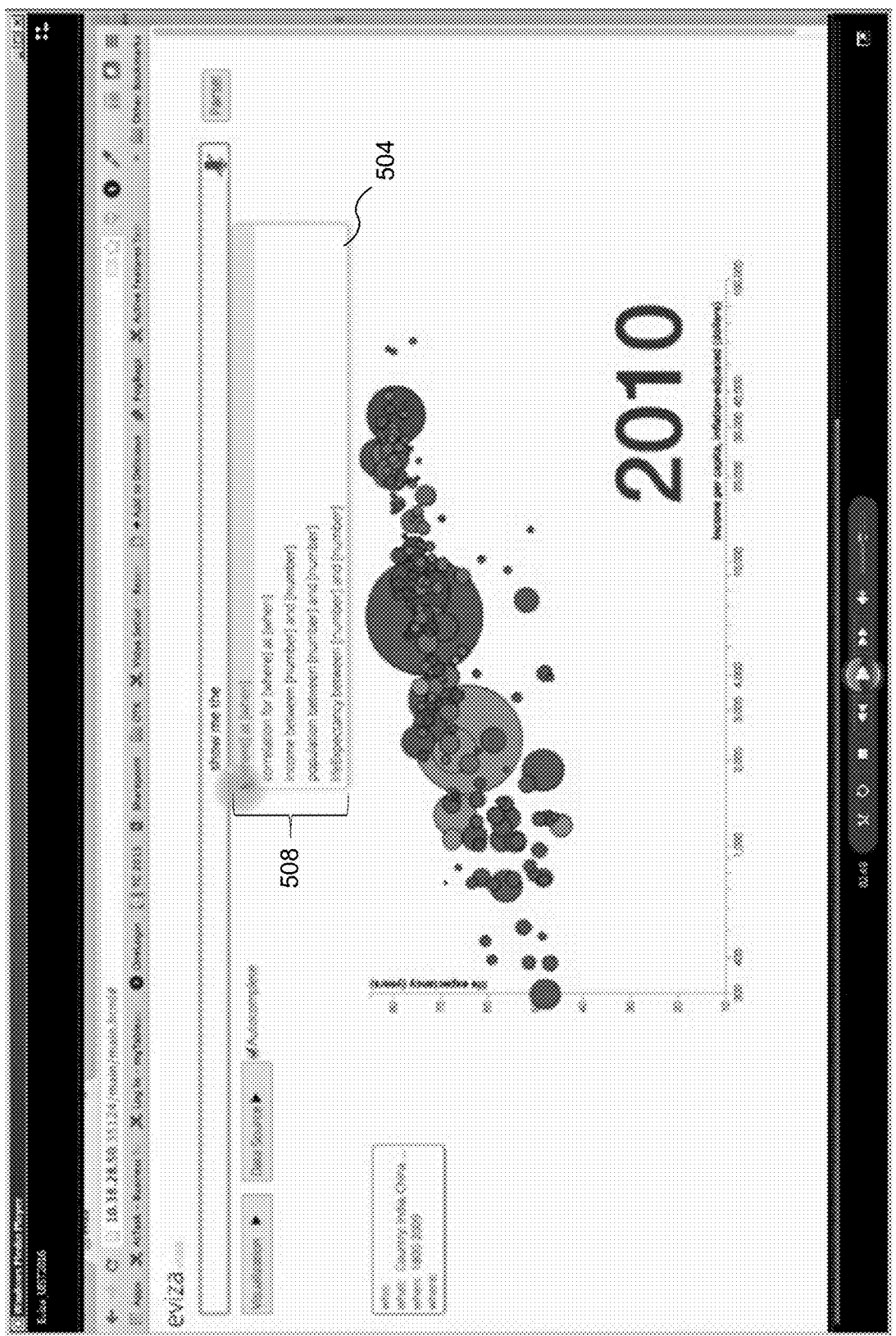
Figure 5C:
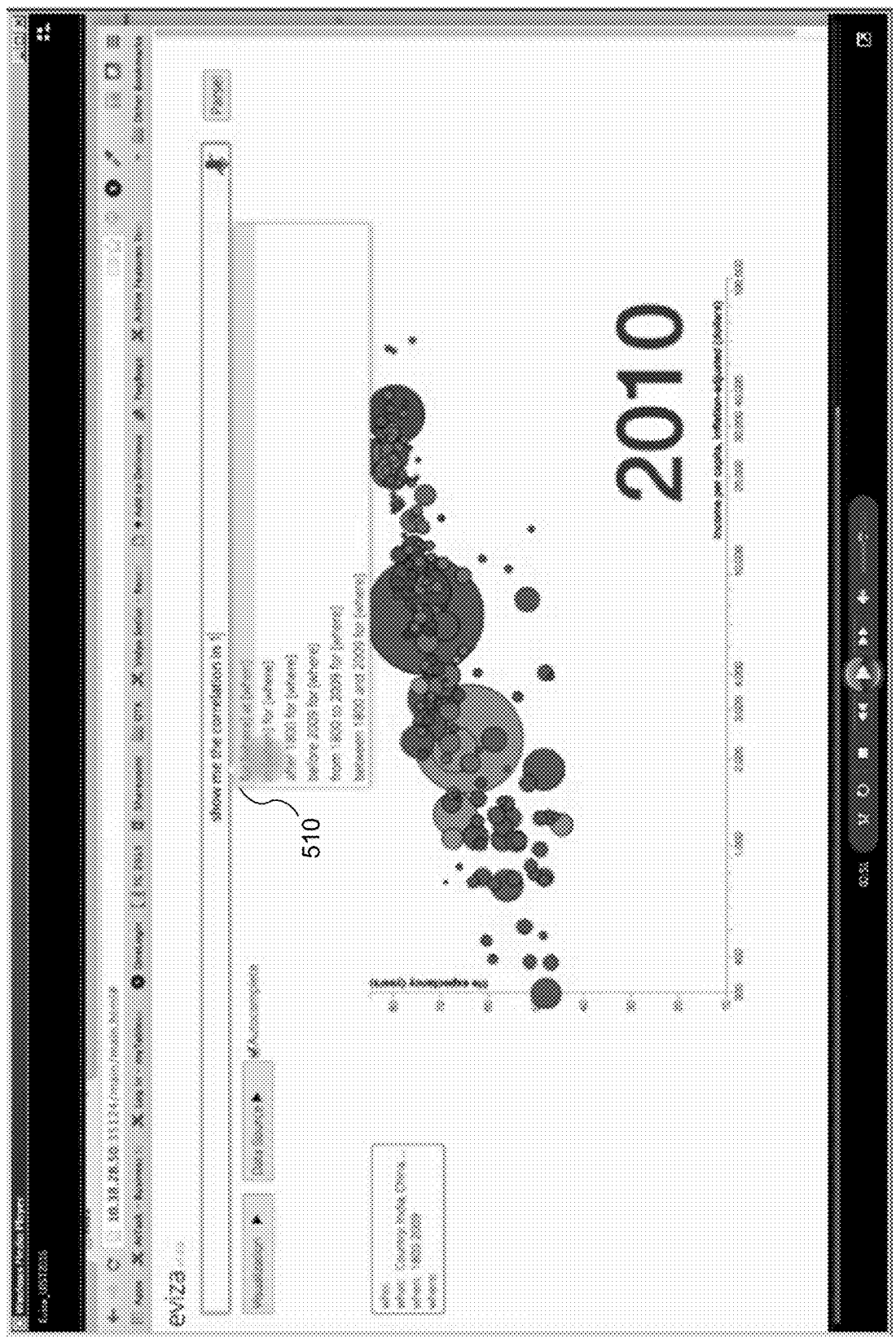
Figure 5D:
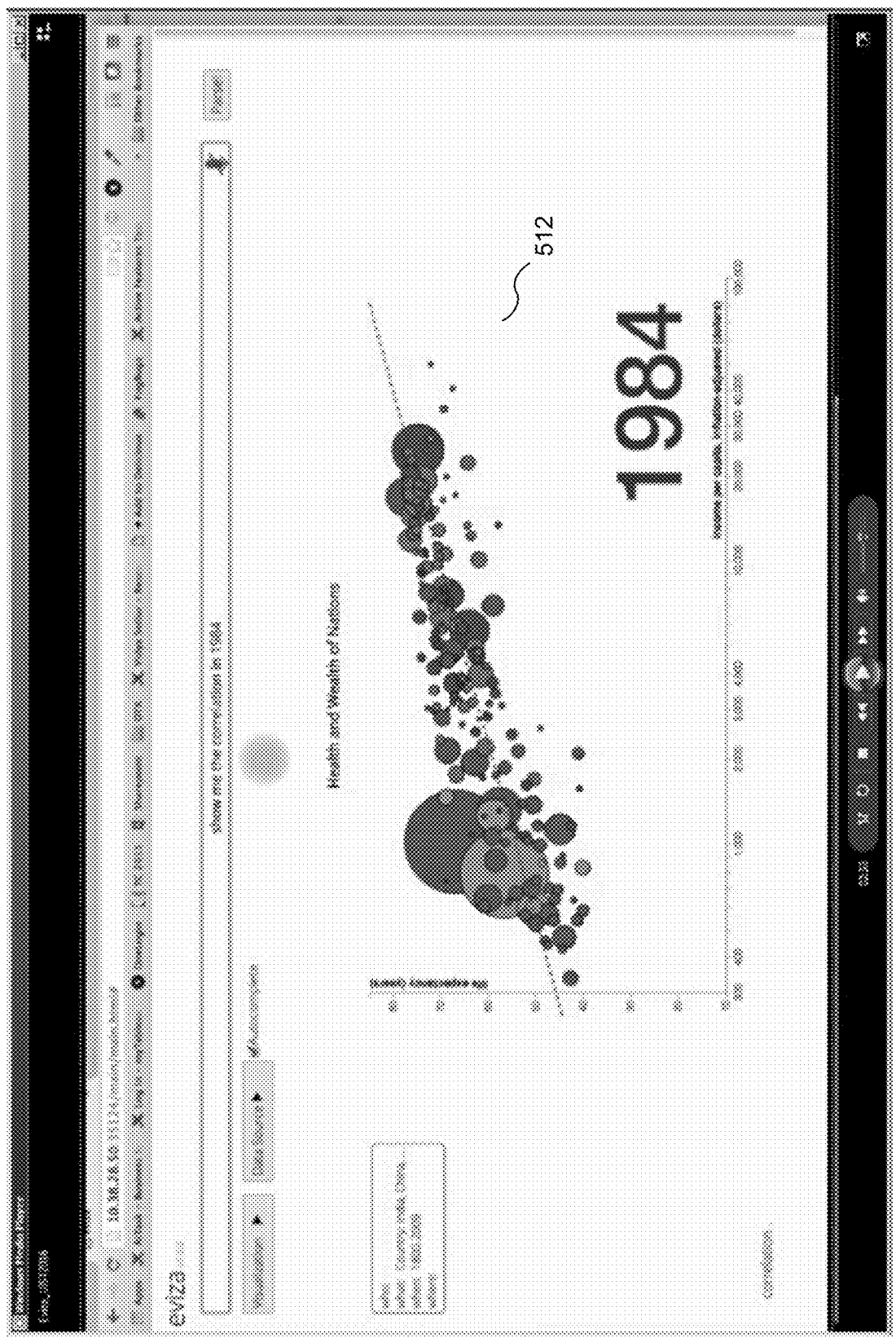
Figure 5E:
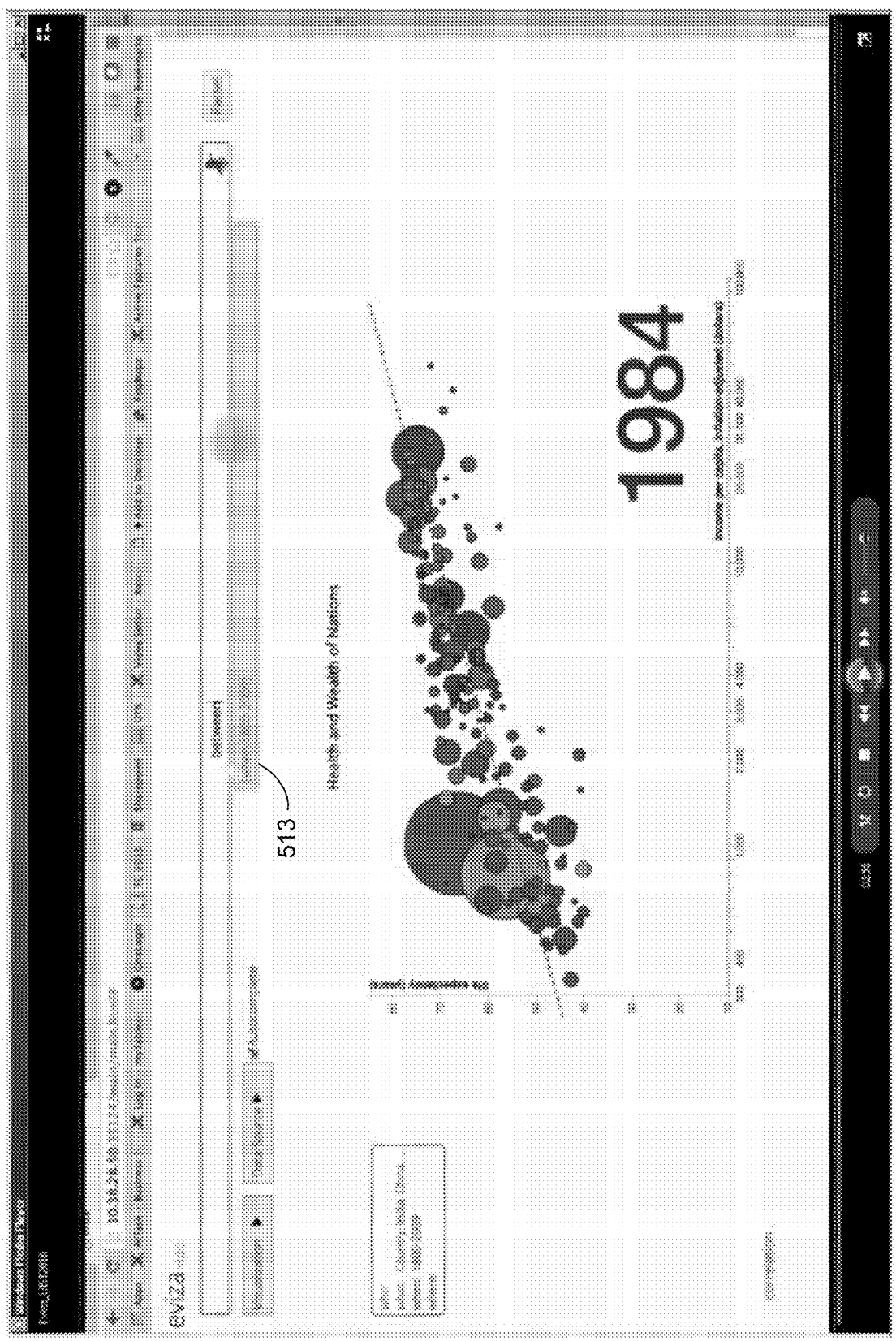

In some implementations, the autocomplete feature can be turned on or off with a user interface control 514. As illustrated in FIG. 5A, this feature is currently turned on.

In some implementations, the language module 238 displays a plurality of relevant data fields in response to user selection of one of the input slots. For example, if the user selects (e.g., clicks, touches, etc.) the input slot "[where]" from above, the application 230 displays a list of the relevant data fields (e.g., countries, regions, or states) from the data set. In another example, if the user selects the input slot "[when]" from above, the language module 238 displays a list of data fields related to time from the data set.

In some implementations, the application 230 controls which candidate options are displayed based on (i) the current data visualization and (ii) the dataset. In addition, the application 230 dynamically adjusts which candidate options are displayed in the menu 504 based on language in the command bar 502 and user selections (as discussed above). For example, referring back to FIG. 5A, the dataset contains data for citizens of countries between the years of 1800 to 2009. Moreover, the original data visualization 503 has "income per capita" on the X-axis and "life expectancy" on the Y-axis. Accordingly, the plurality of candidate options 508 displayed in the menu 504 is based at least in part on these two pieces of information.

In some implementations, the application 230 controls the order in which the candidate options are displayed by assigning a weight to each of the plurality of candidate options. The weight may be associated with previous selections made by the user, the current text of the command, the current visualization, and/or the dataset. Alternatively and in addition, in some implementations, the application 230 controls the order in which candidate options are displayed based on the length of each of the plurality of candidate options. For example, referring to FIG. 5C, a first candidate option 510, "for [where] at [when]" is displayed at the top of the menu 504 because the first candidate option 510 is the shortest option (e.g., text length). The first candidate option 510 may also be displayed at the top of the menu 504 based on a weight of the first candidate option 510.

In some implementations, the application 230 removes display of the menu 504 when the command is complete. For example, referring to FIG. 5D, the user inputs the remainder of the command, "in 1984." There is no longer a need for suggestions. Accordingly, the application updates the data visualization 512 in accordance with the command input by the user.

Figure 5F:
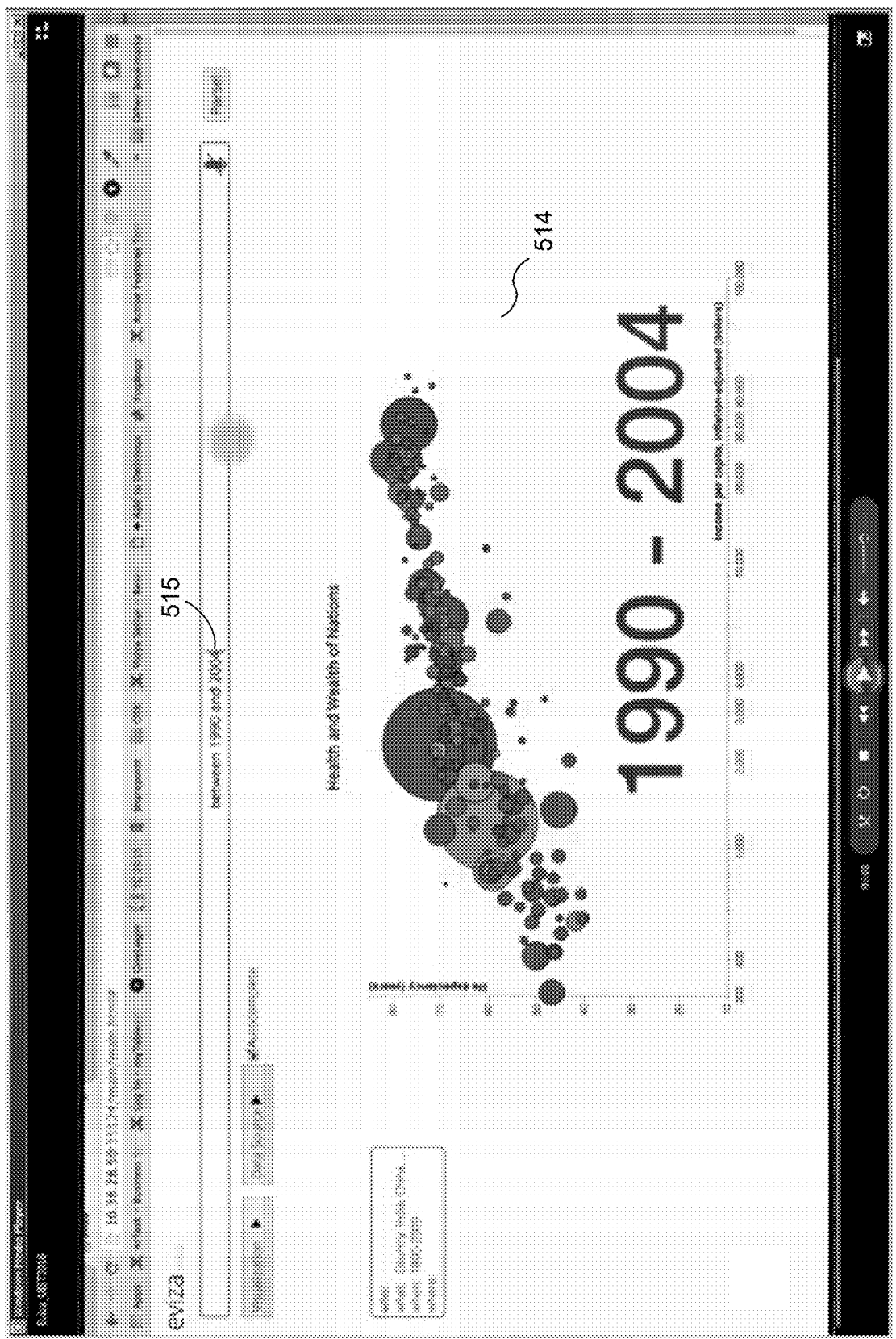

In some implementations, the language module 238 uses pragmatics (as discussed above) when using the autocomplete component. For example, referring to FIG. 5E, the user inputs the start of a command "between" and the language module 238 presents a candidate option 513 of "between 1800-2009." The user proceeds to finish typing the command "between 1990 and 2004" 515 as shown in FIG. 5F. Viewed in isolation, the meaning of "between 1990 and 2004" is unclear. The language module 238 may reference one or more previous commands to disambiguate the command. In doing so, the application 230 displays an updated data visualization 514.

In some implementations, the language module 238 displays the menu 504 upon determining that the command includes an error or some other ambiguity. For example, the language module 238 may parse the text of the command to find a typographical error, an abbreviation, or other issue. In response to determining that the command includes an error, the application 230 displays the menu 504 with a plurality of candidate options. This brings the error to the user's attention. For example, the user may input the command "life exp in CA." In response to parsing the text of the command, the language module 238 may display a plurality of candidate options associated with life expectancy in the state of California.

Figure 5G:
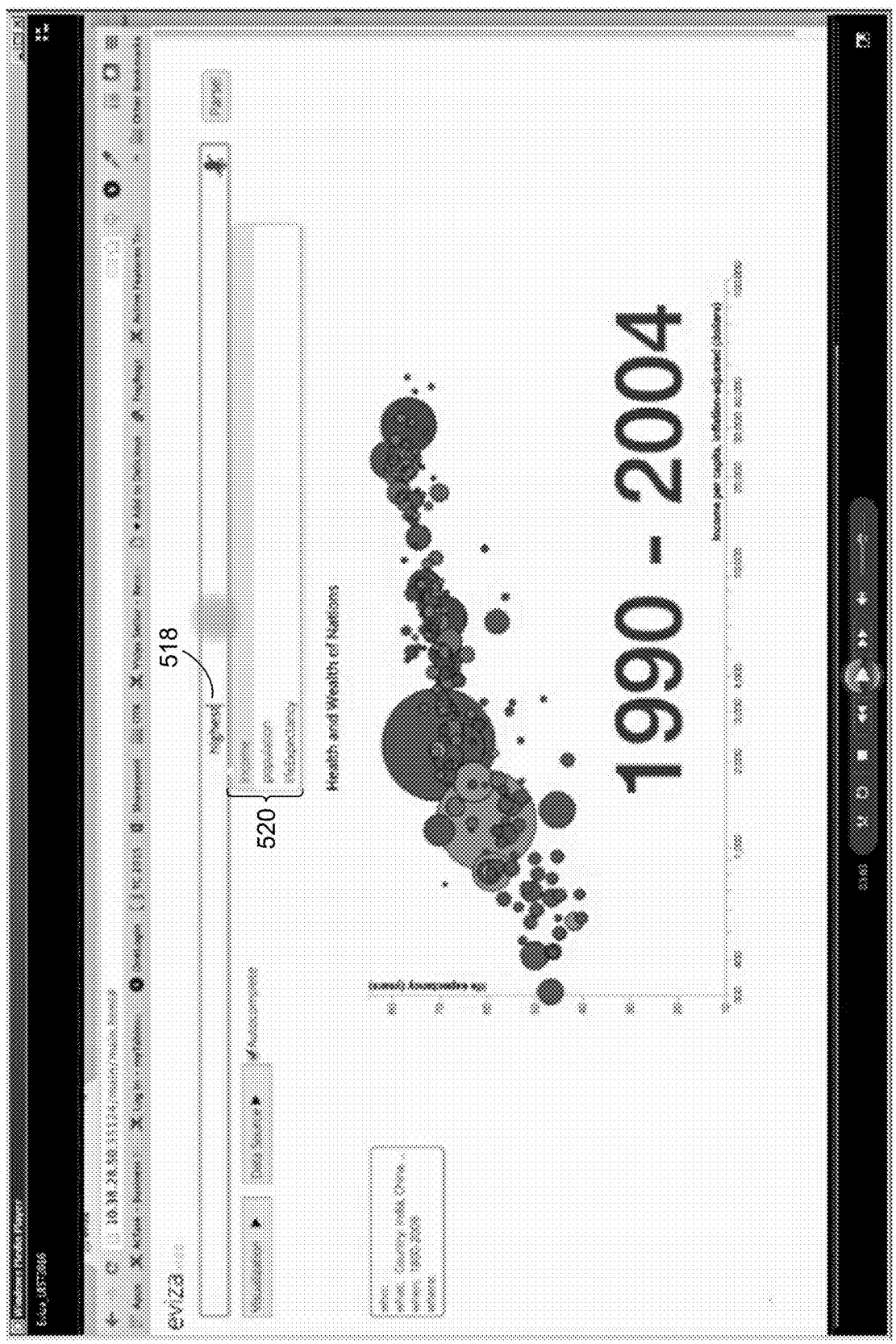
Figure 5H:
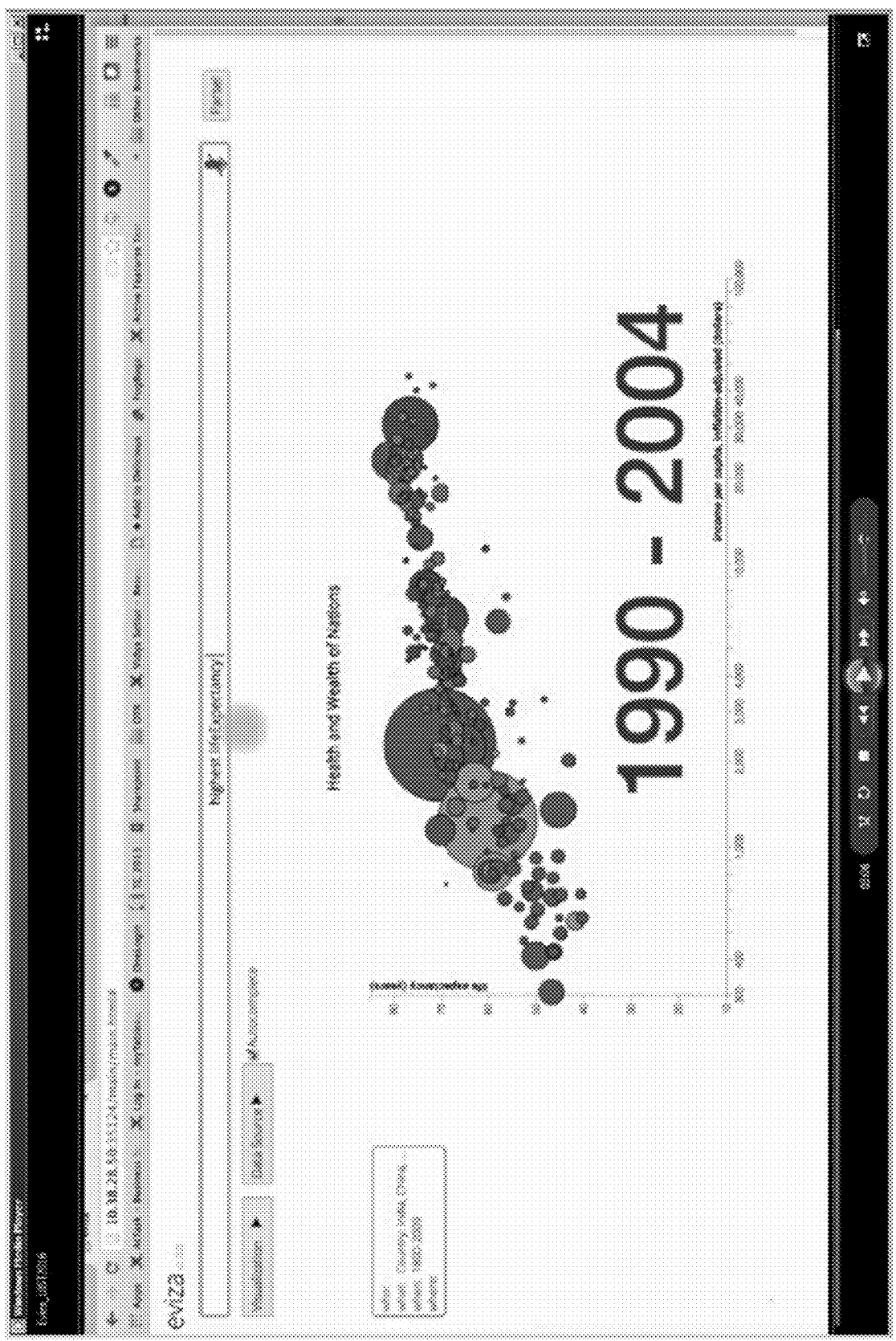

In some implementations, the application dynamically maps language in the command bar to one or more data fields from the data set. In addition, the application 230 displays the one or more data fields mapped to the language in the command bar as one or more candidate options in the menu 504 as illustrated in FIGS. 5G and 5H. In some implementations, the language module 238 dynamically categorizes language in the command bar (e.g., categorized "highest" 518 as a "value" descriptor) and populates the list 520 with one or more candidate options in the same category. Mapping and categorizing are discussed in further detail above with reference to FIGS. 3A-3B.

Figure 5I:
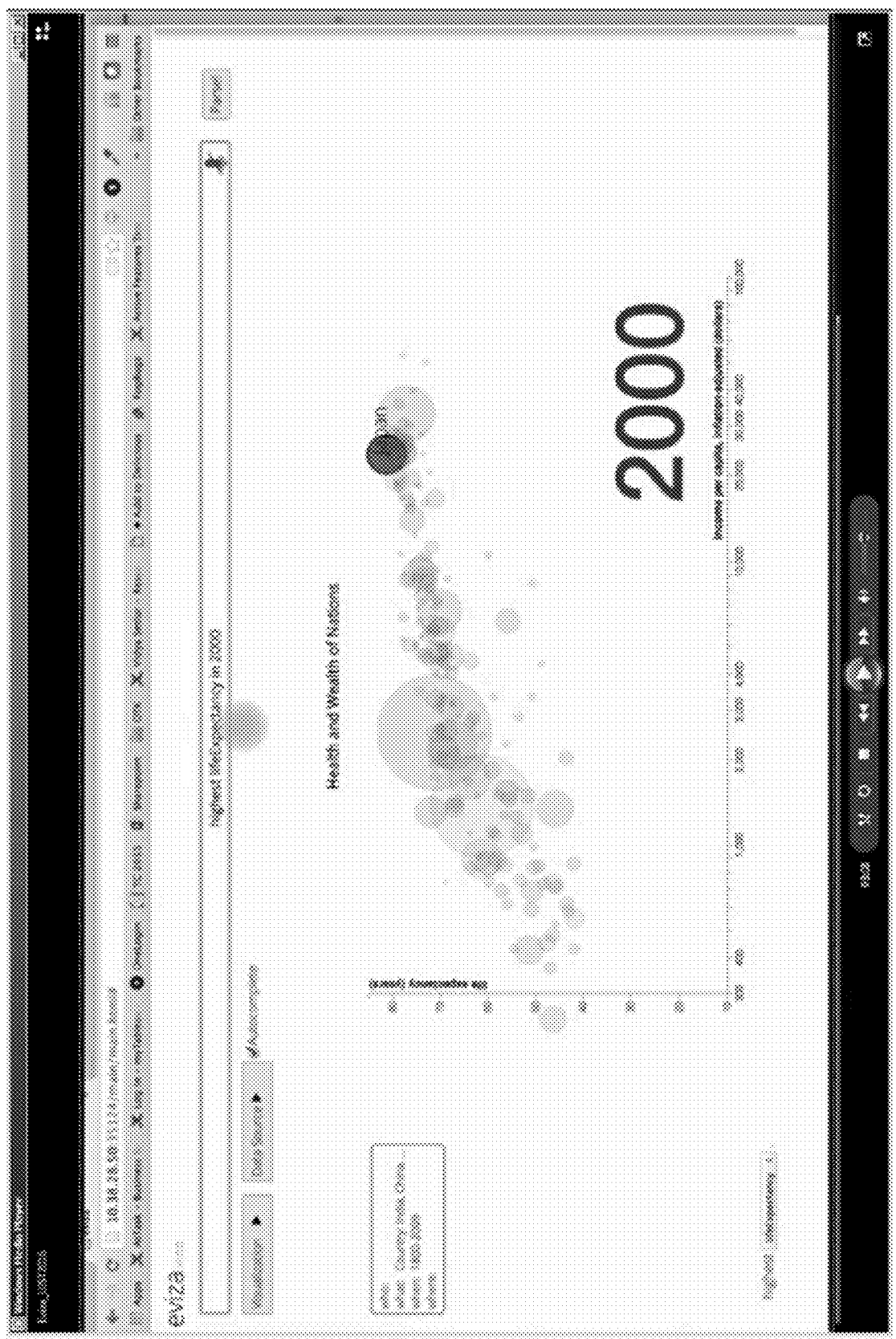
Figure 5J:
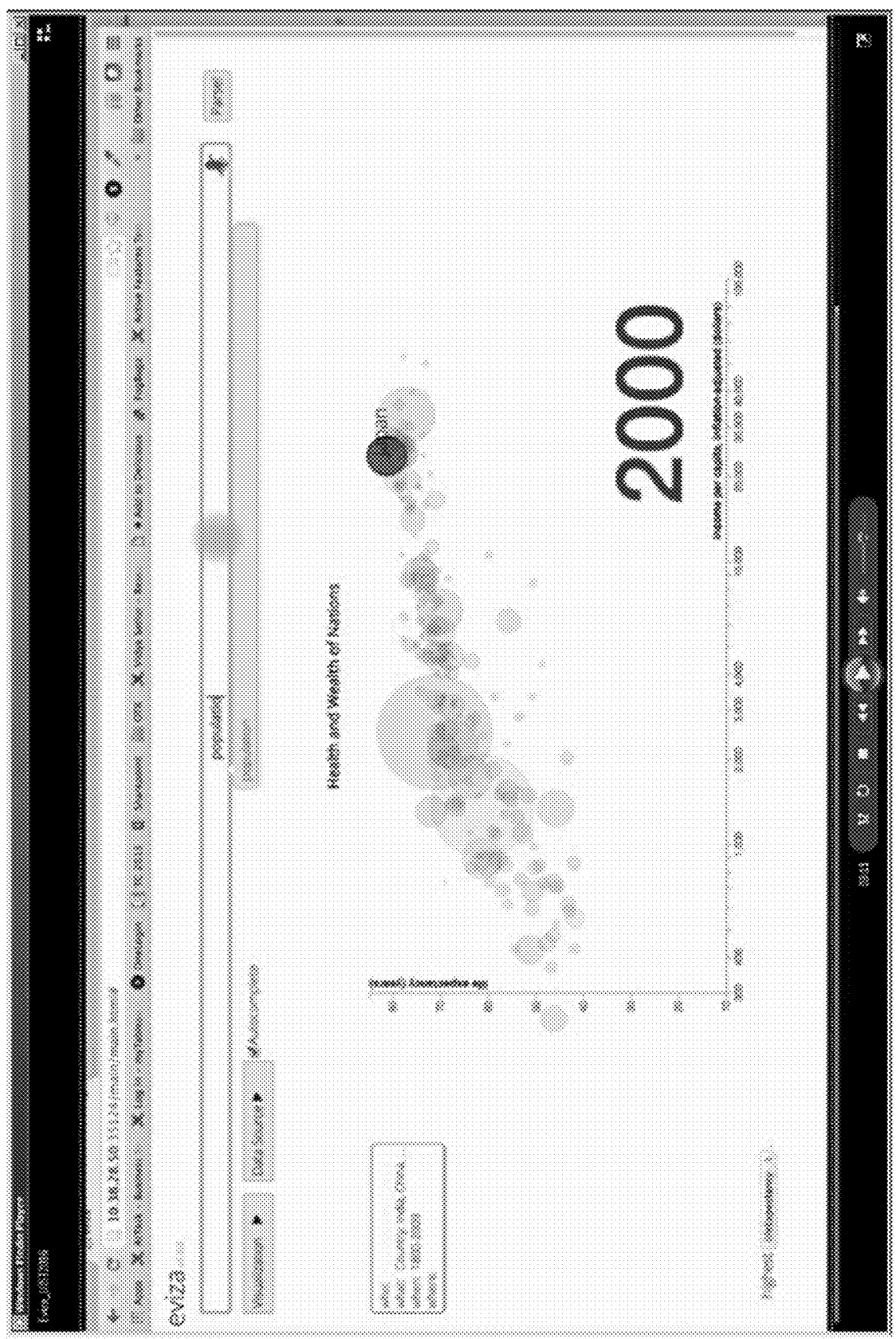
Figure 5K:
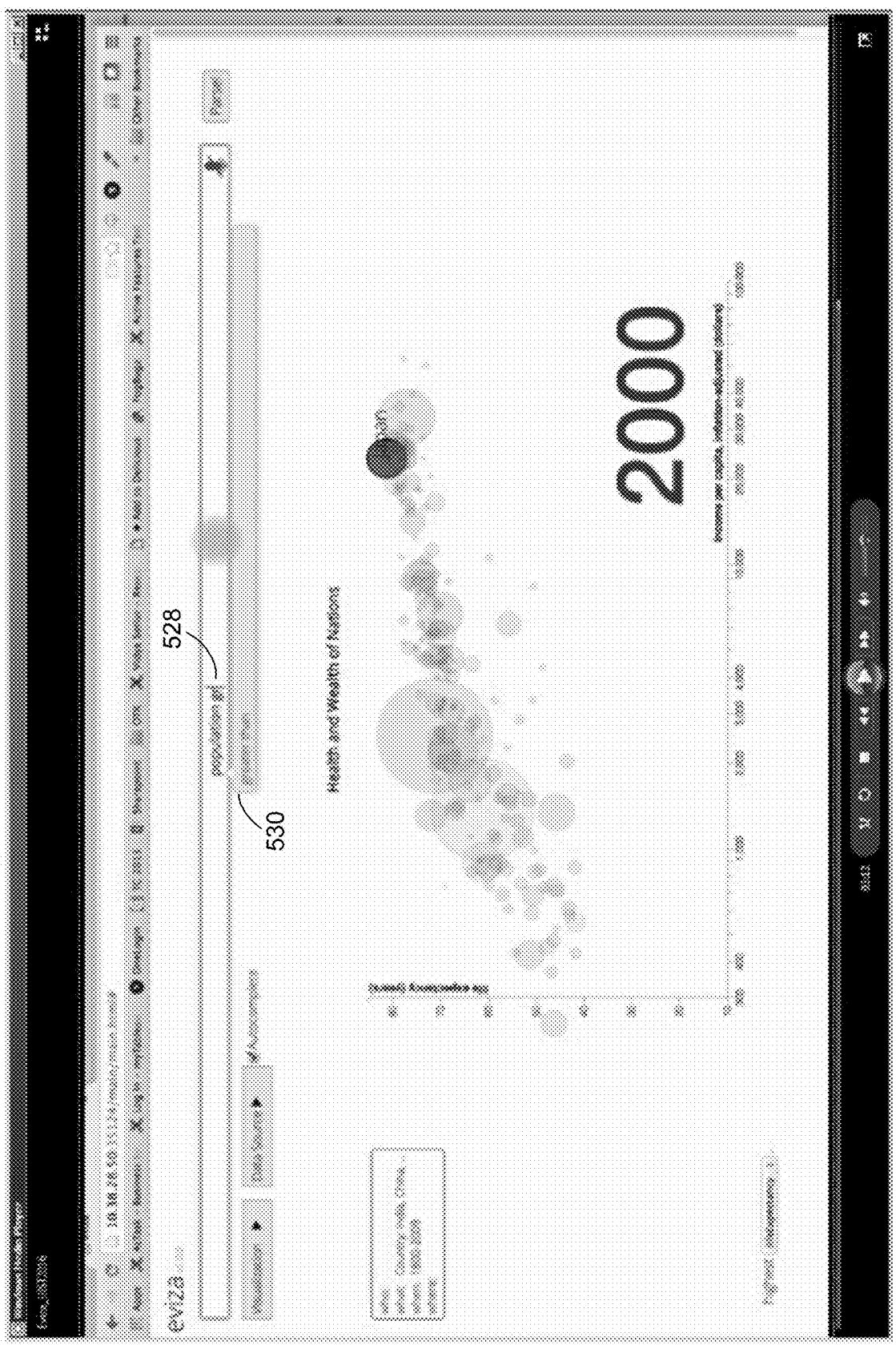
Figure 5L:
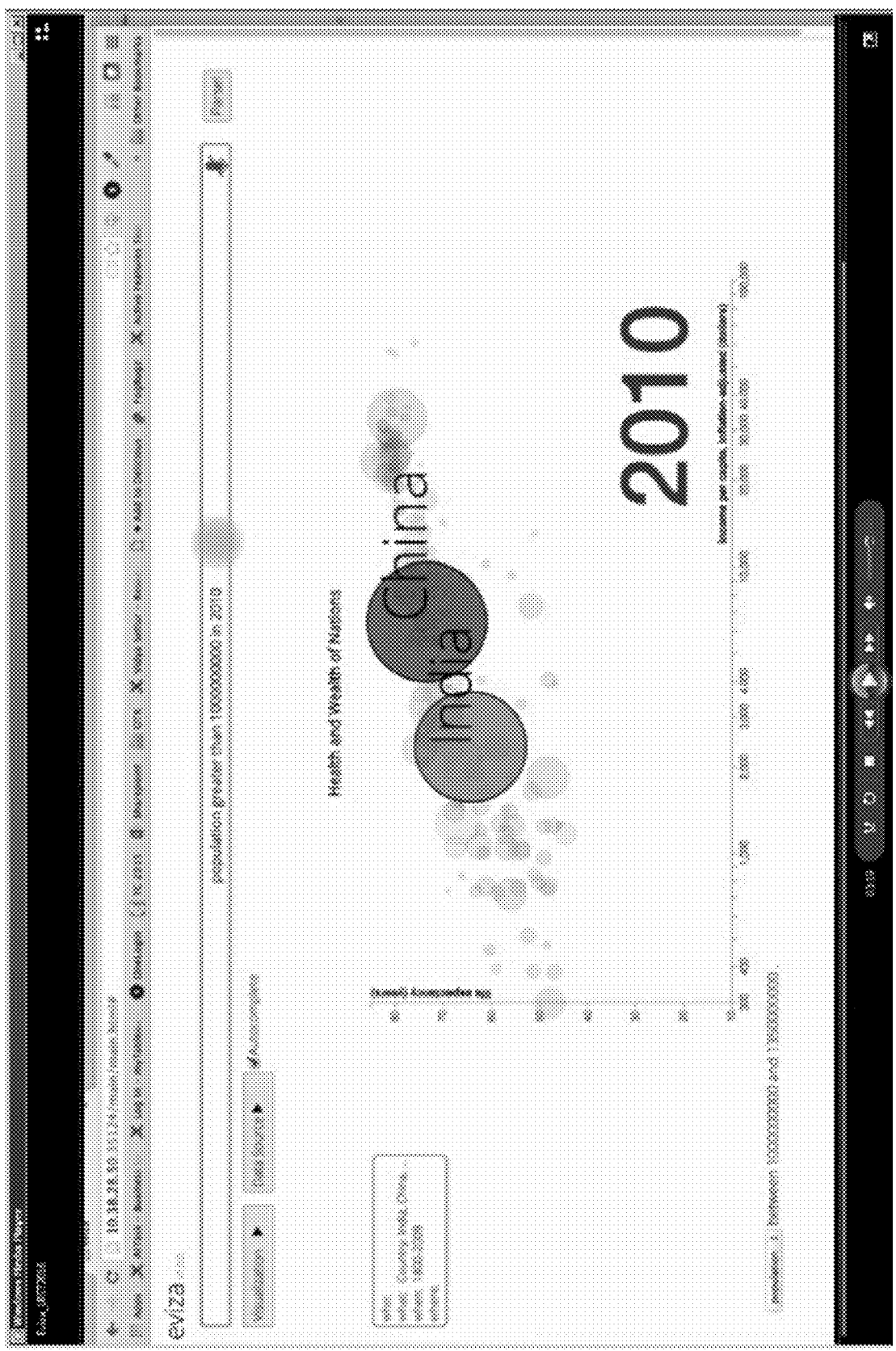

Additional examples of the autocomplete functionality are provided in FIGS. 5I-5L. In FIG. 5I, the user finished an autocomplete template that includes a year. In FIG. 5J, the data field "population" is the only one that matches the partial entry of the user, so it is the only one displayed. In FIG. 5K, the user completed the field name "population" and has typed in "gr" 528. The autocomplete component recognizes that it would make sense to compare population to one or more values, and thus suggests replacing "gr" with "greater than" 530. In FIG. 5L, the user has used an autocomplete template to specify both population and year. In both FIG. 5L, the command causes certain data marks to be highlighted, even though the other marks are still displayed.

Note that when autocomplete suggests data fields, some implementations provide alias names that may be simpler than the literal field names. For example, when looking at population, the word "population" is very easy for a user to understand, but the actual data field name could be much shorter, much longer, or unclear (e.g., "ctrypop," "Total Aggregated Population," or "cnsrrpop"). In some implementations, the field names are stored in a data dictionary.

Figure 6A:
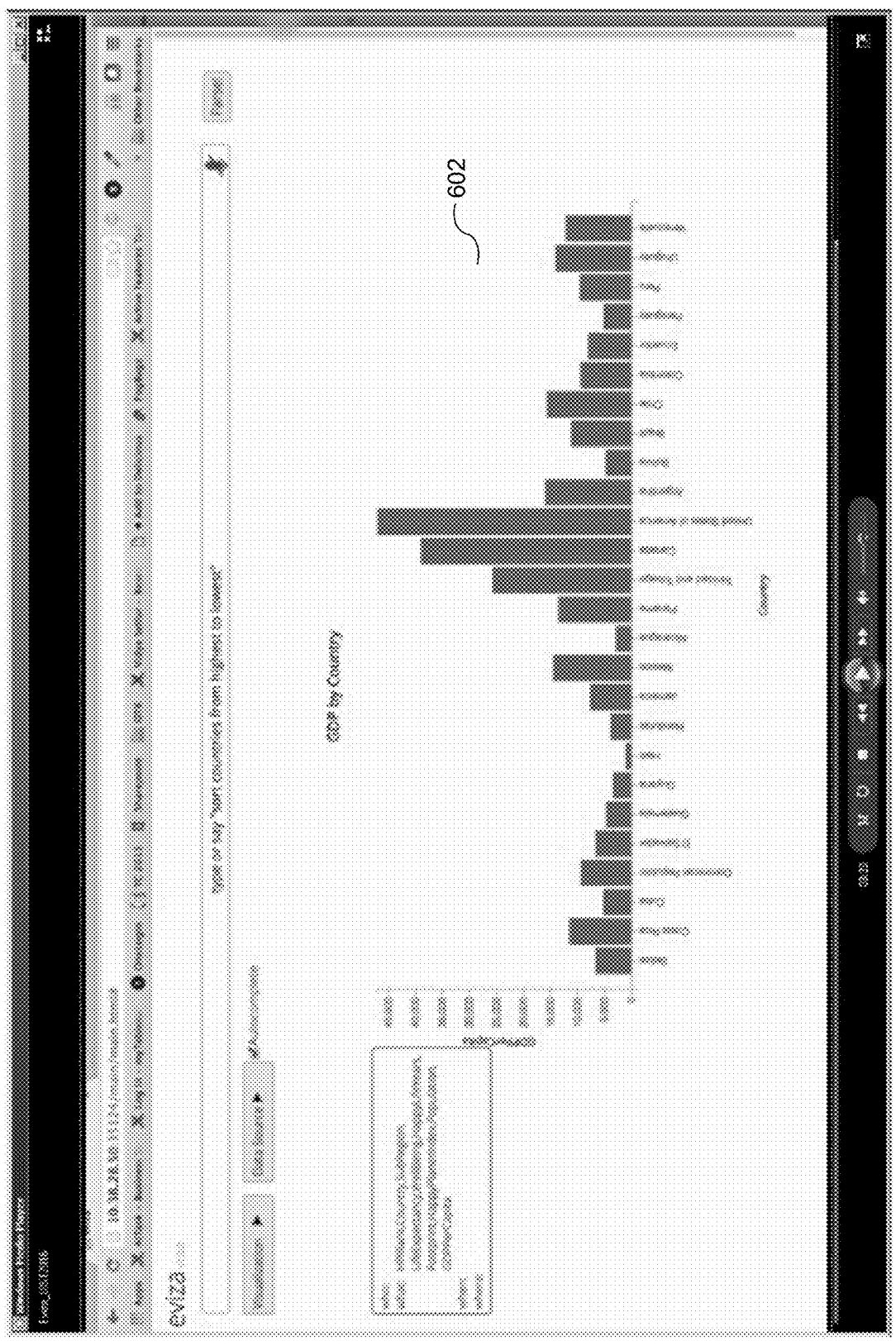
FIGS. 6A-6F illustrate graphical user interfaces for interactive data analysis using natural language processing in a data visualization application, according to some implementations.
Figure 6B:
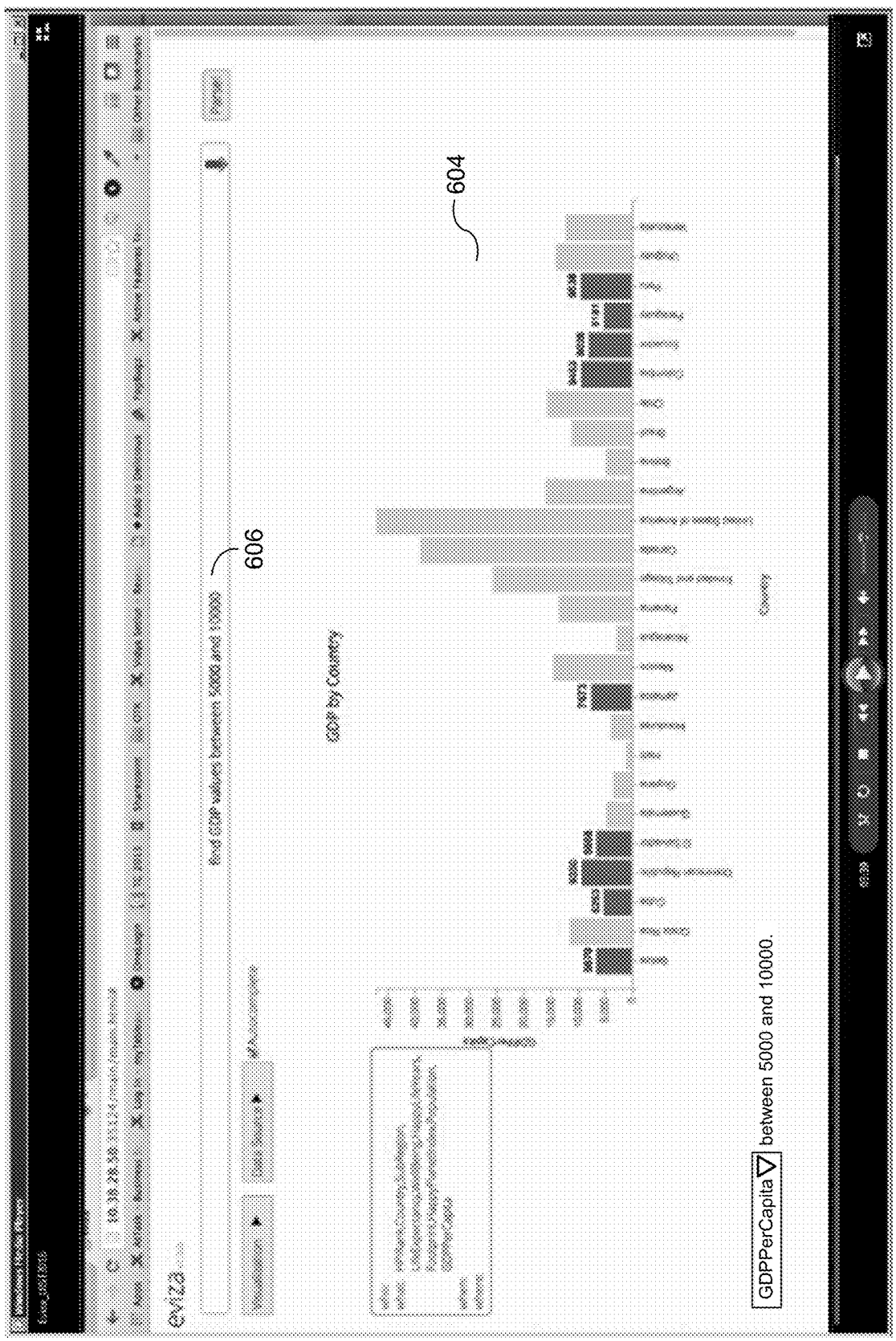

FIGS. 6A-6F illustrate graphical user interfaces for interactive data analysis using natural language processing. FIGS. 6A-6F illustrate how natural language processing can be used to adjust display of an existing dataset (e.g., processing filter commands). Referring to FIG. 6A, the application 230 displays a graphical user interface 600 with an existing data visualization 602.

In some implementations, the application 230 adjusts the display of data marks in a data visualization in response to receiving a command (e.g., a filter command). In some implementations, in response to receiving the command, the application 230 adjusts display of the data marks in the data visualization based on data currently displayed in the data visualization. For example, referring to FIG. 6B, the user inputs the filter command 606 "find GDP values between 5000 and 10000." In response, the application 230 queries the dataset in accordance with the filter command to retrieve an updated dataset, and then updates the data visualization 604 by highlighting data marks (e.g., columns) using the updated dataset.

Figure 6C:
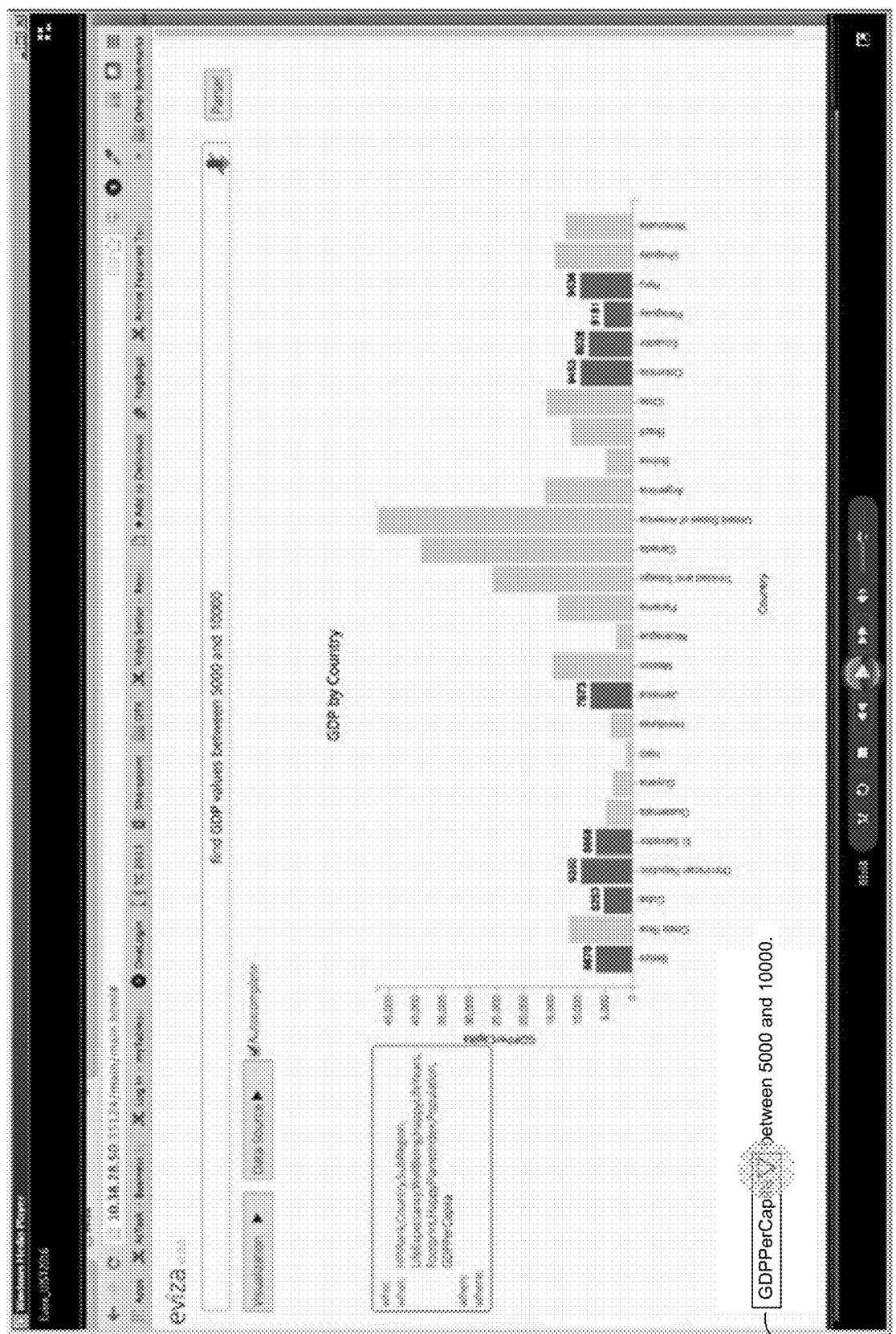
Figure 6D:
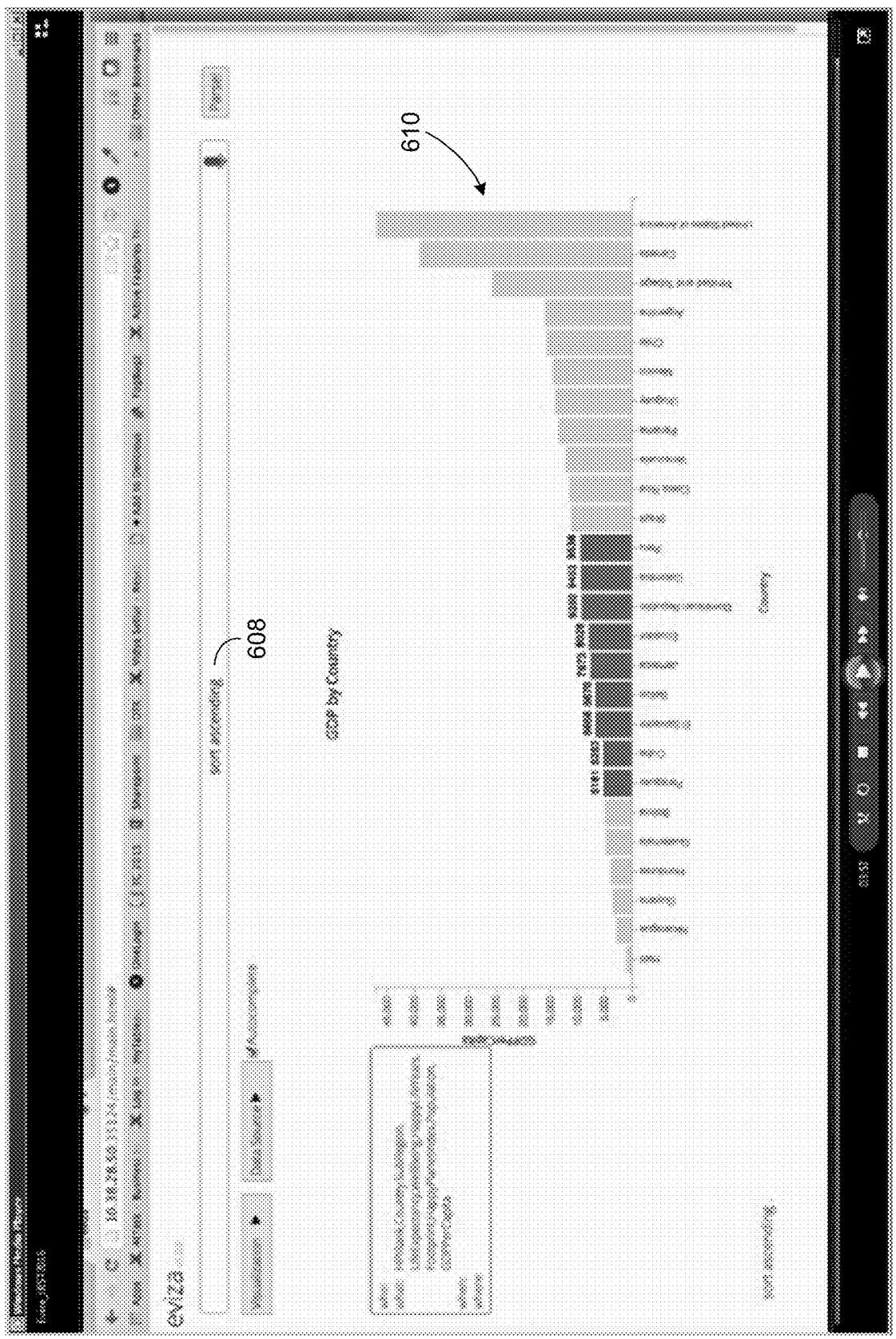
Figure 6E:
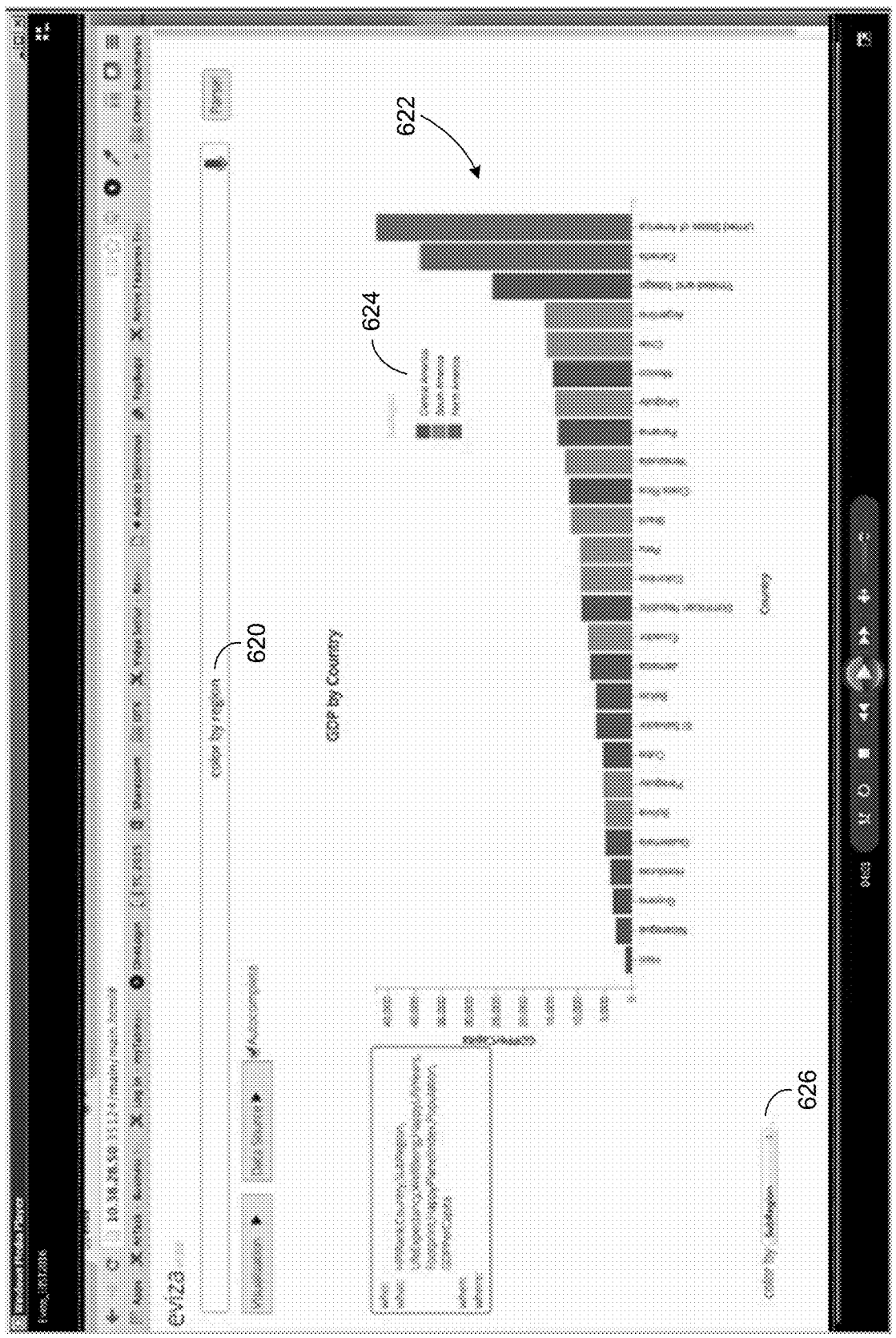

Furthermore, the application 230 may display an ambiguity widget if an ambiguity is found in the command. For example, the term "GDP" may have syntactic ambiguity if the dataset includes several data fields related to gross domestic product. In FIG. 6C, the application 230 displays an ambiguity widget 607, which displays a data field, "GDPPerCapita." However, the user may interact with the ambiguity widget 607 to select a different data field, such as TotalGDP. Determining whether a command includes a syntactic ambiguity is discussed in further detail with reference to FIG. 7.

In some implementations, the application 230 rearranges a set of data marks displayed in a data visualization in response to receiving a command. For example, referring to FIG. 6D, the user inputs the filter command "sort ascending" 608 and in response, the application 230 displays the data marks (e.g., columns) in an ascending order in the data visualization 610.

In some implementations, the application 230 changes one or more characteristics of the data visualization in response to receiving a command. In some implementations, when a data field includes a plurality of discrete ordinal values, the application 230 changes a characteristic (e.g., color or shape) of the data marks for each discrete ordinal value in the data field. For example, referring to FIG. 6E, the user inputs the command "color by region" 620, and in response, the application 230 queries the dataset for "region," which is a data field that includes a plurality of discrete ordinal values. In the updated data visualization 622 the application 230 changes the colors of the data marks according to region (e.g., Central America is colored a first color (i.e., a first discrete ordinal value), South America is colored a second color (i.e., a second discrete ordinal value), and North America is colored a third color (i.e., a third discrete ordinal value)). In this example, the application 230 displays a legend 624 to identify the coloring. In some implementations, when a data field includes a continuous range of values, the application 230 changes a characteristic of data marks according to the data values in the continuous range of values.

Figure 6F:
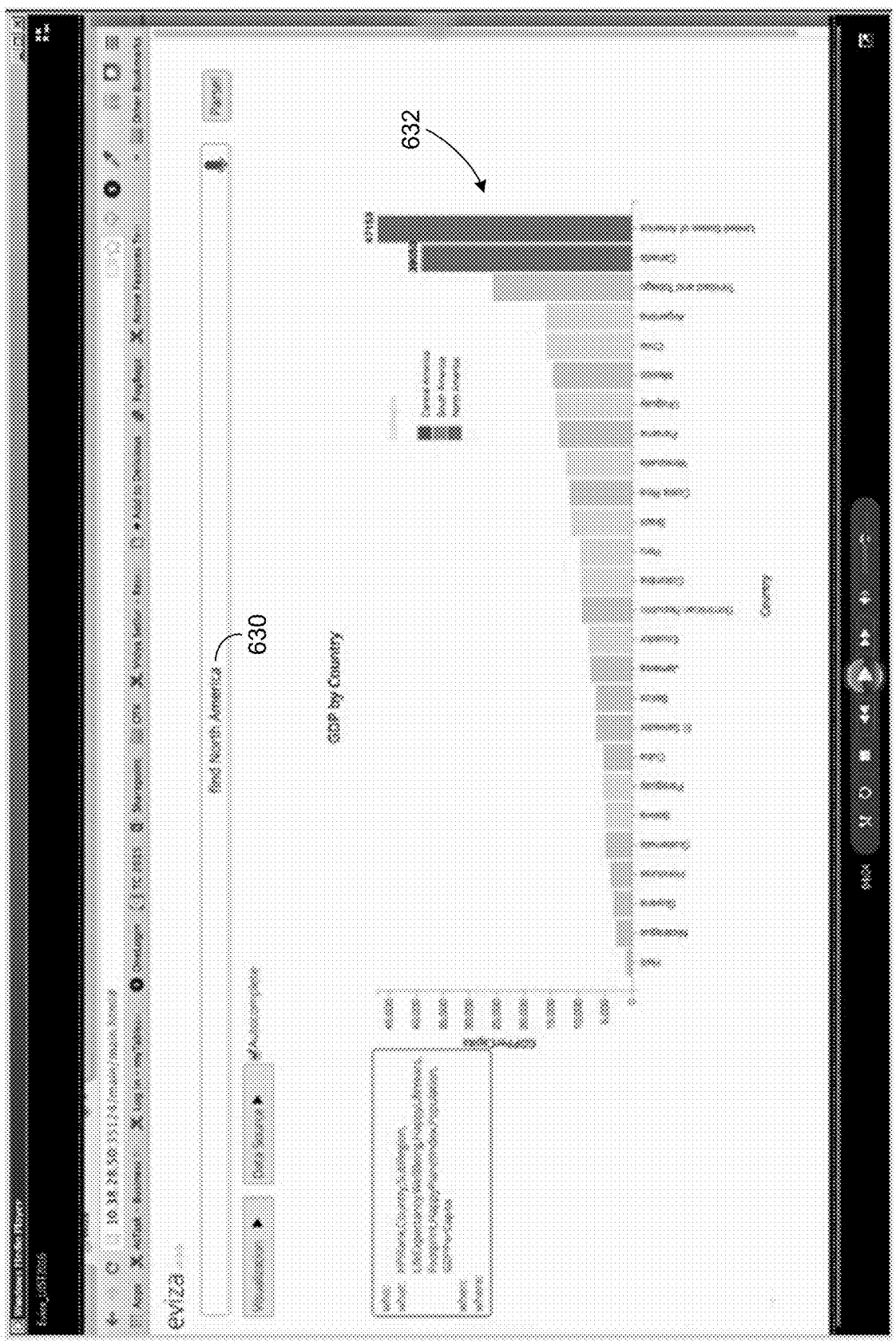

FIG. 6F is another example of the application 230 adjusting display of data marks in a data visualization in response to receiving a command from the user. Here, the user has asked to find North America" 630, and the updated data visualization 632 highlights the data marks for countries in North America.

FIGS. 6A-6F also illustrate additional implementations of pragmatics, as discussed in detail above. In particular, each subsequent command builds off of a previous command. In this way, the user and the application 230 engage in a natural conversion.

Figure 7:
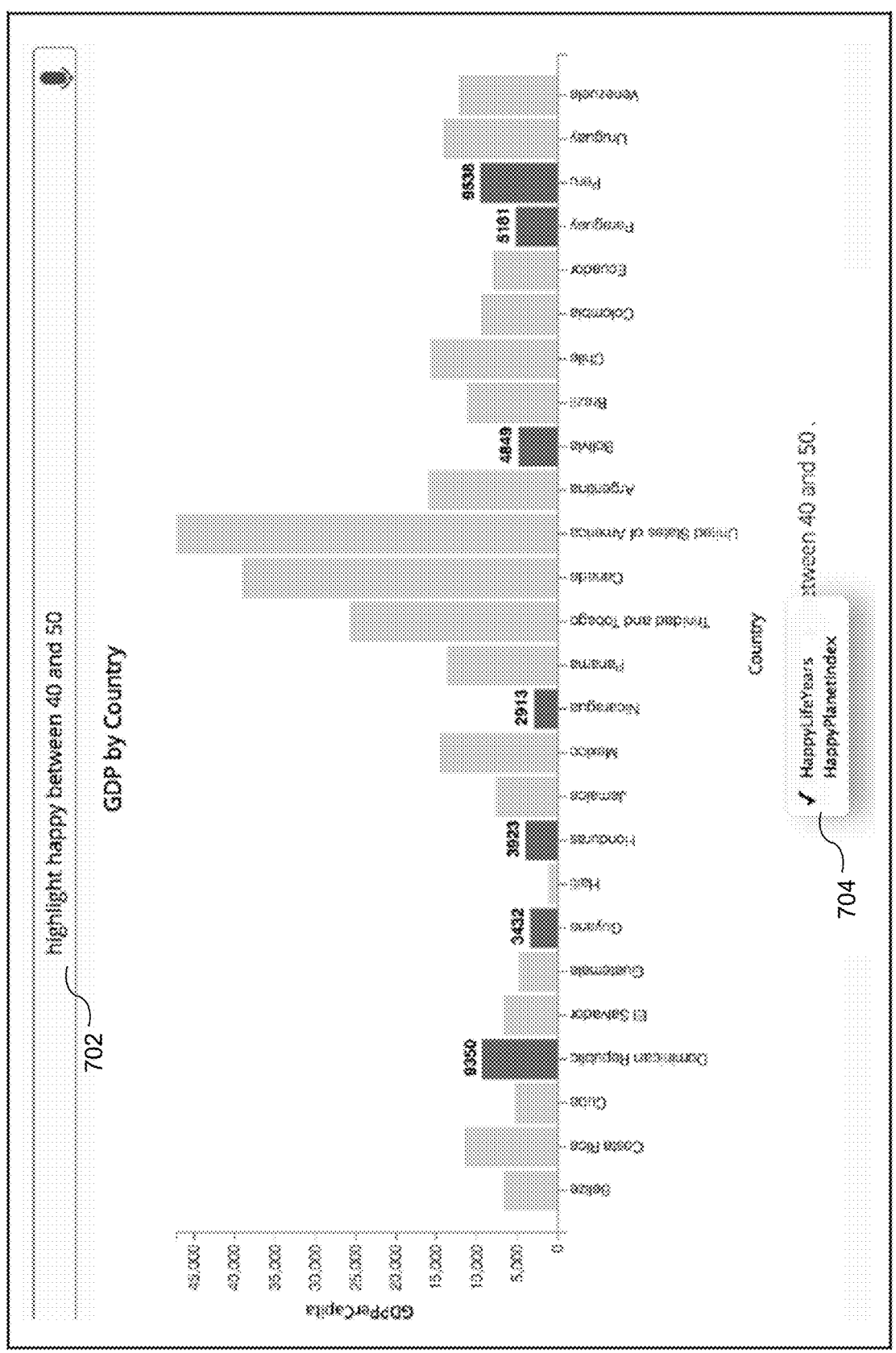
FIG. 7 illustrates a graphical user interface for interactive data analysis using natural language processing in a data visualization application, according to some implementations.

FIG. 7 illustrates a graphical user interface for interactive data analysis using natural language processing. FIG. 7 illustrates how the language module 238 resolves syntactic ambiguities between a natural language command and the dataset (e.g., ambiguities due to spelling, plurality variations, and abbreviations). In some implementations, in response to determining that a command includes at least one syntactic ambiguity, the language module 238 determines a similarity metric between the command (e.g., the word or phrase in the command causing the syntactic ambiguity) and the dataset. In determining the similarity metric, the language module 238 syntactically aligns the portion of the command causing the syntactic ambiguity with one or more corresponding data fields. Thereafter, the language module 238 determines whether any of the determined similarity metrics satisfy a similarity threshold. In some implementations, in accordance with a determination that one of the similarity metrics satisfies the similarity threshold (e.g., a data field corresponds to the command), the application 230 updates the data visualization using the corresponding data field. In accordance with a determination that two or more of the similarity metrics satisfy the similarity threshold (e.g., two data fields correspond to the command), the application 230 updates the data visualization using one of the two or more corresponding data fields and also displays an ambiguity widget that includes labels for each of the two or more corresponding data fields.

For example, referring to FIG. 7, the user inputs the command 702 "highlight happy between 40 and 50." In this example, "happy" is considered a syntactic ambiguity because, for the sake of illustration, the underlying dataset includes two data fields that correspond to the command: (1) HappyLifeYears and (2) HappyPlanetIndex. The language module 238 determines that two or more similarity metrics satisfy the similarity threshold (e.g., these two data fields syntactically align with a portion of the command, "happy," causing the syntactic ambiguity). Accordingly, the language module 238 displays an ambiguity widget 704 which allows the user to toggle between the two possible data fields.

Figure 8A:
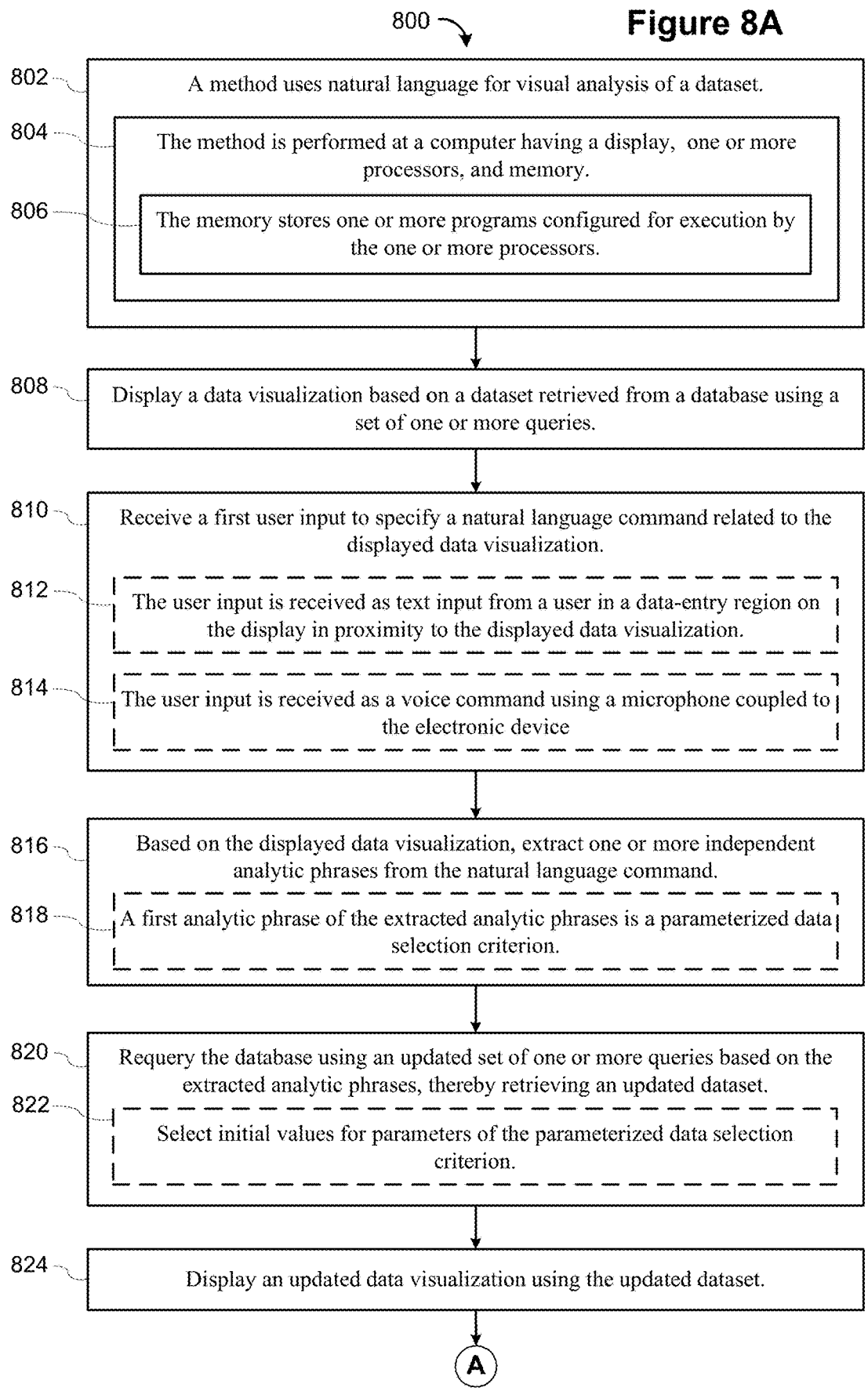
FIGS. 8A-8B provide a flowchart of a process that uses natural language for visual analysis of a dataset.
Figure 8B:
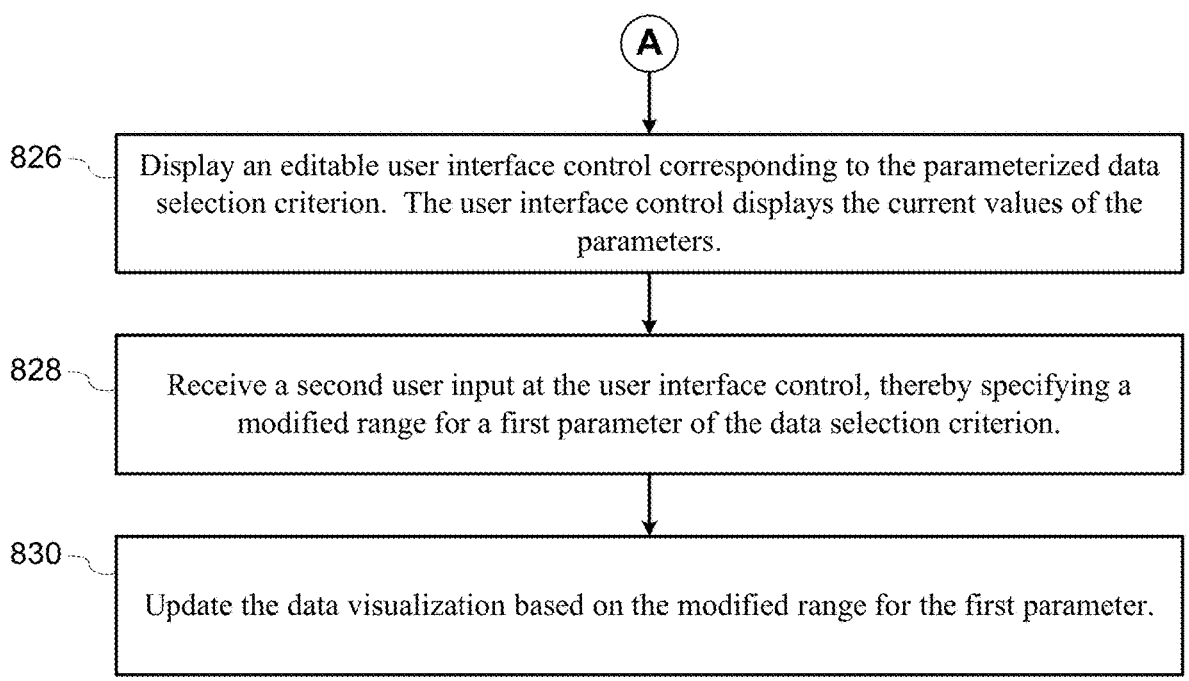

FIGS. 8A and 8B provide a flow diagram illustrating a method 800 of using natural language for visual analysis of a dataset 802. The steps of the method 800 may be performed by a computer (e.g., a computing device 200). In some implementations, the computer includes (804) a display, one or more processors, and memory. FIGS. 8A and 8B correspond to instructions stored in a computer memory or computer-readable storage medium (e.g., the memory 206 of the computing device 200). The memory stores (806) one or more programs configured for execution by the one or more processors (e.g., the processor(s) 202). For example, the operations of the method 800 are performed, at least in part, by a data visualization generation module 234 and/or a language processing module 238.

In performing the method 800, the computer displays (808) a data visualization based on a dataset retrieved from a database using a set of one or more queries. For example, referring to FIG. 1, a user may associate one or more data fields from a schema information region 110 with one or more shelves (e.g., the column shelf 120 and the row shelf 122, FIG. 1) in the data visualization region 112. In response to receiving the user associations, the computer retrieves data for the data fields from the dataset using a set of one or more queries and then displays a data visualization (e.g., the data visualization 308) in the data visualization region 112 that corresponds to the received user inputs. Displaying data visualizations is discussed in further detail above with reference to FIGS. 1 and 3A.

The computer receives (810) a user input to specify a natural language command related to the displayed data visualization. In some implementations, the user input is received (812) as text input (e.g., a via keyboard 216 or via touch sensitive display 214) from a user in a data-entry region (e.g., a natural language processing region 302) on the display in proximity to the displayed data visualization. In some implementations, the user input is received (814) as a voice command using a microphone (e.g., audio input device 220) coupled to the electronic device. For example, referring to FIG. 3A, the displayed data visualization 308 concerns earthquakes in the United States between the years 2000 and 2016. Now, referring to FIG. 3B, the user inputs a natural language command, "where are the large earthquakes," which is received by the computer. The computer then displays the natural language command in a command bar 304 in the natural language processing region 302. Receiving inputs (e.g., commands/queries) from a user is discussed in further detail above with reference to FIGS. 1 and 3A.

Based on the displayed data visualization, the computer extracts (816) one or more independent analytic phrases from the natural language command. For example, referring to FIG. 3B, the natural language command received by the computer reads, "where are the large earthquakes." The displayed data visualization 308 (displayed prior to receiving the natural language command) concerns earthquakes in the United States. The computer extracts "where" and "large earthquakes" from the natural language question because both relate to the displayed data visualization 308.

In some implementations, at least one analytic phrase of the extracted analytic phrases forms (818) a parameterized data selection criterion. For example, referring to FIG. 3B, the extracted phrase "large earthquakes" becomes the parameterized data selection criterion "magnitude>=parameter", where "magnitude" is a data field in the data set.

The computer requeries (820) the database using an updated set of one or more queries based on the extracted analytic phrases, thereby retrieving an updated dataset. For example, if the natural language command is "earthquakes in California," the computer queries the database for earthquake data in California (e.g., state="CA"). Requerying the database is discussed in further detail above with reference to FIGS. 3A and 3B. In some instances, requerying is performed locally at the computing device using locally saved or cached data, even if the data source is at a remote server.

Although parameterized data selection criteria commonly involve numeric data fields (e.g., earthquake magnitude or geographic distance from a designated region), the same techniques are also applied to categorical fields. For example, an analyst may review sales for a chain of hardware stores. Rather than looking at all sales, the analyst may specify a natural language command to see the sales of appliances or sales of products from a particular supplier. The language module can correlate the term "appliances" or the supplier name to a data field in the data set, and correlate the request to one or more specific data values for the data field. For example, the data source for the hardware store may include a data field called "Product Type" or "Product Category" and have a data value of "appliance" for the appliances. For parameterized data selection criteria using categorical data, the corresponding ambiguity widget is typically a control that allows selection of multiple items (e.g., a multi-select drop-down list).

In some implementations, when requerying the database using the updated set of one or more queries, the computer selects (822) initial values for parameters of the parameterized data selection criterion. For example, referring to FIG. 3B, the computer selects an initial value of "5" for the parameter in "magnitude>=parameter". Selecting initial parameter values is discussed in more detail above with reference to FIGS. 3A and 3B.

In response, the computer displays (824) an updated data visualization using the updated dataset. For example, referring to FIG. 3B, the computer displays an updated data visualization 309. The updated data visualization 309 displays earthquakes in the United States, occurring between the years 2000 and 2016, having magnitude of 5 or greater on the Richter scale. The updated data visualization 309 corresponds to the updated dataset. Displaying updated data visualizations is discussed in further detail above with reference to FIG. 3B.

In some implementations, at least one of the analytic phrases includes one or more filter commands, and the updated data visualization is based on data corresponding to the one or more filter commands. For example, referring to FIG. 3H, the analytic phase "where do I see large earthquakes outside California" includes a filter command, "outside California." The updated data visualization 350 displays earthquakes in the United States, excluding California, that occur between the years 2000 and 2016, having magnitude at least 4. Filter commands are discussed in further detail with reference to FIGS. 5A-6F.

In some implementations, the computer displays (826) an editable user interface control (e.g., user control interface 310) corresponding to the parameterized data selection criterion. The user interface control displays the initial values of the parameters for the parameterized data selection criterion. For example, referring to FIG. 3B, the computer displays the user control interface 310 near the updated data visualization 309. A slider bar 312 of the user control interface 310 is initially set to 5, meaning earthquakes having magnitudes of 5 or greater on the Richter scale are currently displayed in the updated data visualization 309.

In some implementations, after displaying the editable user interface control, the computer receives (828) a second user input at the user interface control, thereby specifying a modified range for a first parameter of the data selection criterion. For example, referring to FIGS. 3C-3D, the user interacts with the slider bar 312 to move the slider bar 312 from a first position (e.g., 5) to a second position (e.g., 4). The user thus specifies a modified range of (magnitude 4 or greater) for what is considered the "large earthquakes."

In some implementations, the application 230 updates (830) the data visualization based on the modified range for the first parameter. For example, referring to FIG. 3D, the updated data visualization 311 displays earthquakes in the United States, occurring between the years 2000 and 2016, having magnitude 4 or greater.

Figure 11:
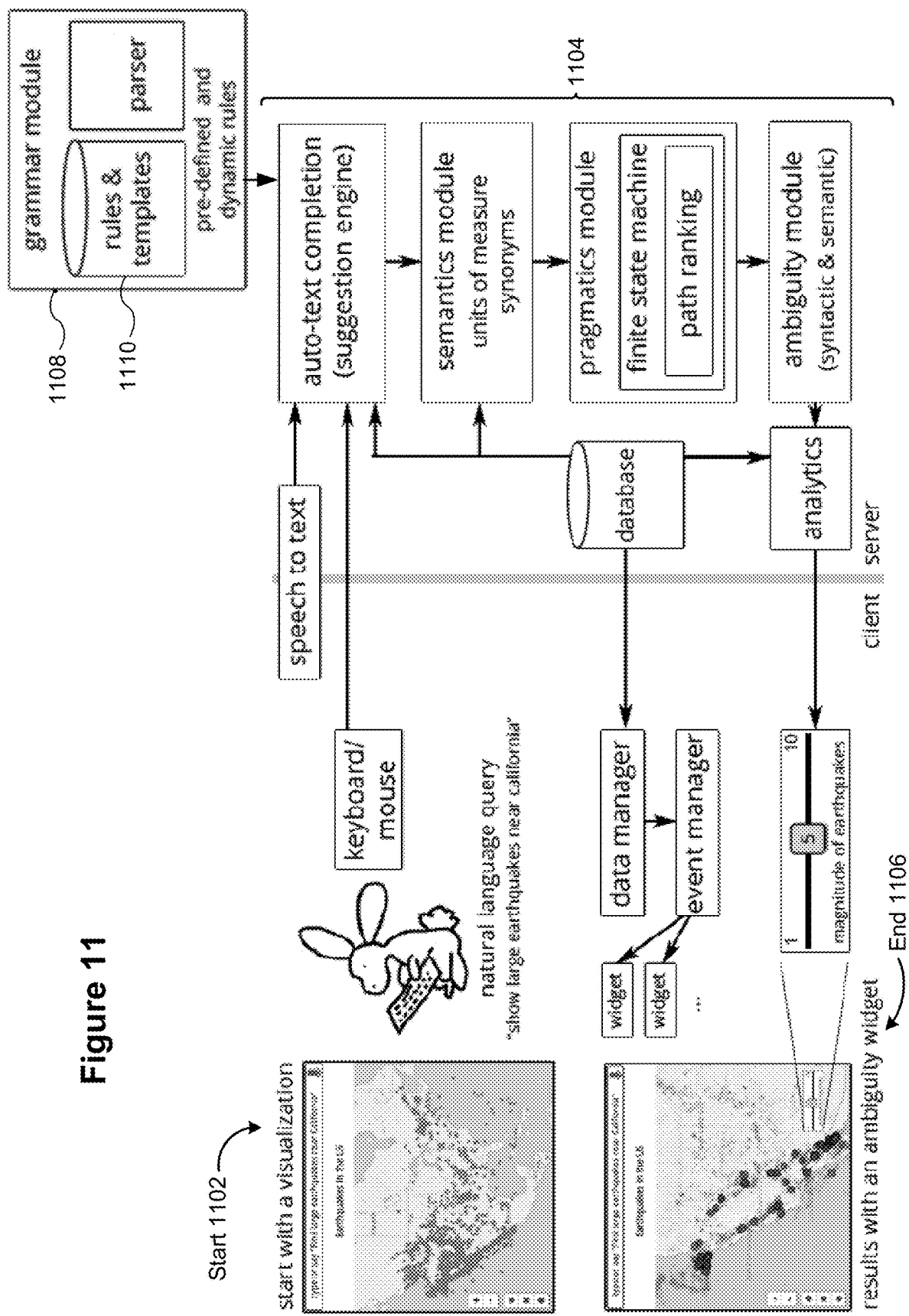
FIG. 11 illustrates a system architecture for incorporating natural language processing into a data visualization application in accordance with some implementations.

Many of the example natural language commands illustrated above involve specifying a filter. However, there are many other types of natural language commands that are supported, as listed in FIG. 10. The first column 1002 of the table provides 14 categories of natural language commands, and the second column 1004 identifies an example natural language command for each of the identified categories. Each implementation has a grammar module 1108 and a set of rules 1110, as illustrated in FIG. 11. The set of rules 1110 can include both predefined rules and dynamic rules. These rules 1110 determine what types of natural language commands are supported in each implementation. Note that with dynamic rules, the set of supported natural language commands can be extended over time (e.g., based on user input/feedback).

As shown in FIG. 11, the process twitches (1102) with a data visualization already displayed. Because there is already a data visualization, there is a defined data set, and certain data fields are being used in the displayed data visualization. This provides context for the subsequent natural language processing. The natural language processing 1104 (including autocompletion of natural language commands based on defined templates, semantics, pragmatics, and disambiguation) can use this context to better understand the user's command. Once the command is processed, the data visualization application 230 displays (1106) an updated data visualization according to the command. In some cases, this includes displaying an ambiguity widget.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of using natural language for visual analysis of a dataset, comprising:
   at a computer having a display, one or more processors, and memory storing one or more programs configured for execution by the one or more processors:
   displaying a first data visualization based on a dataset retrieved from a database;
   receiving a first user input to specify a natural language command related to the first data visualization;
   in response to the first user input:
      correlating one or more terms in the natural language command with the first data visualization to identify a first data field in the dataset;
      determining an initial range of values for the first data field based on the first data visualization and the natural language command; and
      displaying the initial range of values for the first data field in an editable user interface control adjacent to the first data visualization;
   receiving a second user input, at the user interface control, modifying the initial range of values for the first data field;
   retrieving an updated dataset from the database using the modified range of values for the first data field; and
   displaying a second data visualization using the updated dataset.

2. The method of claim 1, wherein the first user input is received as text input from a user in a data-entry region on the display in proximity to the first data visualization.

3. The method of claim 1, wherein the first user input is received as a voice command using a microphone coupled to the computer.

4. The method of claim 1, wherein the natural language command includes a filter command.

5. The method of claim 1, further comprising updating the second data visualization a plurality of times according to a sequence of two or more natural language commands.

6. The method of claim 1, wherein the natural language command is a question.

7. The method of claim 1, wherein the natural language command specifies a first analytic phrase, the method further comprising:
   translating the first analytic phrase into a parameterized data selection criterion for the first data field.

8. The method of claim 1, wherein the first data field has a numeric data type and the initial range of values comprises a continuous interval of numeric values.

9. The method of claim 8, wherein the continuous interval of numeric values comprises a bounded interval of values for the first data field.

10. The method of claim 8, wherein the continuous interval of numeric values comprises an unbounded interval that specifies either a maximum value or a minimum value for the first data field.

11. A computing device, comprising:
   one or more processors;
   memory;
   a display; and
   one or more programs stored in the memory and configured for execution by the one or more processors, the one or more programs comprising instructions for:
      displaying a first data visualization based on a dataset retrieved from a database;
      receiving a first user input to specify a natural language command related to the first data visualization;

in response to the first user input:
    correlating one or more terms in the natural language command with the first data visualization to identify a first data field in the dataset;
    determining an initial range of values for the first data field based on the first data visualization and the natural language command; and
    displaying the initial range of values for the first data field in an editable user interface control adjacent to the data visualization;
receiving a second user input, at the user interface control, modifying the initial range of values for the first data field;
retrieving an updated dataset from the database using the modified range of values for the first data field; and
displaying a second data visualization using the updated dataset.

12. The computing device of claim 11, wherein the first user input is received as text input from a user in a data-entry region on the display in proximity to the first data visualization.

13. The computing device of claim 11, wherein the first user input is received as a voice command using a microphone coupled to the computing device.

14. The computing device of claim 11, wherein the natural language command includes a filter command.

15. The computing device of claim 11, wherein the one or more programs further comprise instructions for updating the second data visualization a plurality of times according to a sequence of two or more natural language commands.

16. The computing device of claim 11, wherein the natural language command specifies a first analytic phrase, and the one or more programs further comprise instructions for:
    translating the first analytic phrase into a parameterized data selection criterion for the first data field.

17. The computing device of claim 11, wherein the first data field has a numeric data type and the initial range of values comprises a continuous interval of numeric values.

18. A non-transitory computer readable storage medium storing one or more programs configured for execution by a computing device having one or more processors, memory, and a display, the one or more programs comprising instructions for:
    displaying a first data visualization based on a dataset retrieved from a database;
    receiving a first user input to specify a natural language command related to the first data visualization;
    in response to the first user input:
        correlating one or more terms in the natural language command with the first data visualization to identify a first data field in the dataset;
        determining an initial range of values for the first data field based on the first data visualization and the natural language command; and
        displaying the initial range of values for the first data field in an editable user interface control adjacent to the first data visualization;
    receiving a second user input, at the user interface control, modifying the initial range of values for the first data field;
    retrieving an updated dataset from the database using the modified range of values for the first data field; and
    displaying a second data visualization using the updated dataset.

19. The non-transitory computer readable storage medium of claim 18, wherein the first user input is received as text input from a user in a data-entry region on the display in proximity to the first data visualization.

* * * * *